(12) United States Patent
Gao et al.

(10) Patent No.: US 11,689,430 B2
(45) Date of Patent: Jun. 27, 2023

(54) DATAVIEW DRILLDOWN MENU

(71) Applicant: NetBrain Technologies, Inc., Burlington, MA (US)

(72) Inventors: Lingping Gao, Burlington, MA (US); Guangdong Liao, Burlington, MA (US); Yong Zhao, Burlington, MA (US); Meng Yang, Burlington, MA (US); Xinfeng Xia, Burlington, MA (US); Junjie Yuan, Burlington, MA (US); Guicai Cui, Burlington, MA (US); Long Zeng, Burlington, MA (US)

(73) Assignee: NetBrain Technologies, Inc., Burlington, MA (US)

( * ) Notice: Subject to any disclaimer, the term of this patent is extended or adjusted under 35 U.S.C. 154(b) by 0 days.

(21) Appl. No.: 16/719,619

(22) Filed: Dec. 18, 2019

(65) Prior Publication Data

US 2020/0389370 A1 Dec. 10, 2020

Related U.S. Application Data

(60) Provisional application No. 62/859,097, filed on Jun. 8, 2019.

(51) Int. Cl.
*H04L 41/22* (2022.01)
*G06F 3/04817* (2022.01)
*G06F 3/0482* (2013.01)
*G06F 3/04845* (2022.01)
*H04L 67/75* (2022.01)
*H04L 41/142* (2022.01)
*H04L 43/10* (2022.01)

(52) U.S. Cl.
CPC .......... *H04L 41/22* (2013.01); *G06F 3/0482* (2013.01); *G06F 3/04817* (2013.01); *G06F 3/04845* (2013.01); *H04L 67/75* (2022.05)

(58) Field of Classification Search
CPC ........ H04L 41/22; H04L 67/36; H04L 43/10; H04L 41/142; G06F 3/0482; G06F 3/04845; G06F 3/04817
See application file for complete search history.

(56) References Cited

U.S. PATENT DOCUMENTS

| | | | |
|---|---|---|---|
| 9,098,412 B1 * | 8/2015 | Marchant | G06F 11/30 |
| 9,258,195 B1 * | 2/2016 | Pendleton | H04L 41/22 |
| 2016/0352586 A1 * | 12/2016 | Priya | H04Q 11/0066 |
| 2018/0018065 A1 * | 1/2018 | Gao | G06T 11/206 |
| 2019/0215248 A1 * | 7/2019 | D'Ippolito | H04Q 11/0067 |

* cited by examiner

*Primary Examiner* — John A Follansbee
*Assistant Examiner* — Kamal M Hossain
(74) *Attorney, Agent, or Firm* — Crowell & Moring LLP

(57) ABSTRACT

A system is disclosed for generating a graphical user interface (GUI) for network management automation. The GUI is a data view that provides functionality for monitoring and controlling devices in a network using a drilldown menu.

20 Claims, 62 Drawing Sheets

| NY-core.bak ∨ | | | Route Table | | Table Details | Row Count History | | | | |
|---|---|---|---|---|---|---|---|---|---|---|
| Device Data | Interface Data | | 05/07/2019 01:15:03 AM (Map Data Time) ∨ | | | Golden Baseline Analysis: Not Applicable ⓘ | | | | |
| ⊞ CPU | | 97 items ⌐ 2102 | | | | Global ∨ | Compare | Type to find | | |
| ⊞ bgp_nbrs | | | | | | | | | | |
| ▽ BGP Best Practice | | Adj. | Dest Addr | Mask | Distance | Metric | Interface | Next Hop IP | Next Hop Device | Age |
| ⊞ PL_count_string | | O | 1.1.1.1 | 32 | 110 | 67 | FastEthernet0/1.1 | 172.24.31.195 | BJ*POP | 7w0d |
| ⊞ mem_usage | | O E2 | 192.168.28.0 | 24 | 110 | 20 | FastEthernet0/0 | 172.24.31.65 | NY_POPP | 7w0d |
| ⊞ bgp_config | | O E2 | 2.2.2.2 | 32 | 110 | 200 | FastEthernet0/1.1 | 172.24.31.195 | BJ*POP | 6w5d |
| ⊞ version | | O E2 | 192.168.31.0 | 24 | 110 | 20 | FastEthernet0/0 | 172.24.31.65 | NY_POPP | 7w0d |
| Route Table | | O E2 | 192.168.31.11 | 32 | 110 | 20 | FastEthernet0/0 | 172.24.31.65 | NY_POPP | 7w0d |

Figure 33

- Compare
- Data View Template
- Execute CLI Commands
- Gapp
- Overall Health Monitor
- Path
- Ping
- Qapp
- Runbook Template
- SPOG URL
- Traceroute
- URL
- Verify Application
- View Data

Figure 42
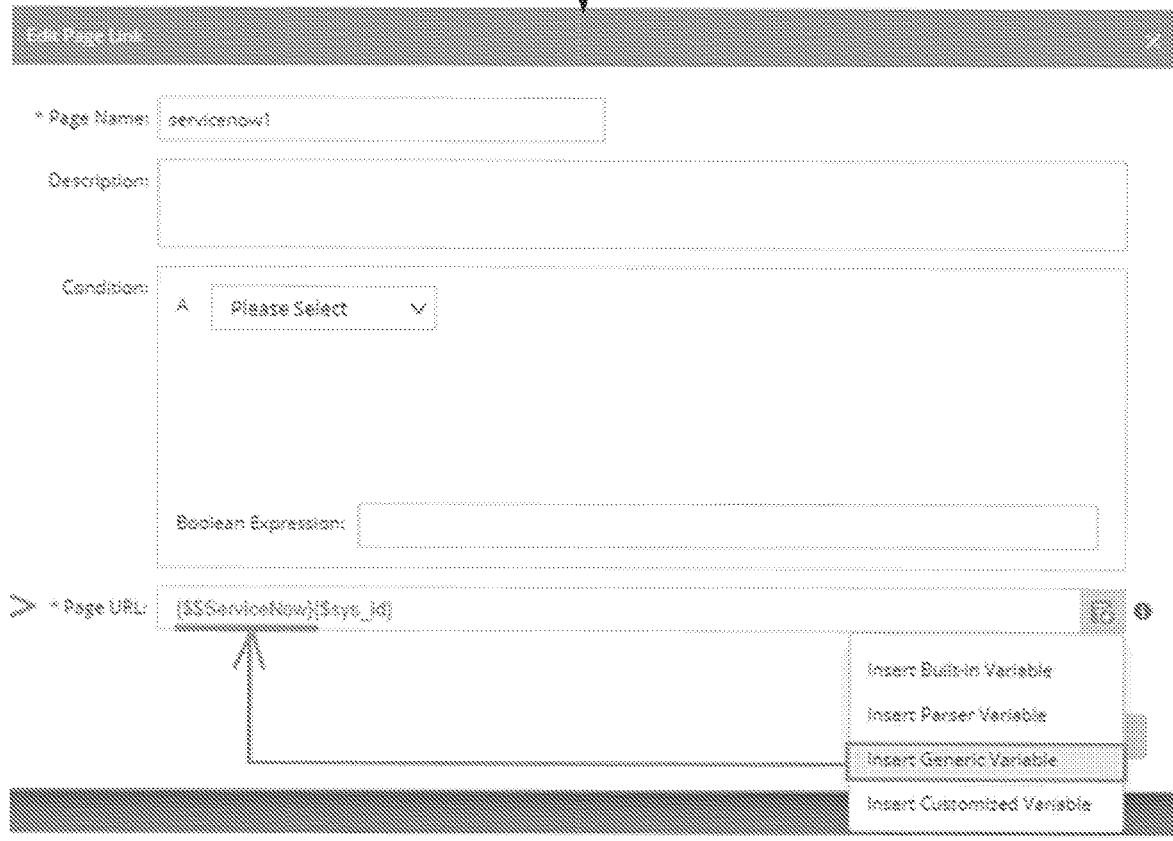

Figure 47

Figure 48
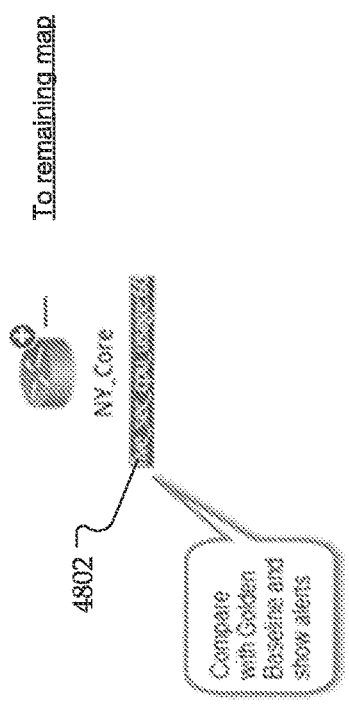
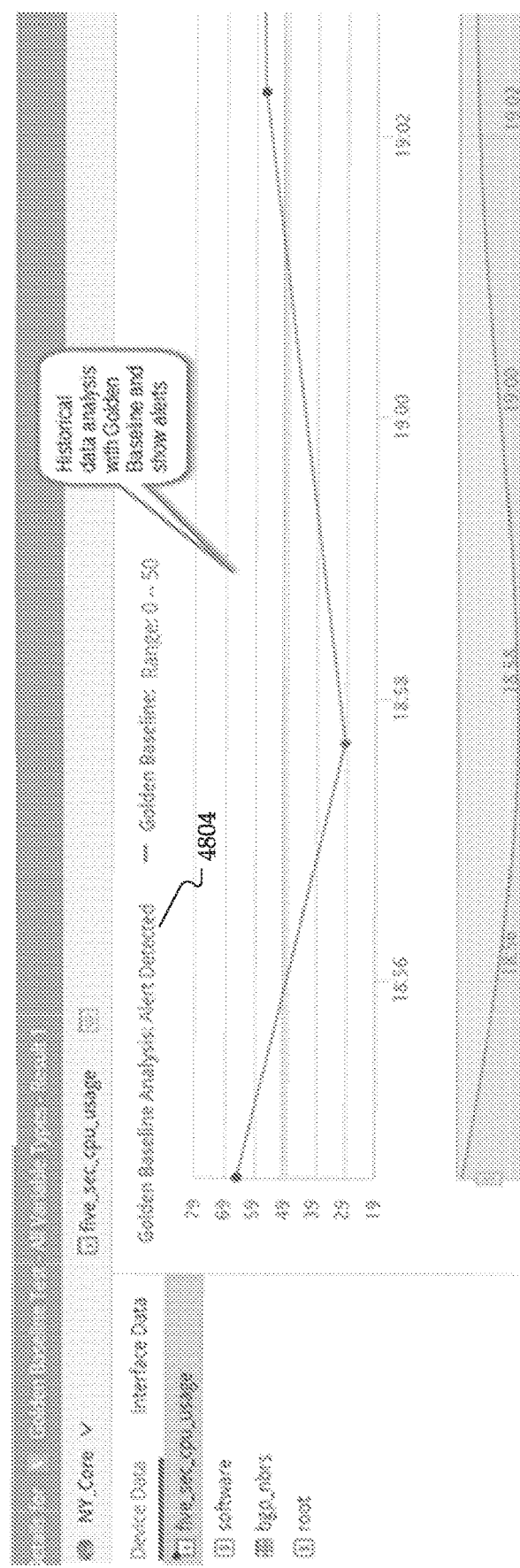

DATAVIEW DRILLDOWN MENU

PRIORITY

This application claims priority to Provisional Patent Application No. 62/859,097, filed on Jun. 8, 2019, entitled NETWORK MANAGEMENT WITH DYNAMIC DATA VIEW AND GOLDEN BASELINE, the entire disclosure of which is herein incorporated by reference.

BACKGROUND

In the modern computer age, businesses rely on an electronic network to function properly. Computer network management and troubleshooting is complex. There are thousands of shell scripts and applications for different network problems. The available, but poorly documented solutions, can be overwhelming for junior network engineers. Most network engineers learn troubleshooting through reading the manufacture's manual or internal documentation from the company's documentation department. But the effectiveness varies. For instance, the troubleshooting knowledge captured in a document can only be helpful if the information is accurate and if the user correctly identifies the problem. Many companies have to conduct extensive training for junior engineers. The conventional way for network troubleshooting requires a network professional to manually run a set of standard commands and processes for each of the devices. However, to become familiar with those commands, along with each of its parameters takes years of practice. Also complicated troubleshooting methodology is often hard to share and transfer. Therefore even though a similar network problem happens again and again, each instance of troubleshooting may still have to start from scratch. However, networks are getting more and more complex and it is increasingly difficult to manage it efficiently with traditional methods and tools.

Networks are getting more and more complex but network engineers still depend on the traditional methods and tools, such as the text-based command-line interface (CLI), to manage their networks. To troubleshoot a network problem or to simply verify if a network functions, a network engineer still needs to manually log in to each of the network devices and issue a CLI command to gather the data, manually parse and analyze each of the output for key data, and manually eliminate each of the possible problem causes. With text-based CLI as the primary method for troubleshooting a network problem, a network professional usually needs to repetitively execute the same CLI commands and decode key data from the command output many times for many network devices. This process is error-prone, strenuous and time consuming.

To further complicate this already tangled process, many vendors and models of network hardware devices that exist in today's network, are providing different sets of CLI commands which output many different formats of data information. It is difficult, if not impossible, for a network engineer to simplify this process by writing a simple executable program to retrieve, parse and analyze the output data of each of these different devices. It is even more challenging to require a network engineer to master a programming language in a short time, and apply such skills in a reliable manner. For managed service providers (MSP), improving the efficiency of their troubleshooting processes means reduced training cost and increased reliability in providing services to their customers.

SUMMARY

This disclosure relates generally to network management and graphic user interface (GUI) based automated procedures in network management. Specifically, network tasks may be automated and simplified based on an improved GUI that can dynamically retrieve and display dynamic network operating information.

In one embodiment, a dynamic data view template is used for improving network management. The embodiments may include a method for network management including generating a map displaying network devices and their connections, and providing an interface for defining a dynamic data view template. The definition of the dynamic data view template comprises associating one or more variables with one or more of the network devices or the connections. The method includes applying the dynamic data view template to the map, and modifying the map based on the application of the dynamic data view template to display the one or more variables with the associated one or more of the network devices or the connections. The displayed variables are selectable for displaying details about the associated one or more of the network devices or the connections related to the selected variable. Further embodiments include the interface providing an option for a static view rather than a dynamic view and providing an option for scheduling application of the dynamic data view template. The application of the dynamic data view template based on the scheduling. The application of the dynamic data view template can be interactive. The interface provides an option to append a note to at least one of the network devices or the connections and the note comprises a compound or compound overwrite note. The interface provides an option for establishing a condition under which the note is displayed. The interface provides an option to highlight at least one of the network devices or the connections. The interface provides an option for establishing a condition under which the highlight is displayed. The method further includes providing an option for a static data view that can modify the map for an individual one of the network devices or the connections.

In another embodiment, the dynamic data view template may include a method for displaying a map that includes network devices and connections of the network devices on the map, receiving a request for a dynamic data view template that can be applied to the map, receiving input variables and corresponding values as inputs for application of the dynamic data view template, applying, to the map, the dynamic data view template using the inputs and the corresponding values, and displaying modifications to the map from the application of the dynamic data view template. The modification to the map include displaying a data view detail pane with information about the input variables. The method further includes receiving a request for a static data view that comprises a display without live data, wherein the application of the dynamic data view template utilizes live data. The method further includes receiving a scheduling request for the dynamic data view template, wherein the application of the dynamic data view template is based on the scheduling request. The application of the dynamic data view template can use cached data or live data.

In another embodiment, the dynamic data view template may include a graphical user interface comprising a map displaying network devices and interfaces between each of the network devices, a data view template editor for creating a data view template based on qualifications or variables for modifying at least some of the network devices and the interfaces, and a data view template manager for displaying the qualifications or the variables for modifying at least some of the network devices and the interfaces. The application of the data view template modifies the map based on the qualifications or the variables. The data view template manager includes drill-down actions as part of the modification to the map.

In one embodiment, a drill-down menu for actions is used for improving network management. The embodiments may include a method for network management comprising displaying a map of network devices and connections between the network devices, associating one or more of the network devices or one or more of the connections with one or more drill-down actions, displaying each of the drill-down actions on the map at a location adjacent to the associated one or more network devices or the associated one or more connections, receiving a selection of one of the drill-down actions, and implementing a function provided by the selected drill-down action. The selection of the one of the drill-down actions further comprises a selection of the associated one or more network devices or the associated one or more connections. The function of the drill-down action is based on the selection of the associated one or more network devices or the associated one or more connections. The function is applied to the associated one or more network devices or the associated one or more connections. Each of the network devices is displayed as an icon on the map. The location at which the drill-down action is displayed comprises a link near the icon for the associated network device. The method includes receiving a condition upon which the drill-down action is applied, wherein the condition comprises one of always display, display upon an alert, or display upon selection of a particular variable.

In another embodiment, the drill-down actions may include a method comprising mapping one or more network devices and connections between those network devices, providing an interface for generating a data view template that includes pre-defined drill-down actions, receiving a selection from among the network devices or connections upon which to apply the pre-defined drill-down actions, applying the data view template to the mapping, and modifying the mapping to display the pre-defined drill-down actions. The display of the pre-defined drill-down actions comprises a selectable link. The selectable link is displayed adjacent to the selected network device or connection upon which the pre-defined drill-down action is applied. The display of the pre-defined drill-down actions is displayed as a recommended action for troubleshooting. The method includes receiving one or more input parameters for usage with the data view template application and for the pre-defined drill-down action.

In another embodiment, the drill-down actions may include a graphical user interface comprising a map displaying network devices and interfaces between the network devices, a data view template that includes a selection of drill-down actions associated with one or more of the network devices or one or more of the interfaces, and a display of the drill-down actions adjacent the associated one or more of the network devices or the one or more of the interfaces, wherein the display of the drill-down actions provides recommended actions for the end user. Application of the recommended actions provides further information displayed on the map. The data view template editor provides an option for establishing conditions upon which the drill-down actions are displayed. The conditions comprise always display, display upon an alert, or display upon selection of a particular variable. The alert comprises a golden baseline alert that occurs when current data varies from an established golden baseline for that data. The drill-down actions are displayed as selectable links. The network devices are displayed as icons for the map and the selectable links are adjacent a corresponding one of the icons.

In one embodiment, a single pane of glass function is provided for improving network management. The embodiments may include a graphical user interface comprising a map displaying network devices and interfaces between the network devices, a data view template that includes a selection of a single pane of glass action associated with one or more of the network devices or one or more of the interfaces, a single pane of glass action link that is displayed based on the association with the one or more of the network devices or the one or more of the interfaces, and a display, upon selection of the single pane of glass action link, of data for the associated network device or interface, wherein the data is displayed from a third party source related to the associated network device or interface. The single pane of glass action is one of a selection of drill-down actions. The third party is a manufacturer of the associated network device or interface. The data is retrieved from a website of the third party but displayed as part of the graphical user interface. The display is within a pane displayed for the map. The single pane of glass action link comprises references for one or more variables. The single pane of glass action link is displayed relative to an indication of the one or more variables.

In another embodiment, the single pane of glass function may include a graphical user interface for network management comprising a display of network devices on a map, wherein each of the network devices is displayed as an icon on the map, a list of drill-down actions adjacent a corresponding one of the network devices, wherein the drill-down actions for the corresponding network device apply to that corresponding network device, further wherein the drill-down actions are selectable for application to the corresponding network device, a single pane of glass option as part of the drill-down actions, and a display pane that displays third party information related to the corresponding network device upon selection of the single pane of glass option, wherein the display pane displays third party information from a plurality of third parties associated with different ones of the network devices. The third party comprises a manufacturer of the network device. The third party information comprises a website from the manufacturer. The single pane of glass option comprises a universal resource locator (URL).

In another embodiment, the single pane of glass function may include method of network management comprising mapping network devices and interfaces between the network devices, defining a single pane of glass link based on an association with at least one of the devices or interfaces and an association with at least one variable for that device or interface, receiving a selection of the single pane of glass link, retrieving, from a third party, additional information related to the associated device or interface, and providing a data view pane for displaying the additional information. The third party is related to the associated device or interface. The third party is a manufacturer of the associate device or interface. The additional information is from a web site of the third party. The data view pane displays information from a plurality of websites from a plurality of third parties. The data view pane is displayed relative to the mapping. The selection of the single pane of glass link is from a list of drill-down actions that can be applied to at least a subset of the network devices or the interfaces.

In one embodiment, a golden baseline comparison is provided for improving network management and network troubleshooting. The embodiment may include a graphical user interface comprising a map displaying network devices and interfaces between the network devices, a data view template that includes a golden baseline rule for a particular variable to be associated with one or more of the network devices or one or more of the interfaces, a display, upon application of the data view template, of live data for the particular variable as compared with a golden baseline data from the golden baseline rule for the associated one or more of the network devices or the one or more of the interfaces, and a golden baseline alert that is displayed when the live data does not meet the condition established by the golden baseline rule. The golden baseline alert comprises a notification to a user of the one or more of the network devices or the one or more of the interfaces for which the golden baseline rule was triggered. The golden baseline alert comprises a notification to a user of the variable for which the golden baseline rule was triggered. The golden baseline alert comprises highlighting an icon representing the one or more of the network devices or the one or more of the interfaces for which the golden baseline rule was triggered. The interface includes a data detail pane for the display of the live data relative to the golden baseline data. The particular variables comprises a variable type of number, string, or table. The golden baseline rule comprises an equals operation in which the golden baseline rule is for the live data to equal the golden baseline data. The golden baseline rule comprises a not equals operation in which the golden baseline rule is for the live data to not equal the golden baseline data. The golden baseline data is automatically generated based on tracking of the live data. The golden baseline data is changed automatically based on the tracking of the live data.

In another embodiment, the golden baseline includes a method for network troubleshooting comprising, receiving network data for a plurality of network devices in a network, calculating, automatically, a golden baseline rule for at least one of the network devices based on the received network data for that network device, comparing the network data for the at least one of the network device with the automatically calculated golden baseline rule, and triggering an alert for troubleshooting when the comparison fails the golden baseline rule. The triggering of the alert is specific to the at least one of the network devices which failed the golden baseline rule. The golden baseline rule establishes a golden baseline for the network data, wherein the comparison fails when the network data is outside of the golden baseline. The automatic calculation requires a minimum number of network data points. The minimum number of network data points depends on a type of variable associated with the network data. The golden baseline rule can be manually modified by a user. The golden baseline rule establishes a heathy state for the at least one of the network device. The network devices further comprise connections between the network devices.

In another embodiment, the golden baseline includes a method for network troubleshooting comprising receiving data for a network device, tracking the received data for the network device, establishing, automatically, golden baseline data based on the tracked data, comparing subsequently received data with the golden baseline data, and triggering an alert when the subsequently received data fails the comparison with the golden baseline data. The establishing comprises a golden baseline rule for parameters of the golden baseline data, wherein the failing of the comparison comprises when the subsequently received data does not match the golden baseline rule.

BRIEF DESCRIPTION OF THE DRAWINGS

The system and method may be better understood with reference to the following drawings and description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding parts throughout the different views.

FIG. 20 is an example screenshot of the data view detail pane for string data.

FIG. 21 is an example screenshot of the data view detail pane for table data.

FIG. 33 is an example screenshot showing available drill-down actions.

FIG. 42 is another example of screenshots for the definition of a single pane of glass (SPOG) URL.

FIG. 47 is an example screenshot for scheduling of a data view template (DVT) task.

FIG. 48 is an example screenshot of a golden baseline.

FIG. 53 is an example screenshot for defining a golden baseline within a map.

FIG. 57b is an example comparison screenshot showing changes from a golden baseline.

FIG. 59 is an example screenshot of setting a string golden baseline rule.

FIG. 60 is an example screenshot of setting a table golden baseline rule.

DETAILED DESCRIPTION

Figure 1:
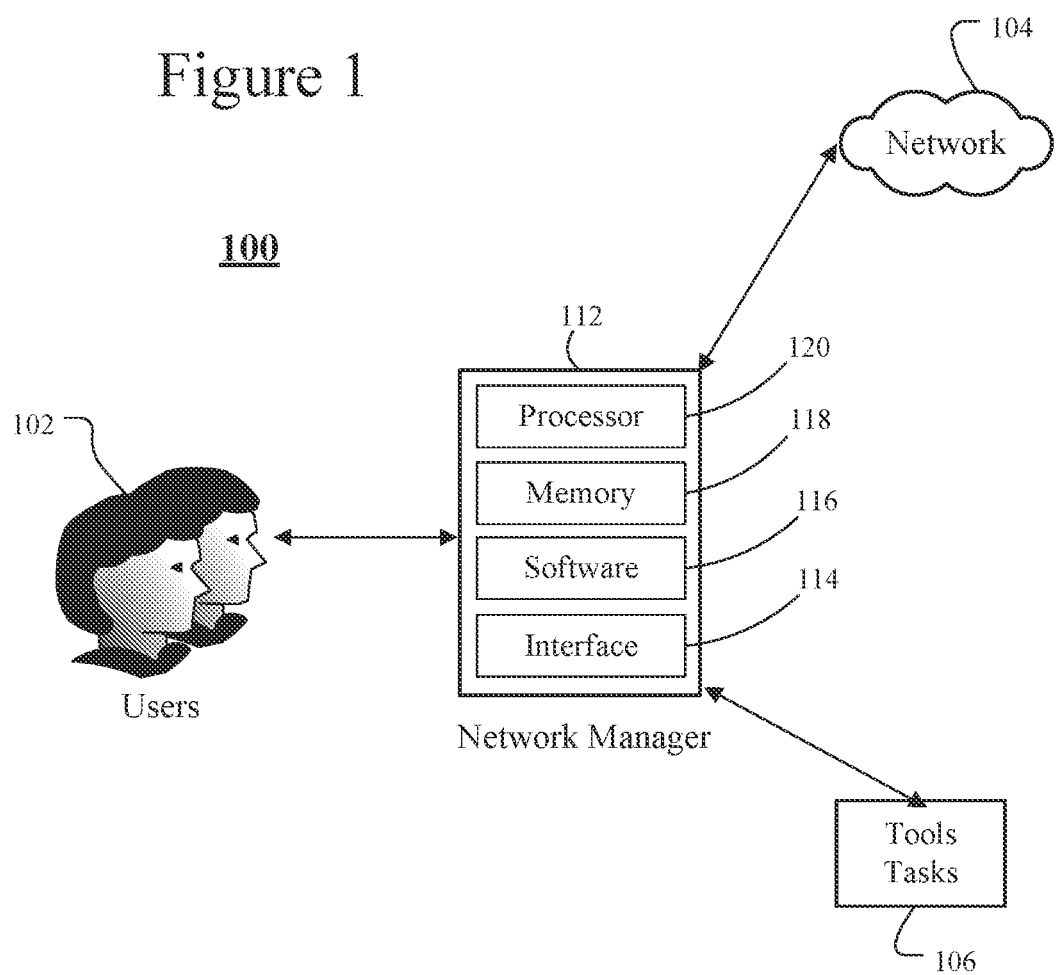
FIG. 1 illustrates a block diagram of an example network system.

By way of introduction, the disclosed embodiments relate to systems and methods for network management automation using a graphical user interface (GUI) for visualizing, interacting, and controlling network devices. The GUI provides management functionality based on a mapping of devices on the network. The management functionality may include troubleshooting a network problem and providing a GUI for standardizing computer network troubleshooting steps for reuse and knowledge transfer.

In a GUI-based system, a network structure may be represented with graphic features (icons, lines and menus) that represent corresponding features in a physical network in a map. Such visual representation liberates a network engineer from memorizing the standard or proprietary protocols and the tedious manual tasks of typing. The map system may be referred to as a Qmap and is further described with respect to U.S. Pat. Nos. 8,386,593, 8,325,720, and 8,386,937, the entire disclosure of each of which is hereby incorporated by reference.

GUIs are provided for users to write executable procedures without having any programming background. After a procedure is created, it can be run in connection with any network system. Troubleshooting with a proposed solution may just take a few minutes instead of hours or days traditionally. The troubleshooting and network management automation may be with the mapping of the network along with the NETBRAIN QAPP (Qapp) system. The Qapp system is further described with respect to U.S. Pat. Nos. 9,374,278, 9,438,481, U.S. Pat. Pub. No. 2015/0156077, U.S. Pat. Pub. No. 2016/0359687, and U.S. Pat. Pub. No. 2016/0359688, the entire disclosure of each of which is hereby incorporated by reference. GUIs, such as for troubleshooting, are further described in U.S. Ser. No. 16/374,374, filed Apr. 3, 2019, entitled "SYSTEM FOR CREATING NETWORK TROUBLESHOOTING PROCEDURE," the entire disclosure of which is hereby incorporated by reference.

The GUI system may access and display computer network data dynamically. Network data regarding network devices and interfaces are categorized and each device and/or data type is represented with a specific graphic element for data display and data accessing. This visual system may be referred to as Data View. The Data View system allows a user to view and access multi-layers of dynamic computer network data in correlation with different network management tasks. Data View is further described with respect to U.S. Pat. Pub. No. 2018/0018065, the entire disclosure of which is hereby incorporated by reference.

The term "Data View" may refer to the functionalities that allow users to create customized views of network data and display those views on a network map. Users can create multiple Data Views for each device. Each actual Data View may include the data that is selected for display, and the positons of that data within the display. The term "Data View Template" may refer to a template that is used to generate a Data View. Data View Templates can be created and dynamically customized for ongoing network automation. Data View Templates can be applied across any device(s) on the network to create a specific Data View for that device(s).

Reference will now be made in detail to exemplary embodiments of the invention, examples of which are illustrated in the accompanying drawings. When appropriate, the same reference numbers are used throughout the drawings to refer to the same or like parts. The numerous innovative teachings of the present application will be described with particular reference to presently preferred embodiments (by way of example, and not of limitation). The present application describes several inventions, and none of the statements below should be taken as limiting the claims generally.

For simplicity and clarity of illustration, the drawing figures illustrate the general manner of construction, and description and details of well-known features and techniques may be omitted to avoid unnecessarily obscuring the invention. Additionally, elements in the drawing figures are not necessarily drawn to scale, some areas or elements may be expanded to help improve understanding of embodiments of the invention.

The word 'couple' and similar terms do not necessarily denote direct and immediate connections, but also include connections through intermediate elements or devices. For purposes of convenience and clarity only, directional (up/down, etc.) or motional (forward/back, etc.) terms may be used with respect to the drawings. These and similar directional terms should not be construed to limit the scope in any manner. It will also be understood that other embodiments may be utilized without departing from the scope of the present disclosure, and that the detailed description is not to be taken in a limiting sense, and that elements may be differently positioned, or otherwise noted as in the appended claims without requirements of the written description being required thereto.

The terms "first," "second," "third," "fourth," and the like in the description and the claims, if any, may be used for distinguishing between similar elements and not necessarily for describing a particular sequential or chronological order. It is to be understood that the terms so used are interchangeable. Furthermore, the terms "comprise," "include," "have," and any variations thereof, are intended to cover non-exclusive inclusions, such that a process, method, article, apparatus, or composition that comprises a list of elements is not necessarily limited to those elements, but may include other elements not expressly listed or inherent to such process, method, article, apparatus, or composition.

The aspects of the present disclosure may be described herein in terms of functional block components and various processing steps. It should be appreciated that such functional blocks may be realized by any number of hardware and/or software components configured to perform the specified functions. For example, these aspects may employ various integrated circuit components, e.g., memory elements, processing elements, logic elements, look-up tables, and the like, which may carry out a variety of functions under the control of one or more microprocessors or other control devices.

Similarly, the software elements of the present disclosure may be implemented with any programming or scripting languages such as C, C++, Java, COBOL, assembler, PERL, Python, or the like, with the various algorithms being implemented with any combination of data structures, objects, processes, routines, or other programming elements. Further, it should be noted that the present disclosure may employ any number of conventional techniques for data transmission, signaling, data processing, network control, and the like.

The particular implementations shown and described herein are for explanatory purposes and are not intended to otherwise be limiting in any way. Furthermore, the connecting lines shown in the various figures contained herein are intended to represent exemplary functional relationships and/or physical couplings between the various elements. It should be noted that many alternative or additional functional relationships or physical connections may be present in a practical incentive system implemented in accordance with the disclosure.

As will be appreciated by one of ordinary skill in the art, aspects of the present disclosure may be embodied as a method or a system. Furthermore, these aspects of the present disclosure may take the form of a computer program product on a tangible computer-readable storage medium having computer-readable program-code embodied in the storage medium. Any suitable computer-readable storage medium may be utilized, including hard disks, CD-ROM, optical storage devices, magnetic storage devices, and/or the like. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

As used herein, the terms "user," "network engineer," "network manager," "network developer" and "participant" shall interchangeably refer to any person, entity, organization, machine, hardware, software, or business that accesses and uses the system of the disclosure. Participants in the system may interact with one another either online or off-line.

Communication between participants in the system of the present disclosure is accomplished through any suitable communication means, such as, for example, a telephone network, intranet, Internet, extranet, WAN, LAN, personal digital assistant, cellular phone, online communications, off-line communications, wireless network communications, satellite communications, and/or the like. One skilled in the art will also appreciate that, for security reasons, any databases, systems, or components of the present disclosure may consist of any combination of databases or components at a single location or at multiple locations, wherein each database or system includes any of various suitable security features, such as firewalls, access codes, encryption, de-encryption, compression, decompression, and/or the like.

A tool for understanding network behavior is through graphic visualization of the interactions between network devices. A computer-aided network engineering system with a network mapping and Data Views of that mapping can further enable automation in network troubleshooting. A user such as a network professional can follow a few steps to troubleshoot a network problem including mapping the problem area, probing from a network map, and comparing the current network state with a golden baseline.

In network troubleshooting, a network engineer may use a set of commonly used commands, methods, and tools, either standard or proprietary. For example, these commands, methods, and tools include the following items:

The Command Line Interface (CLI): network devices often provide CLI commands to check the network status or statistics. For example, in a Cisco IOS switch, the command "show interface" can be used to show the interface status such as input errors.

Ping: a simple tool used to check whether a device is reachable from another device. For example, after a network reconfiguration, it is normally a best practice to ping the main servers from the core network devices to ensure no major outage of key applications.

Traceroute: a tool to check the route from a device to a destination device. This tool is useful to troubleshoot a connectivity problem.

Configuration management: a tool used to find differences of configurations of network devices in a certain period. This is important since about half of the network problems are caused by configuration changes.

The term "Object" refers to the term used in computer technology, in the same meaning of "object oriented" programming languages (such as Java, Common Lisp, Python, C++, Objective-C, Smalltalk, Delphi, Java, Swift, C#. , Perl, Ruby, and PHP). It is an abstracting computer logic entity that envelopes or mimics an entity in the real physical world, usually possessing an interface, data properties and/or methods.

The term "Device" refers to a data object representing a physical computer machine (e.g. printer, router) connected in a network or an object (e.g. computer instances or database instances on a server) created by computer logic functioning in a computer network.

The term "Interface" refers to the set of logic objects or methods of a Device that are used to communicate with another Device or data object.

The terms "Q-map" or "Qmap" refers to a map of network devices created by the computer technology of NetBrain Technologies, Inc. that uses visual images and graphic drawings to represent topology of a computer network with interface property and device property displays through a graphical user interface (GUI). Typically, a computer network is created with a map-like structure where a device is represented with a device image and is linked with other devices through straight lines, pointed lines, dashed lines and/or curved lines, depending on their interfaces and connection relationship. Along the lines, also displayed are the various data properties of the device or connection.

The term "Qapp" refers to a built-in or user defined independently executable script or procedure generated through a graphical user interface as per technology available from of NETBRAIN TECHNOLOGIES, INC.

The term "GUI" refers to a graphical user interface and includes a visual paradigm that offers users a plethora of choices. GUI paradigm or operation relies on windows, icons, mouse, pointers and scrollbars to display graphically the set of available files and applications.

The term "Step" refers to a single independently executable computer action represented by a GUI element, that obtains, or causes, a network result from, or in, a computer network; a Step can take a form of a Qapp, a system function, or a block of plain text describing an external action to be executed manually by a user, such as a suggestion of action, "go check the cable." Each Step is thus operable and re-usable by a GUI operation, such as mouse curser drag-and-drop or a mouse clicking.

The term "modularized task-oriented standard procedure" refers to a set of Steps with in-between logic control to perform a computer network task. The task may be those operations commonly identified in the computer network management field. This term is also used interchangeably with the term "Runbook." A Runbook (RB) is a modularized task-oriented standard procedure saved to the present inventive system to be shared with other users.

FIG. 1 illustrates a block diagram of an example network system 100. The system 100 may include functionality for managing network devices with a network manager 112. The network system 100 may include a network 104 that includes any number of network devices (not shown) that are managed. The network 104 devices may be any computing or network device, which belong to the network 104, such as a data center or enterprise network. Examples of devices include, but are not limited to, routers, access points, databases, printers, mobile devices, personal computers, personal digital assistant ("PDA"), cellular phones, tablets, other electronic devices, or any network devices. The devices in the network 104 may be managed by the network manager 112.

The network manager 112 may be a computing device for monitoring or managing devices in a network, including performing automation tasks for the management, such as with a Qapp or by providing a Data View. In other embodiments, the network manager 112 may be referred to as just a Data View when generating a Data View for a user 102. The network manager 112 is further illustrated in FIG. 2 as Data View and may include any functionality provided by the generation of a Data View. The network manager 112 may include a processor 120, a memory 118, software 116 and a user interface 114. In alternative embodiments, the network manager 112 may be multiple devices to provide different functions and it may or may not include all of the user interface 114, the software 116, the memory 118, and/or the processor 120.

The user interface 114 may be a user input device or a display. The user interface 114 may include a keyboard, keypad or a cursor control device, such as a mouse, or a joystick, touch screen display, remote control or any other device operative to allow a user or administrator to interact with the network manager 112. The user interface 114 may communicate with any of the network devices in the network 104, and/or the network manager 112. The user interface 114 may include a user interface configured to allow a user and/or an administrator to interact with any of the components of the network manager 112. The user interface 114 may include a display coupled with the processor 120 and configured to display an output from the processor 120. The display (not shown) may be a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor 120, or as an interface with the software 116 for providing data.

The processor 120 in the network manager 112 may include a central processing unit (CPU), a graphics processing unit (GPU), a digital signal processor (DSP) or other type of processing device. The processor 120 may be a component in any one of a variety of systems. For example, the processor 120 may be part of a standard personal computer or a workstation. The processor 120 may be one or more general processors, digital signal processors, application specific integrated circuits, field programmable gate arrays, servers, networks, digital circuits, analog circuits, combinations thereof, or other now known or later developed devices for analyzing and processing data. The processor 120 may operate in conjunction with a software program (i.e. software 116), such as code generated manually (i.e., programmed). The software 116 may include the Data View system and tasks that are performed as part of the management of the network 104 including for the generation and usage of Data View functionality. Specifically, the Data View may be implemented from software, such as the software 116.

The processor 120 may be coupled with the memory 118, or the memory 118 may be a separate component. The software 116 may be stored in the memory 118. The memory 118 may include, but is not limited to, computer readable storage media such as various types of volatile and non-volatile storage media, including random access memory, read-only memory, programmable read-only memory, electrically programmable read-only memory, electrically erasable read-only memory, flash memory, magnetic tape or disk, optical media and the like. The memory 118 may include a random access memory for the processor 120. Alternatively, the memory 118 may be separate from the processor 120, such as a cache memory of a processor, the system memory, or other memory. The memory 118 may be an external storage device or database for storing recorded tracking data, or an analysis of the data. Examples include a hard drive, compact disc ("CD"), digital video disc ("DVD"), memory card, memory stick, floppy disc, universal serial bus ("USB") memory device, or any other device operative to store data. The memory 118 is operable to store instructions executable by the processor 120.

The functions, acts or tasks illustrated in the figures or described herein may be performed by the programmed processor executing the instructions stored in the software 116 or the memory 118. The functions, acts or tasks are independent of the particular type of instruction set, storage media, processor or processing strategy and may be performed by software, hardware, integrated circuits, firmware, micro-code and the like, operating alone or in combination. Likewise, processing strategies may include multiprocessing, multitasking, parallel processing and the like. The processor 120 is configured to execute the software 116.

The present disclosure contemplates a computer-readable medium that includes instructions or receives and executes instructions responsive to a propagated signal, so that a device connected to a network can communicate voice, video, audio, images or any other data over a network. The user interface 114 may be used to provide the instructions over the network via a communication port. The communication port may be created in software or may be a physical connection in hardware. The communication port may be configured to connect with a network, external media, display, or any other components in system 100, or combinations thereof. The connection with the network may be a physical connection, such as a wired Ethernet connection or may be established wirelessly as discussed below. Likewise, the connections with other components of the system 100 may be physical connections or may be established wirelessly.

Any of the components in the system 100 may be coupled with one another through a (computer) network, including but not limited to the network 104. For example, the network manager 112 may be coupled with the devices in the network 104 through a network or the network manager 112 may be a part of the network 104. Accordingly, any of the components in the system 100 may include communication ports configured to connect with a network. The network or networks that may connect any of the components in the system 100 to enable communication of data between the devices may include wired networks, wireless networks, or combinations thereof. The wireless network may be a cellular telephone network, a network operating according to a standardized protocol such as IEEE 802.11, 802.16, 802.20, published by the Institute of Electrical and Electronics Engineers, Inc., or WiMax network. Further, the network(s) may be a public network, such as the Internet, a private network, such as an intranet, or combinations thereof, and may utilize a variety of networking protocols now available or later developed including, but not limited to TCP/IP based networking protocols. The network(s) may include one or more of a local area network (LAN), a wide area network (WAN), a direct connection such as through a Universal Serial Bus (USB) port, and the like, and may include the set of interconnected networks that make up the Internet. The network(s) may include any communication method or employ any form of machine-readable media for communicating information from one device to another.

The network manager 112 acts as the operating system (OS) of the entire network 104. The network manager 112 provides automation for the users 102, including automated documentation, automated troubleshooting, automated change, and automated network defense. In one embodiment, the users 102 may refer to network engineers who have a basic understanding of networking technologies, and are skilled in operating a network via a device command line interface and able to interpret a CLI output. The users 102 may rely on the network manager 112 for controlling the network 104, such as with Data View functionality. The controlling may include tools 106 that are used by the network manager 112 or tasks 106 that are performed by or for the network manager 112. Exemplary tools may include Isolated FCAPS Tools, Many Data Islands, Inventory, Monitoring, Log Management, and/or Ticket Management. Exemplary tasks may include Documentation, Troubleshooting, Provision, Security, Compliance, and/or Application Support.

Figure 2:
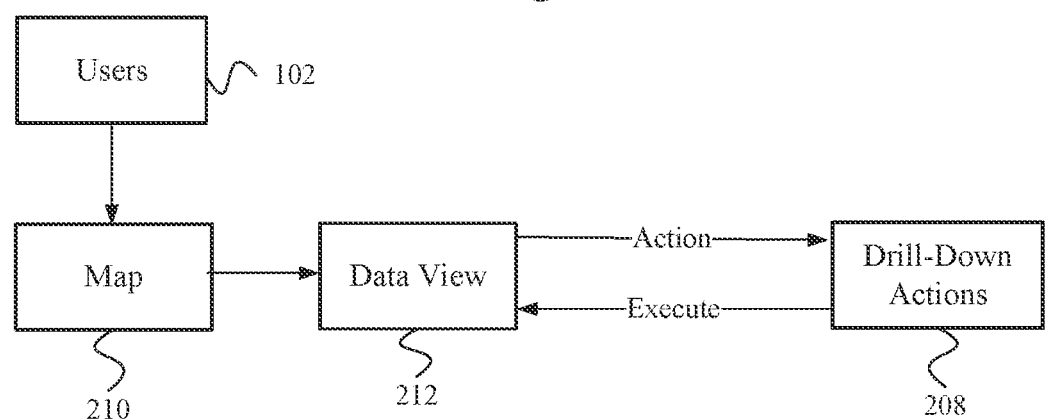
FIG. 2 illustrates a block diagram of an exemplary data view embodiment.

FIG. 2 illustrates a block diagram of an exemplary Data View 212 embodiment. As described above, the network manager 112 may generate a Data View 212 from a map 210 for usage and control by users 102. The users 102 may use the Data View 212 for further data collection and control of a network through a map 210. The map 210 may include a Qmap with network devices and their connections mapped. The Data View provides further data, control, and automation of those devices. Specifically, the Data View 212 may provide drill-down actions 208 for the users 102. The drill-down actions 208 are further discussed below and may include receiving an action request that is executed. The Data View 212 and its functions (including drill-down) is further discussed below, such as with respect to FIG. 4.

Figure 3:
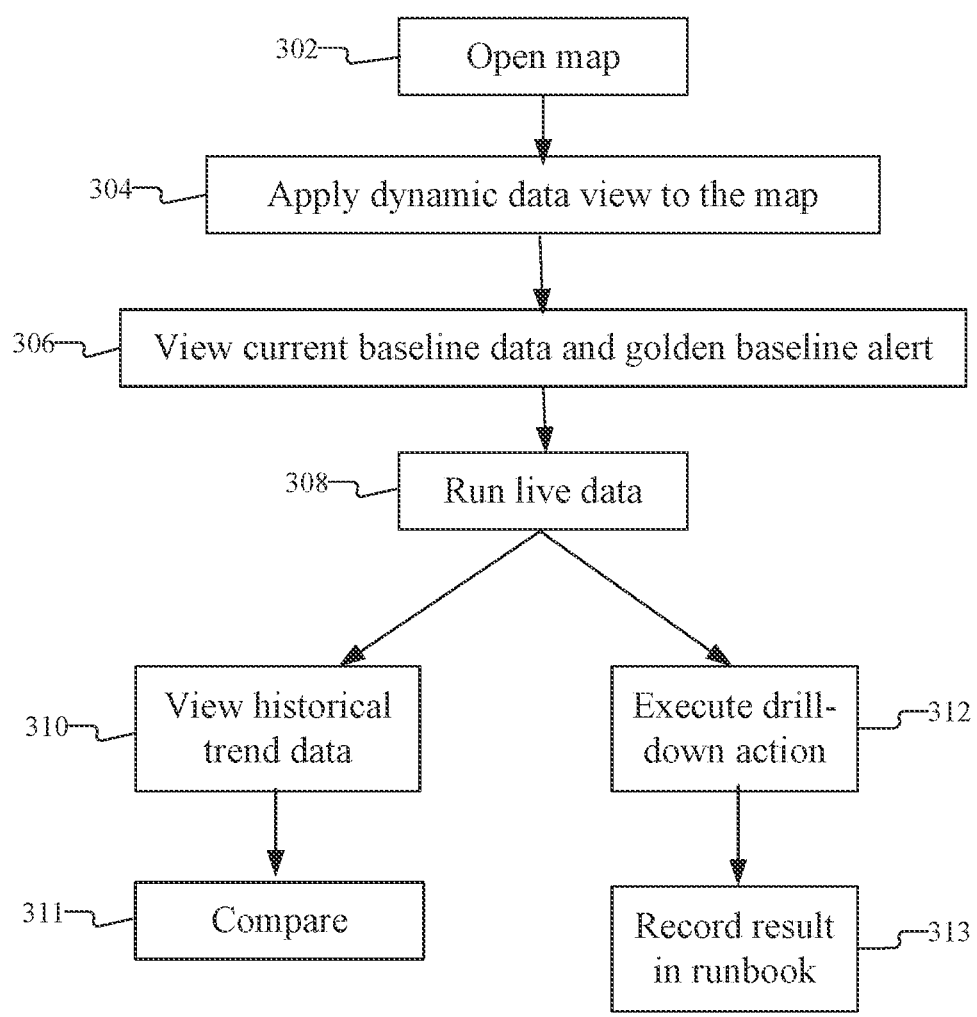
FIG. 3 is a flow chart of data view operation.

FIG. 3 is a flow chart of data view operation for end users. In block 302, a dynamic map of the network is opened. The map (e.g. a Qmap) may illustrate devices and their connections in a network. In block 304, a dynamic data view may be applied to the map. The dynamic data view is further described below but provides functions for network monitoring and automation. In block 306, a current baseline for a condition of the network or any of its devices is viewed and a golden baseline alert is set up. The golden baseline functionality is further described below at least with respect to FIGS. 48-64. In block 308, the data view can be set to run live data. In other words, the data view can receive dynamic, current data of the network and/or its devices. In other embodiments, the data view may be set to rely on static data (e.g. at a particular point in time) rather than dynamically updating with live data. Based on the live data, historical trend data can be viewed in block 310. The historical trend data can be compared in block 311 for identifying current or future network issues. In block 312, drill-down actions can be executed. Drill-down actions are further described and illustrated with respect to FIGS. 31-37. Based on the actions, the results may be recorded into a Runbook in block 313.

Figure 4:
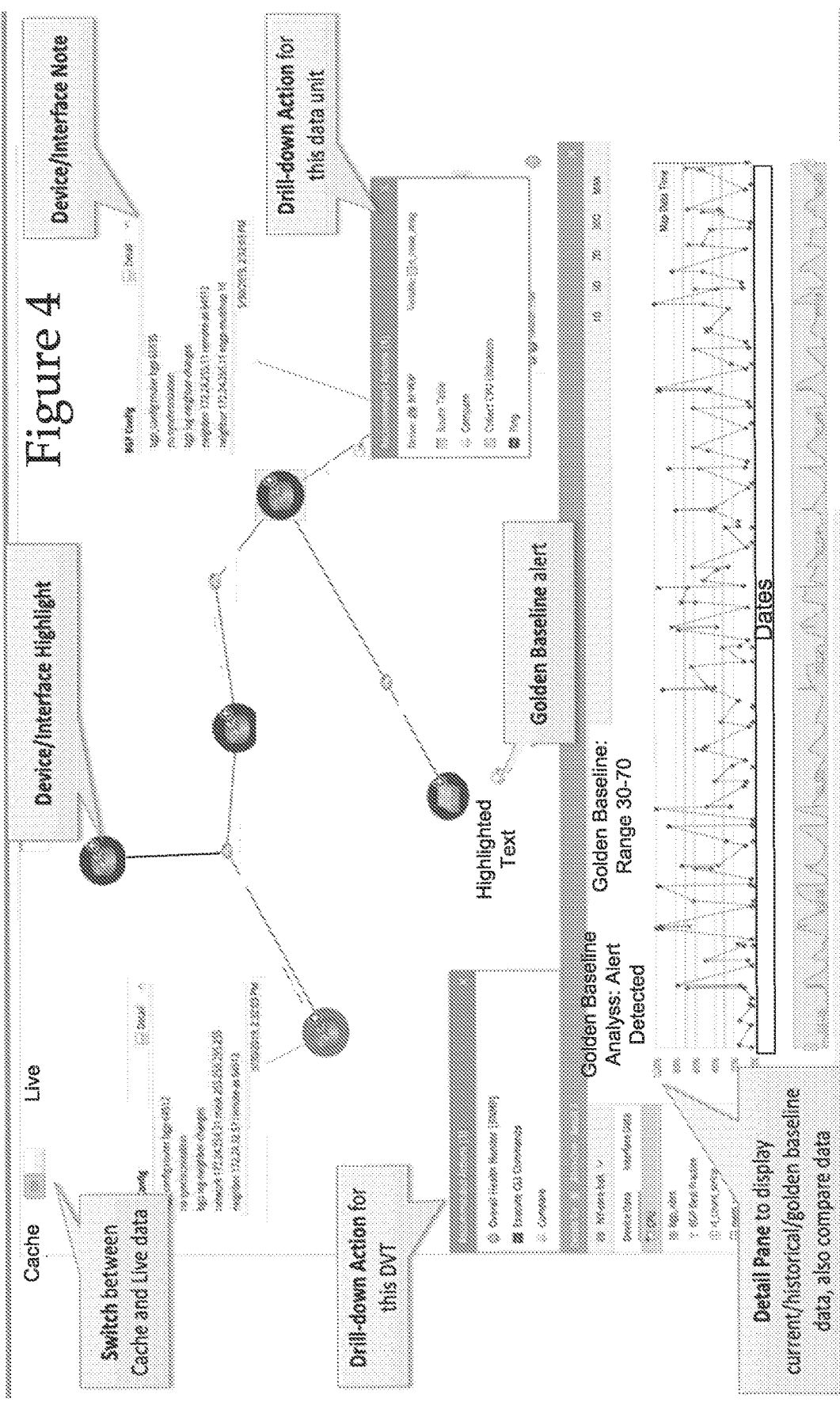
FIG. 4 is an example screenshot of a data view.

FIG. 4 is an example screenshot of a data view. FIG. 4 is the visualization of various dynamic data by showing functionality of the Data View. FIG. 4 is the visualization of various dynamic data by applying different Data View Templates (DVT) to a map. The Data View adds capabilities to analyze and compare data, including historical data, such as with a golden baseline (discussed below) and prompt alerts. In addition, drill-down actions related to selected data can be recommended to further automate troubleshooting process. All these processes and results can be documented in a Runbook for archive and collaboration. The Data View allows the user to view more data on a dynamic map and to take next-step actions.

Functions or capabilities shown in FIG. 4 include: 1) displaying a single Data View on a map at one time; 2) comparing cache data and live data with a golden baseline while applying the data view template (DVT) automatically; 3) displaying a golden baseline alert on the map and detail pane; 4) displaying the history data in detail pane; 5) supporting the comparison of specific historical data; 6) executing drill-down actions; 7) highlighting the device/ interface; and 8) displaying device/interface notes. Action results may be saved in a Runbook automatically. There may be historical data displayed from any time, including cache data that may be from a particular time or may be the latest data stored in the system, while the live data is current data. The detail pane displays data, including current, historical, and/or golden baseline data for comparison. The data may be for any particular device, group of devices, connection, or other attribute of the network.

Figure 5:
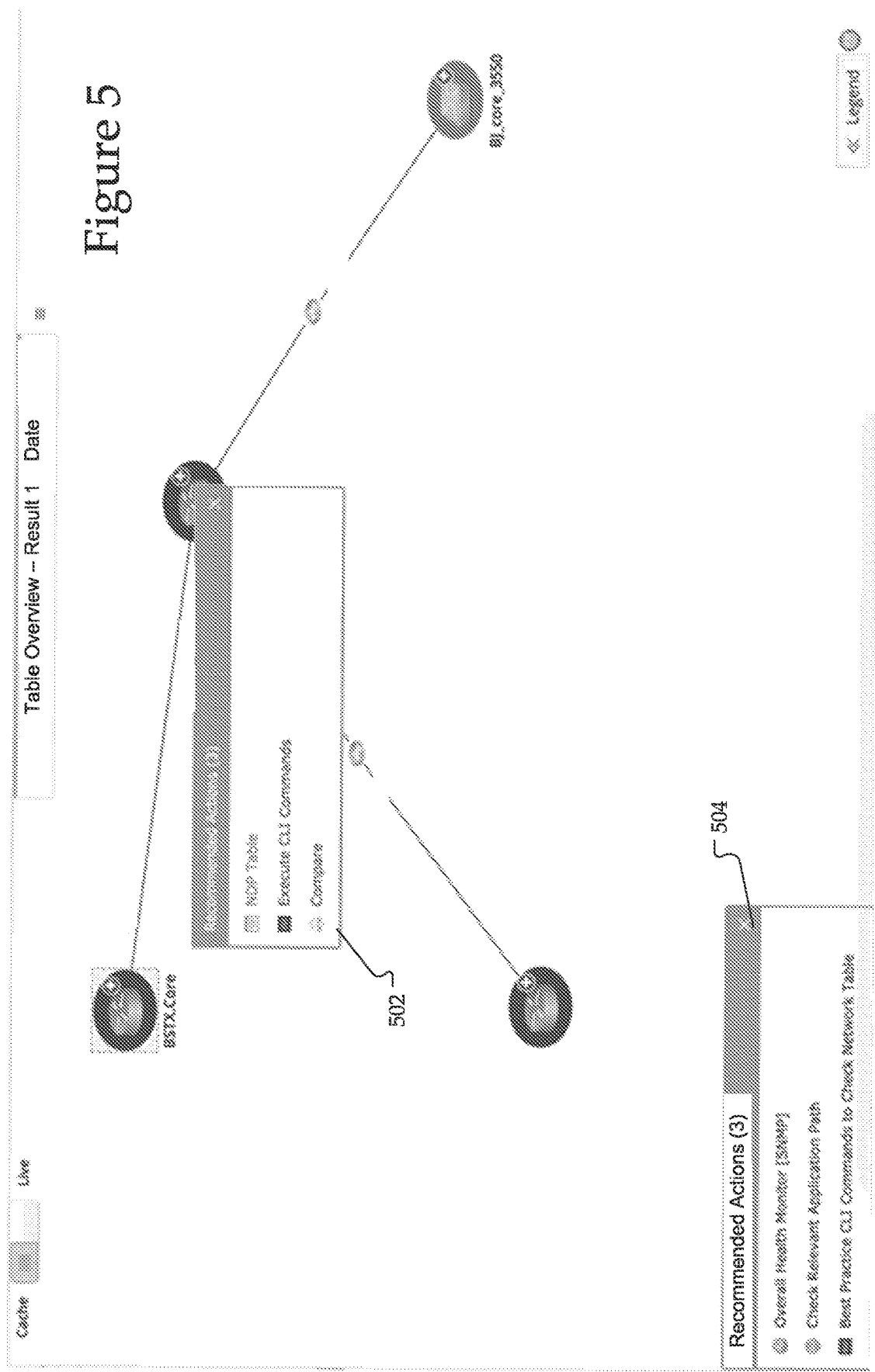
FIG. 5 is an example screenshot of a data view template.

FIG. 5 is an example screenshot of a map for opening data view template (DVT). FIG. 5 illustrates four devices that mapped and illustrates a first recommended action pane 502, which is a set of drill-down actions for one of the devices. The drill down actions for the first recommended action pane 502 include: 1) NDP Table; 2) Execute CLI Commands; and 3) Compare. Likewise, a second recommended action pane 504 is set of different drill-down actions for all devices on map. The drill down actions for the second recommended action pane 504 include: 1) Overall Health Monitor; 2) Check Relevant Application Path; and 3) Best Practice CLI Commands to Check Network Table.

Figure 6:
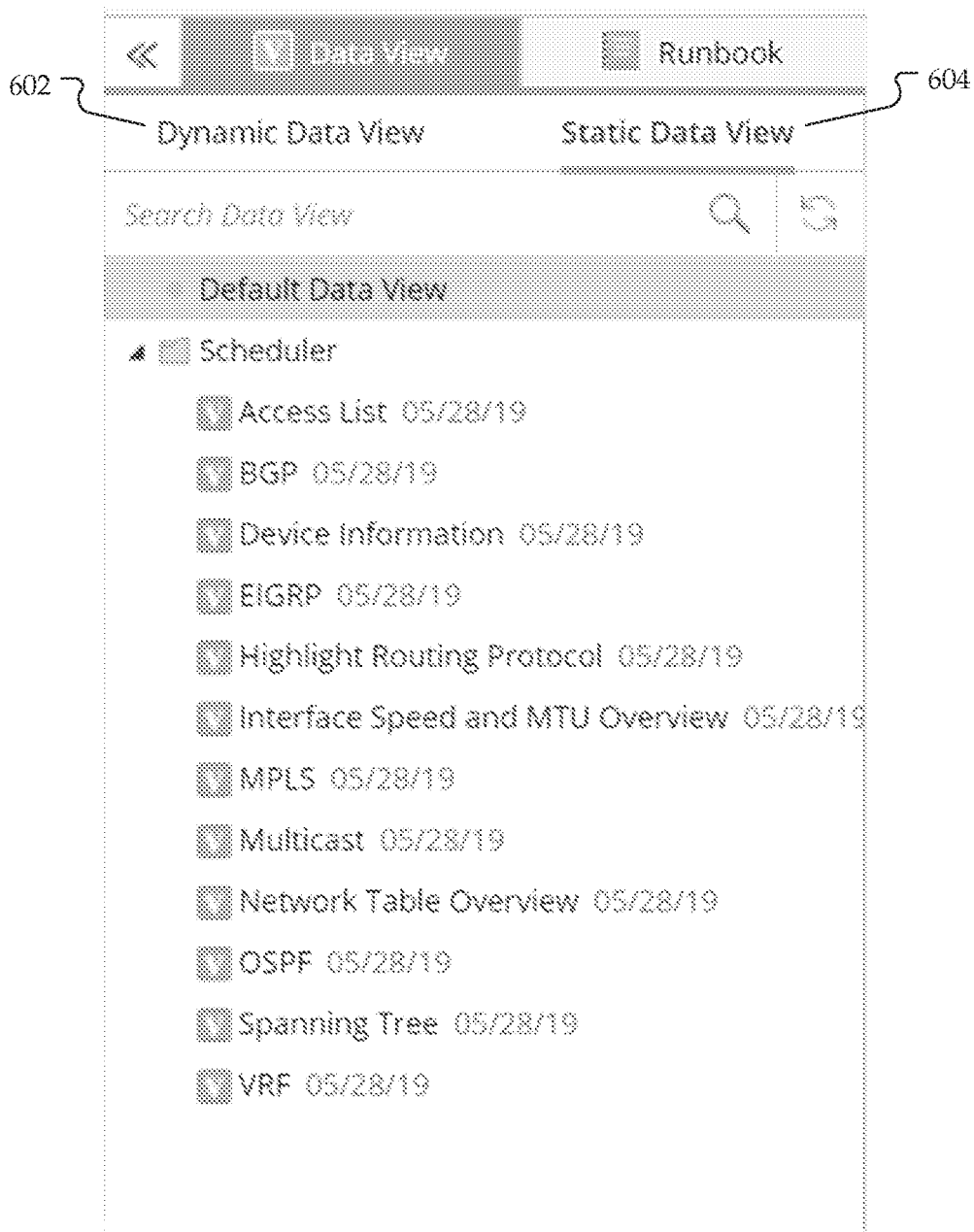
FIG. 6 is an example screenshot of a menu for data view selection.

FIG. 6 is an example screenshot of a menu for data view selection. The menu has Data View selected at the top and the user can then choose between Dynamic Data view 602 and Static Data View 604. The Static Data View 604 is further described an illustrated with respect to FIG. 7.

The Data View may be referred to as dynamic by providing one or more DVTs, which organize device and interface data based on a network technology or a troubleshooting scenario. When users open a map, DVTs may be qualified by the target device(s) on the map and only the applicable DVTs are listed in the display panes 602, 604. Specifically, panes 602, 604 show different DVTs for different devices. Users can select a proper DVT to apply according to the actual troubleshooting task. DVT supports the qualification definition, such as using "configuration contains "router bgp" and "Device Type equals to Cisco Router and Cisco IOS Switch" as filter conditions. Thus, a DVT may only run on qualified devices, which makes applying DVT more accurate and efficient. The data displayed on a map after applying a DVT may be the last data retrieved or collected. However, in some embodiments, the data may be retrieved from the live network. For example, to control the source for retrieved data, the data for applying a DVT for a single pane of glass (SPOG—discussed below) may need to be retrieved from the third-party system instantly.

Figure 7:
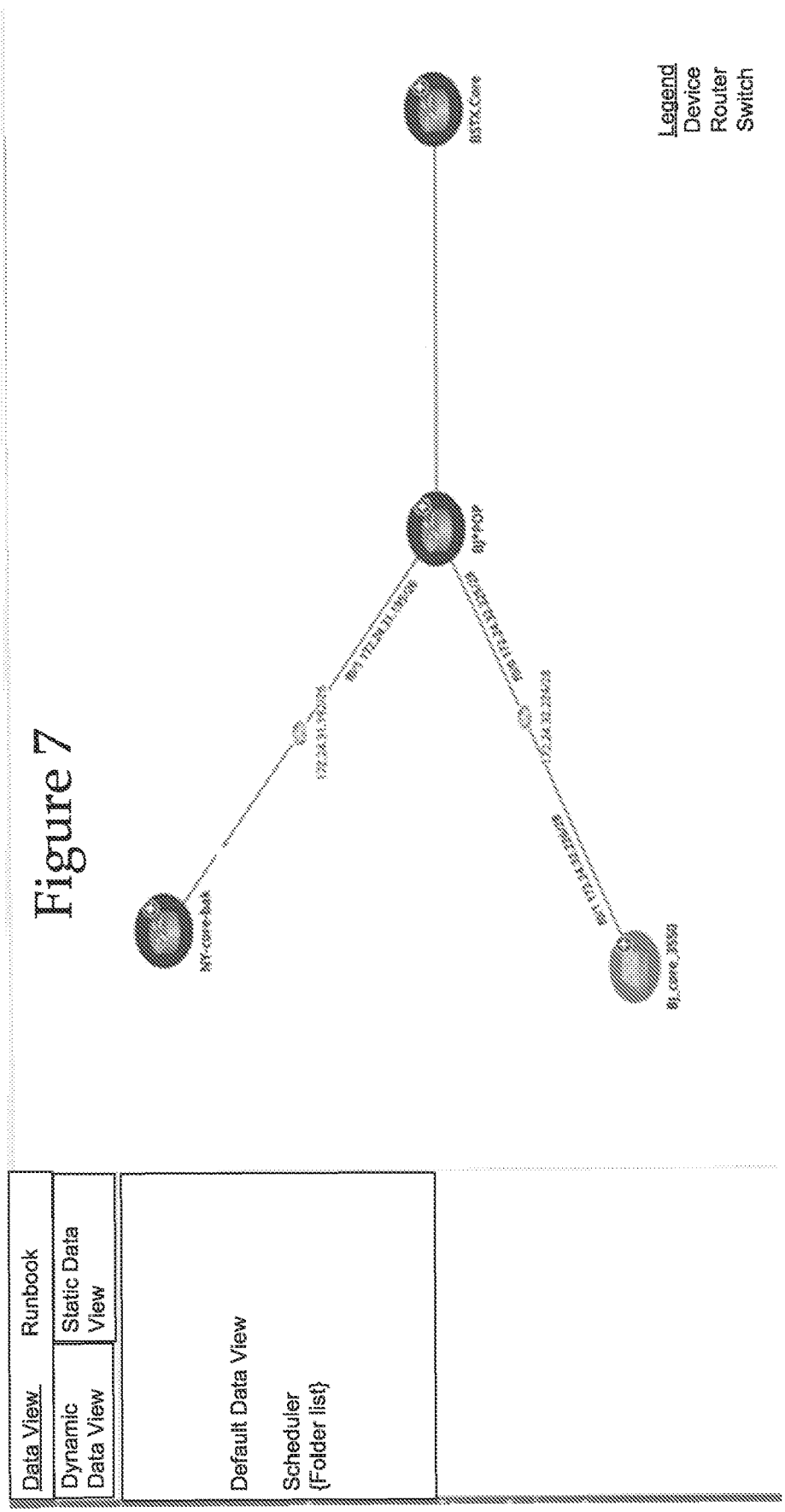
FIG. 7 is an example screenshot of a static data view.

FIG. 7 is an example screenshot of a static data view. The static data view is for devices on maps that are displayed when users open maps. Users can then select specific static data views to apply according to the actual tasks. A static data view is generated by applying a DVT and saving the DVT as a static data view, or by applying a Map Data View and saving it as a static data view. The static data view can be edited. A static data view can be generated by scheduled application of Qapps or Gapps. The static data view is effective within the current domain of the network as long as the qualified devices are displayed on a map.

Figure 8:
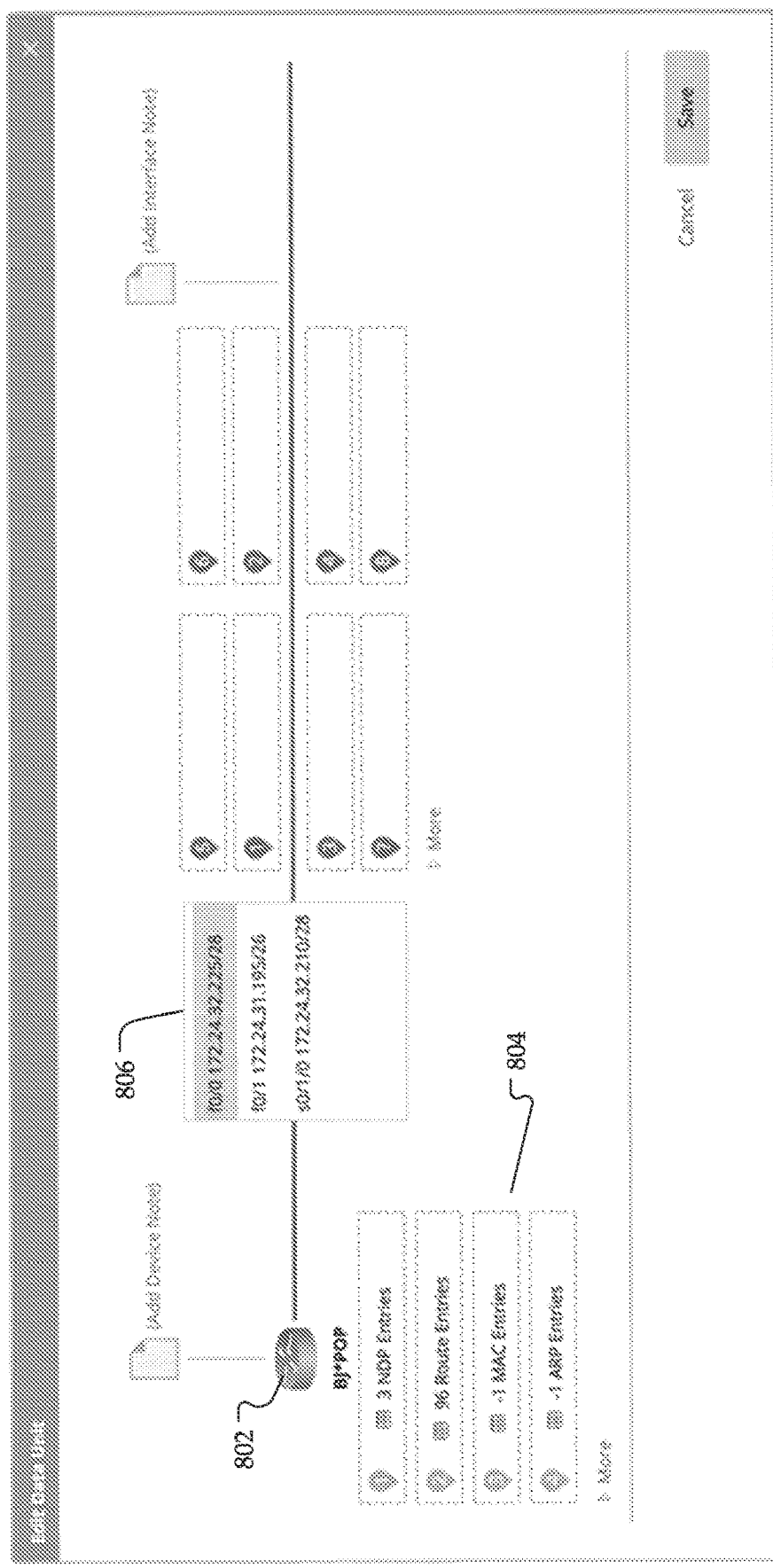
FIG. 8 is an example screenshot for editing a data view.

FIG. 8 is an example screenshot for editing a data view. The data view for device 802 can be edited. Specifically, the static data view can be modified. Device 802 may be related to multiple the static data views 804, and each of them may record the device data 806 for a certain scenario. To make the static data view record and present this information, users can manually edit the data in the static data views or add more data to them to document and share the device data.

Figure 9:
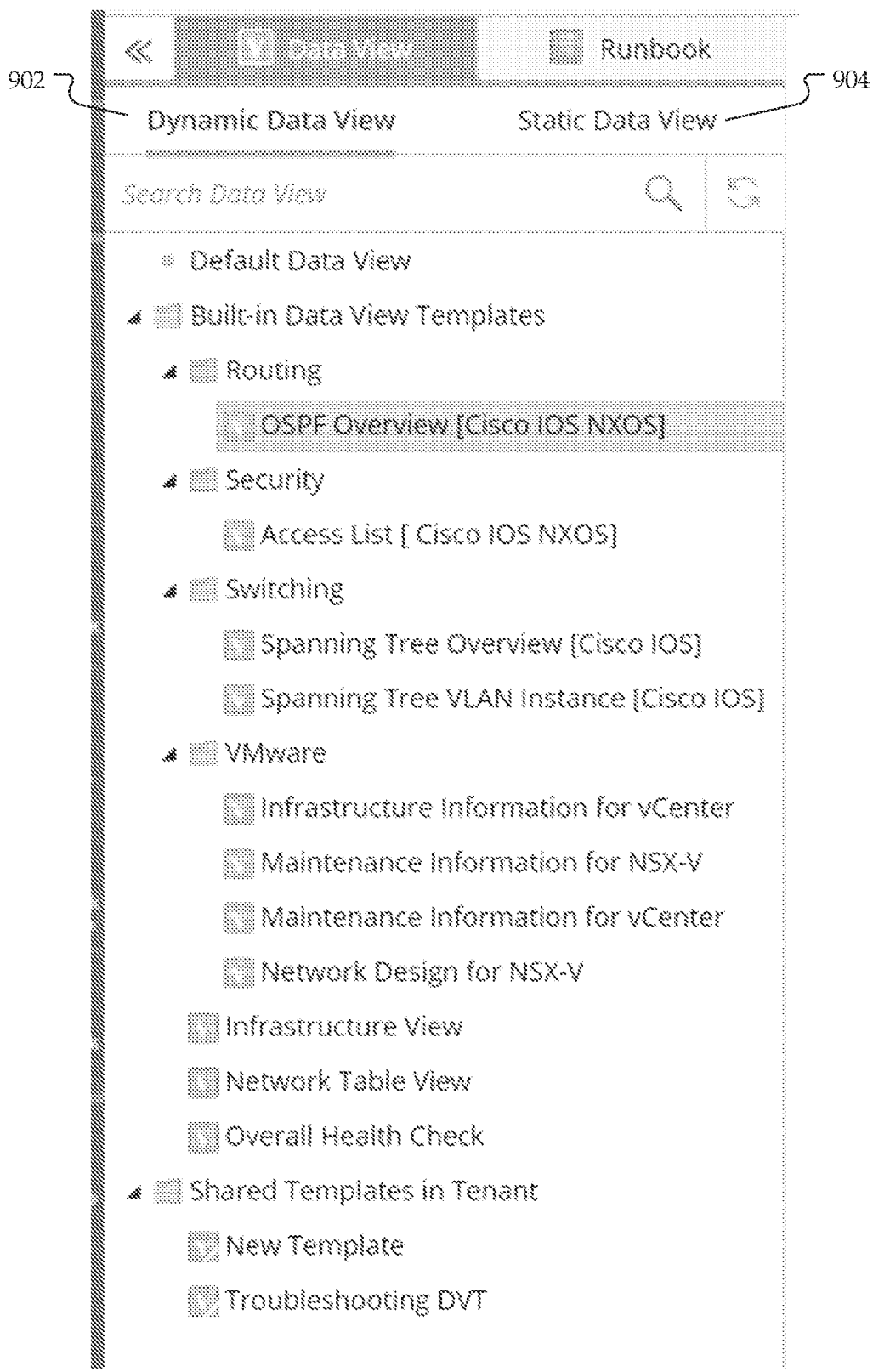
FIG. 9 is an example screenshot of a menu for data view selection.

FIG. 9 is an example screenshot of a menu for data view selection. Similar to FIG. 6, the screenshot presents a menu for selection of Data View that allows for a static data view 904 and dynamic data view 902. Dynamic data view 902 is selected so that a dynamic data view can be viewed. Dynamic data view 902 can display the latest cached data or live data, golden baseline alerts, and/or historical data on map and detail pane.

Figure 10:
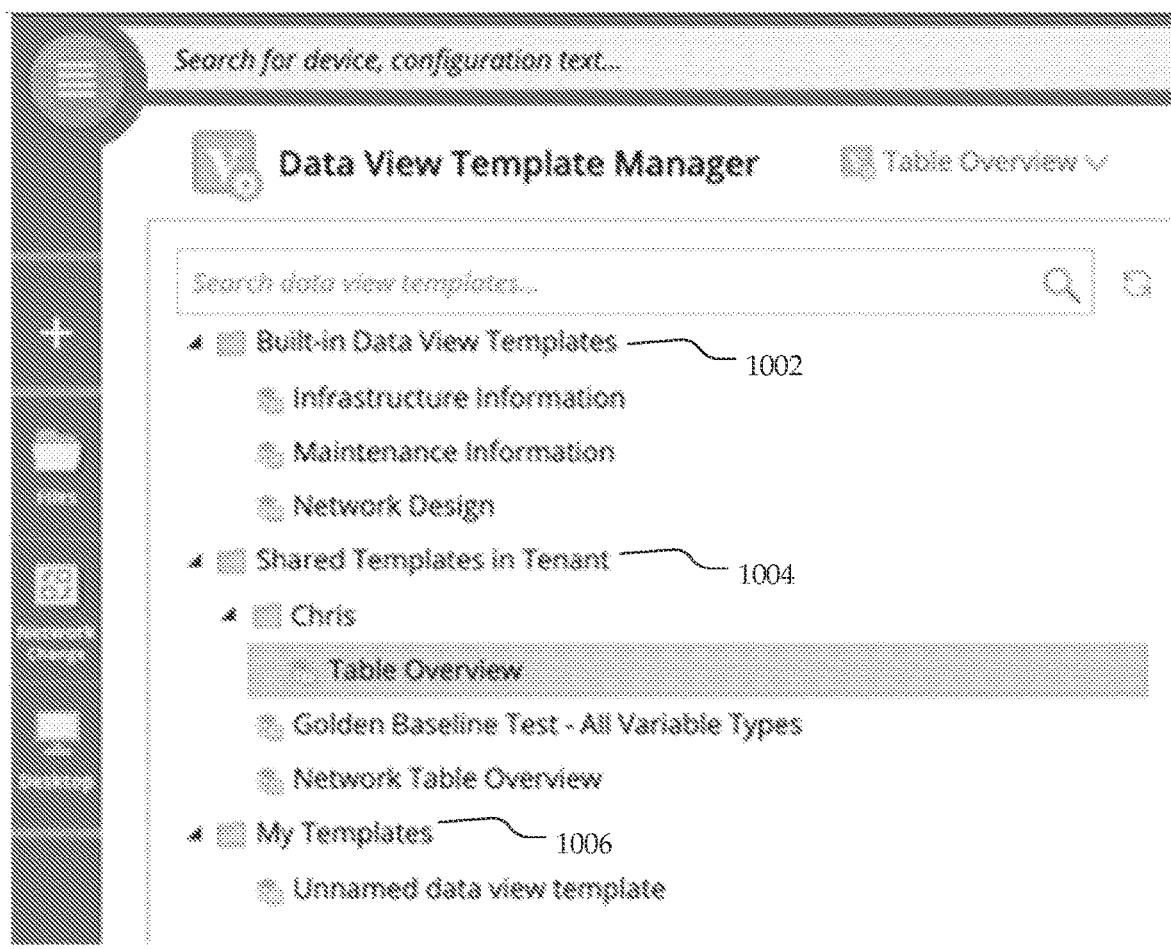
FIG. 10 is an example of a partial screenshot of a data view template manager.

FIG. 10 is an example of a partial screenshot of a data view template manager. The data view template (DVT) manager organizes data view templates. The DVT manager includes built-in data view templates 1002, shard templates 1004, and user specific templates 1006. The built-in templates 1002 may be default templates. The shared templates 1004 may be shared with other users across the same network or may even be available to all users of different networks (i.e. the DVT are shared to the cloud for access by many to improve the network manager 112. Data View Templates may be defined, modified and deleted in the data view template manager. The manager not only provides many built-in DVTs 1002, but also allows users to customize the definitions of DVTs, including data types, notes, highlights, and drill-down actions as further described below.

Figure 11:
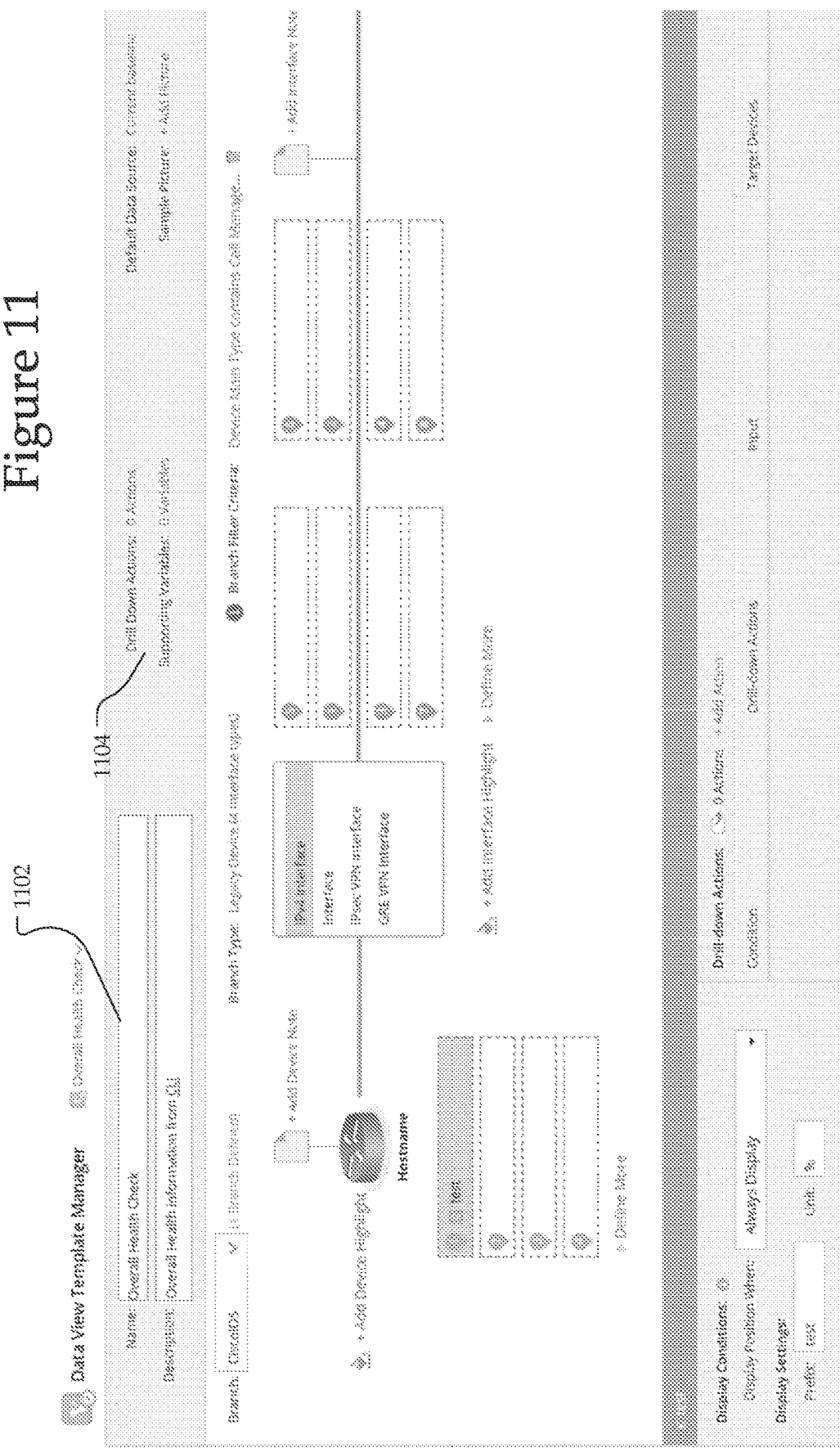
FIG. 11 is another example screenshot of a data view template manager.

FIG. 11 is another example screenshot of a data view template manager. The DVT 1102 in FIG. 11 is named Overall Health Check. In the DVT manager, the user can select the DVT and then modify parameters or variables (e.g. drill down actions or supporting variables 1104) for that DVT before applying it. When a DVT is applied, the system may retrieve data from the data engine or live network based on the pre-defined data source in a DVT and display it on the map. The displayed data can be the data on the device or interface positions, and may include notes or highlights for the devices or interfaces. A golden baseline alert may be shown if there is a deviation between the displayed data and golden baseline. The pre-defined drill-down actions for DVT and data unit may also be displayed.

Figure 12:
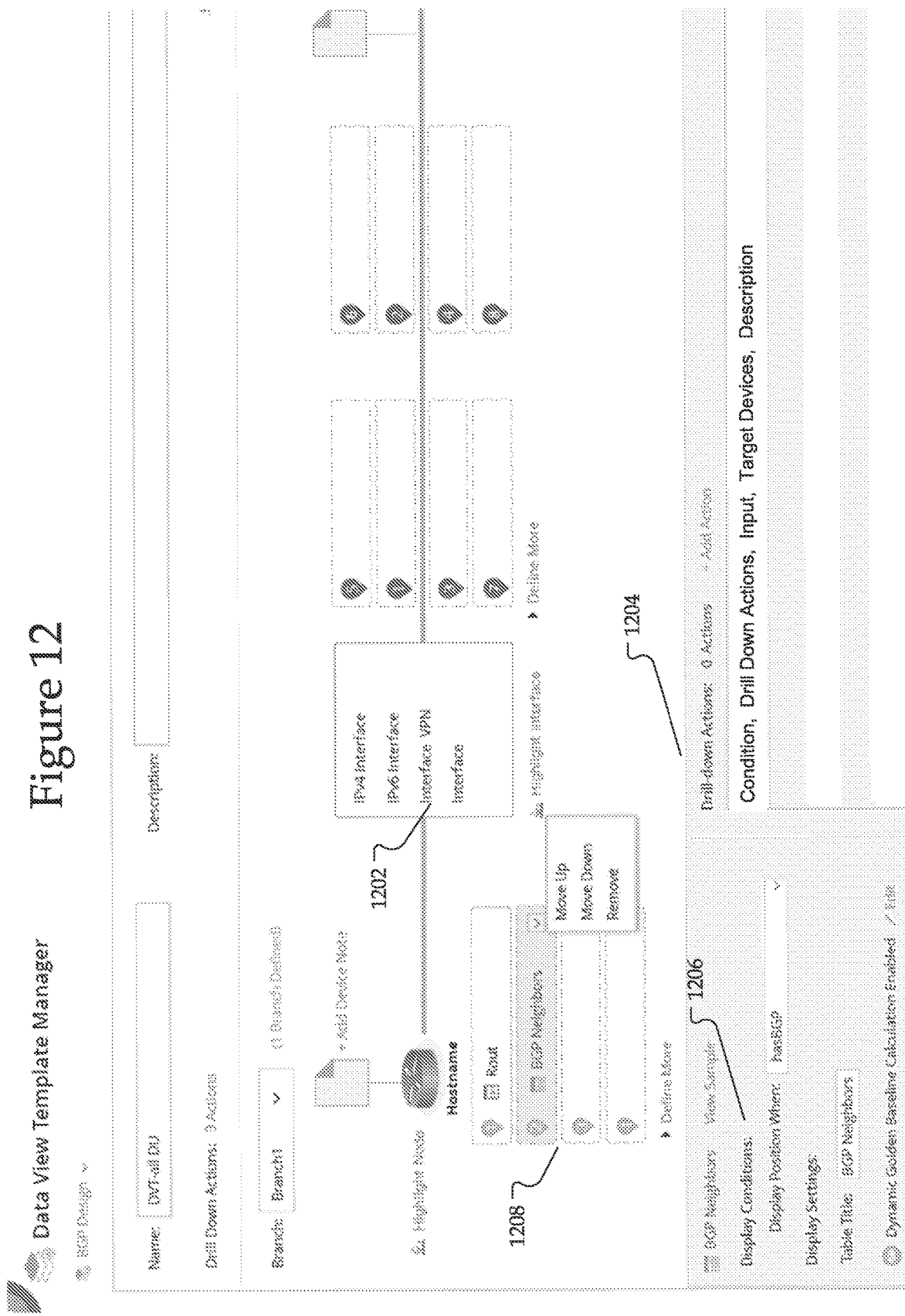
FIG. 12 is another example screenshot of a data view template manager.

FIG. 12 is another example screenshot of a data view template manager. A dynamic data may include variables 1202 (e.g. from built-in and CLI command parser library) and/or compound variables from these variables, as well as the position where the variables are displayed. The drill down actions 1204 recommended for each variable may also be included. There may be a visual alert 1206, such as a condition to highlight devices and/or interfaces. There may be a dialog box or pane 1208 for input variables.

Figure 13:
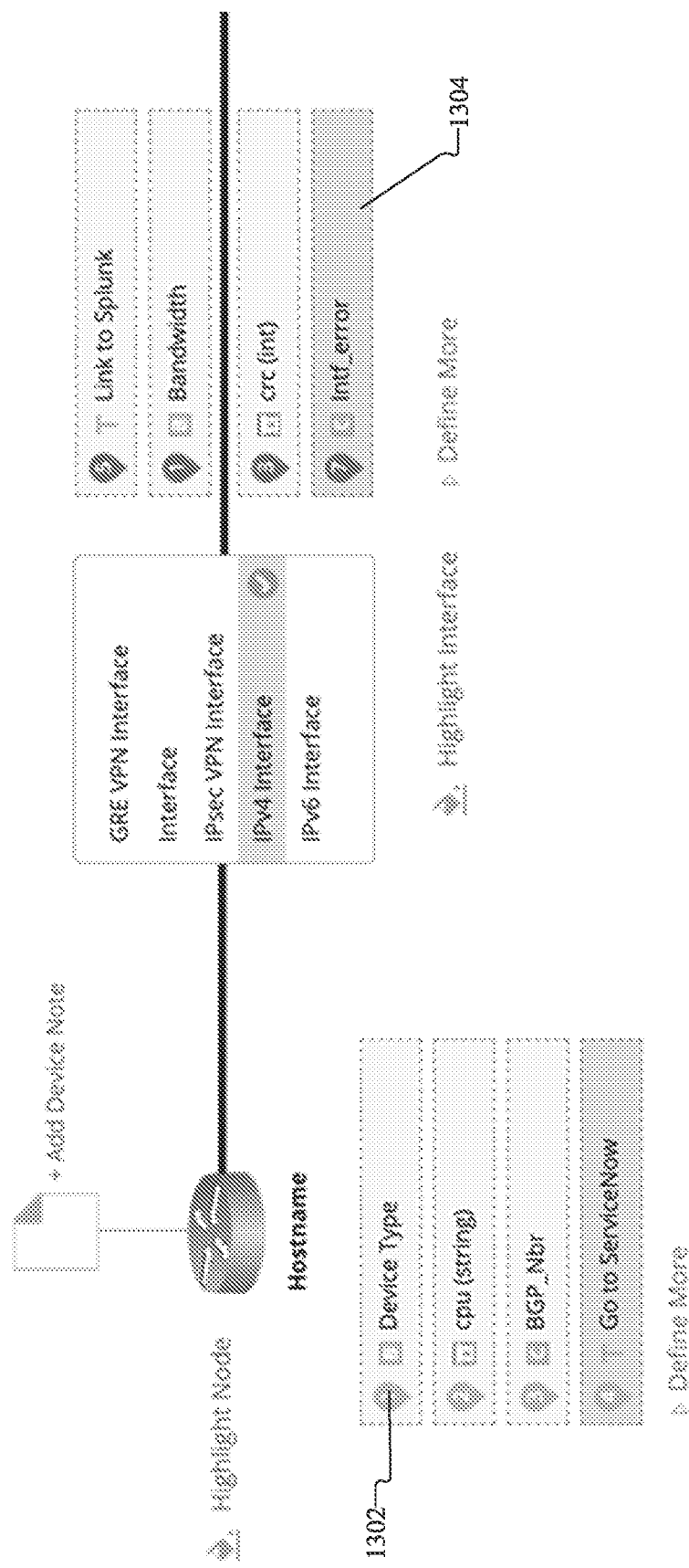
FIG. 13 is an example screenshot of variable definition.

FIG. 13 is an example screenshot of variable definition. In one embodiment for DVT definition, users can select data to add to four positions at the device level 1302 and eight positions at the interface level 1304. More positions can be expanded if more data should be visualized. Exemplary types of data that can be displayed on the above positions include Built-in Data (GDR Property), CLI/SNMP/API/Configuration Parser Variable, Compound Variable, Input Variable, and/or Text.

Figure 14:
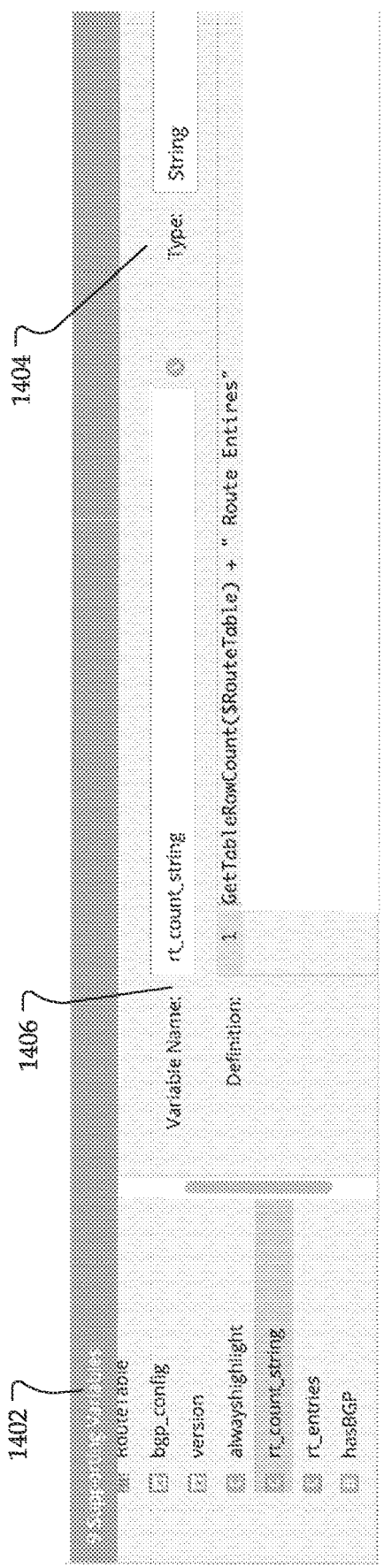
FIG. 14 is an example screenshot for defining a data view template.

FIG. 14 is an example screenshot for defining a data view template. The DVT may be editable and support different variables 1406 and data types 1404. Supporting variables 1402 may include different data types 1404 other than string as further discussed below.

Figure 15:
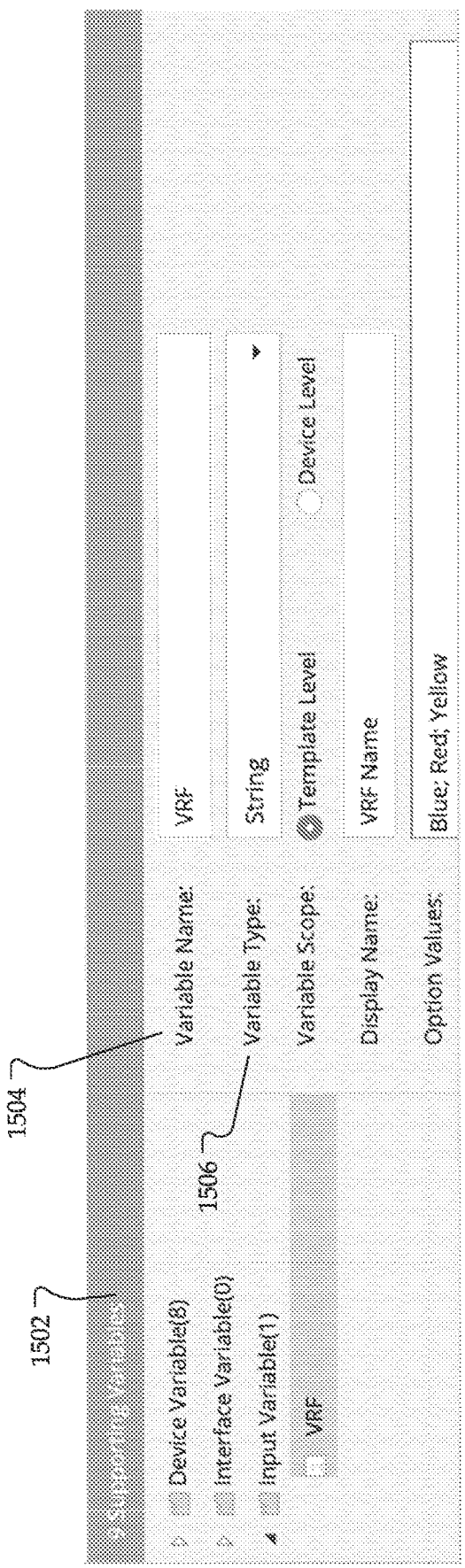
FIG. 15 is another example screenshot for defining a data view template.

FIG. 15 is another example screenshot for defining a data view template. As with FIG. 14, the supporting variables 1502 can be added and may include Input Variables as shown in FIG. 15. Upon application of a DVT, a user may input a specific value as input to apply the DVT. Some of the DVTs allow users to interactively input a value to generate an expected data view, such as inputting a specific VRF name or select an existing pre-defined VRF 1504 name from "Blue; Red; Yellow". The variable type 1506 can be changed and FIG. 15 illustrates a string type.

Figure 16:
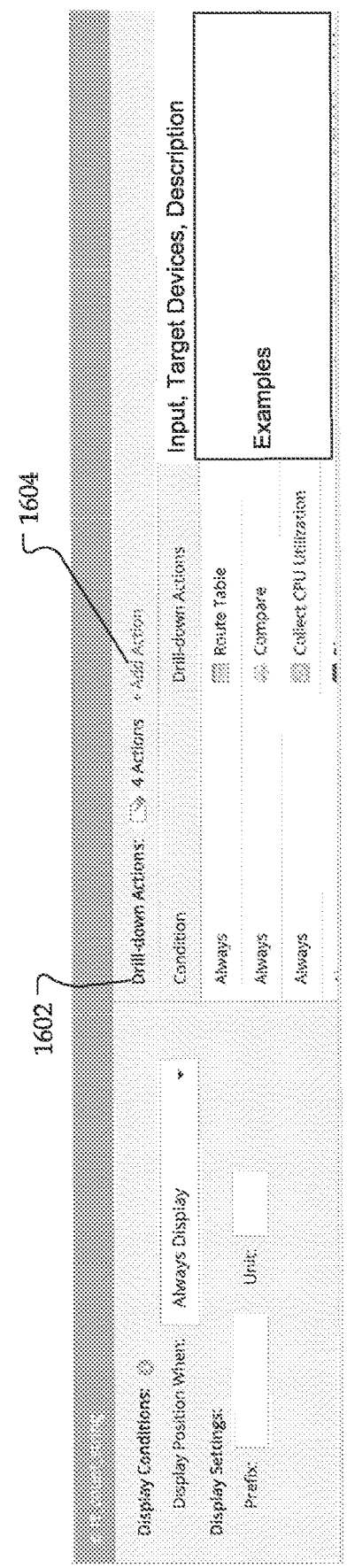
FIG. 16 is another example screenshot for defining a data view template.

FIG. 16 is another example screenshot for defining a data view template. The DVT may include drill-down actions 1602. FIG. 16 illustrates four drill-down actions, but provides functionality for adding more actions 1604. The drill-down action may include conditions and/or be scripted, which includes DVT level drill-down action and data unit level drill-down action. There may be support for using the supporting variables as inputs for the drill-down actions execution. The target device can be controlled by variables. In one embodiment, there may be fourteen types of drill-down actions as described with respect to FIG. 33. The drill-down actions and execution results may be saved in the Runbook automatically.

Figure 17:
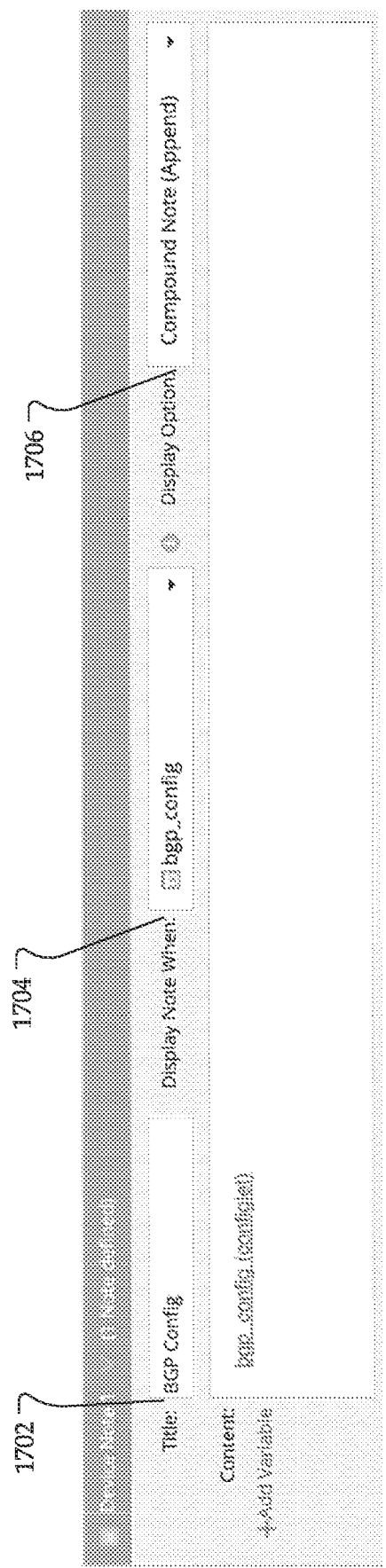
FIG. 17 is an example screenshot for defining a note for a data view.

FIG. 17 is an example screenshot for defining a note for a data view. The note may include a title 1702. There may be conditions 1704 under which the note is displayed. The note may be displayed with different options 1706, including an individual device note or a compound note.

Figure 18:
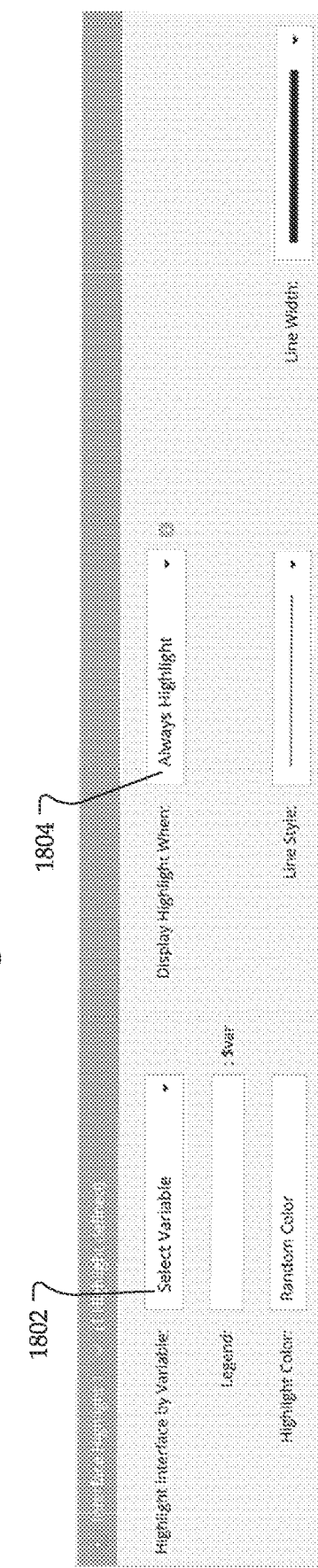
FIG. 18 is an example screenshot for defining a highlight for a data view.

FIG. 18 is an example screenshot for defining a highlight for a data view. A selected variable 1802 can be highlighted in the map. There may be a condition 1804 upon which the highlight is displayed. The conditions may include supporting variables (e.g. string, number, table, etc.). There are options for highlight color, line style, and line width.

Figure 19:
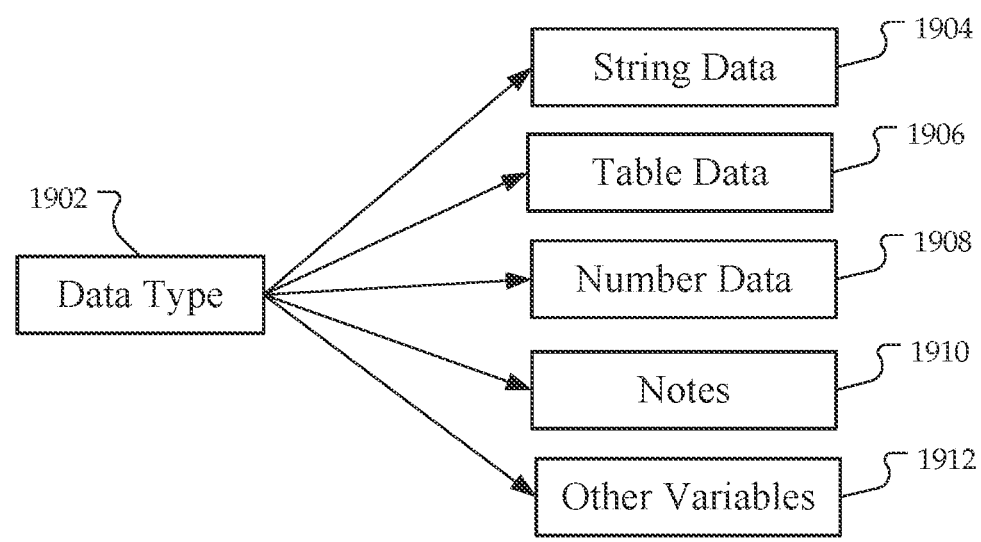
FIG. 19 is block diagram illustrating data types.

FIG. 19 is block diagram illustrating data types 1902. The data view detail pane may be displayed differently depending on different data types 1902. Specifically, the target data displayed on a map after applying a DVT can be selected, such as in the data view detail pane. Any of this data can be compared with the golden baseline for triggering alerts.

Exemplary data types 1902 include string data 1904, table data 1906, number data 1908, notes 1910 and other variables 1912.

Figure 20:
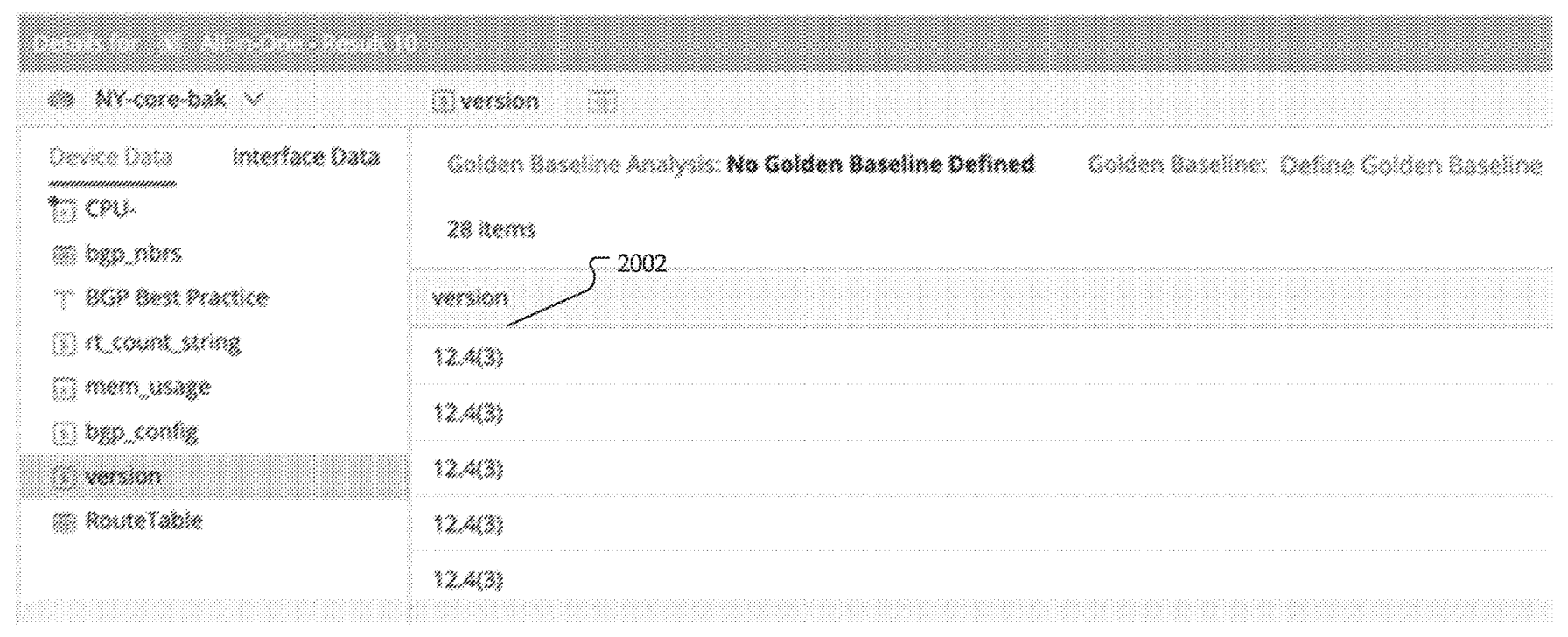

FIG. 20 is an example screenshot of the data view detail pane for string data 1904. FIG. 20 illustrates string data 2002 as one example of data type 1902. As described below, the golden baseline may include monitoring the string data.

FIG. 21 is an example screenshot of the data view detail pane for table data 1906. FIG. 21 illustrates table data 2102 (such as OSPF Neighbor Table) as one example of data type 1902. As described below, the golden baseline may include monitoring the table data.

Figure 22:
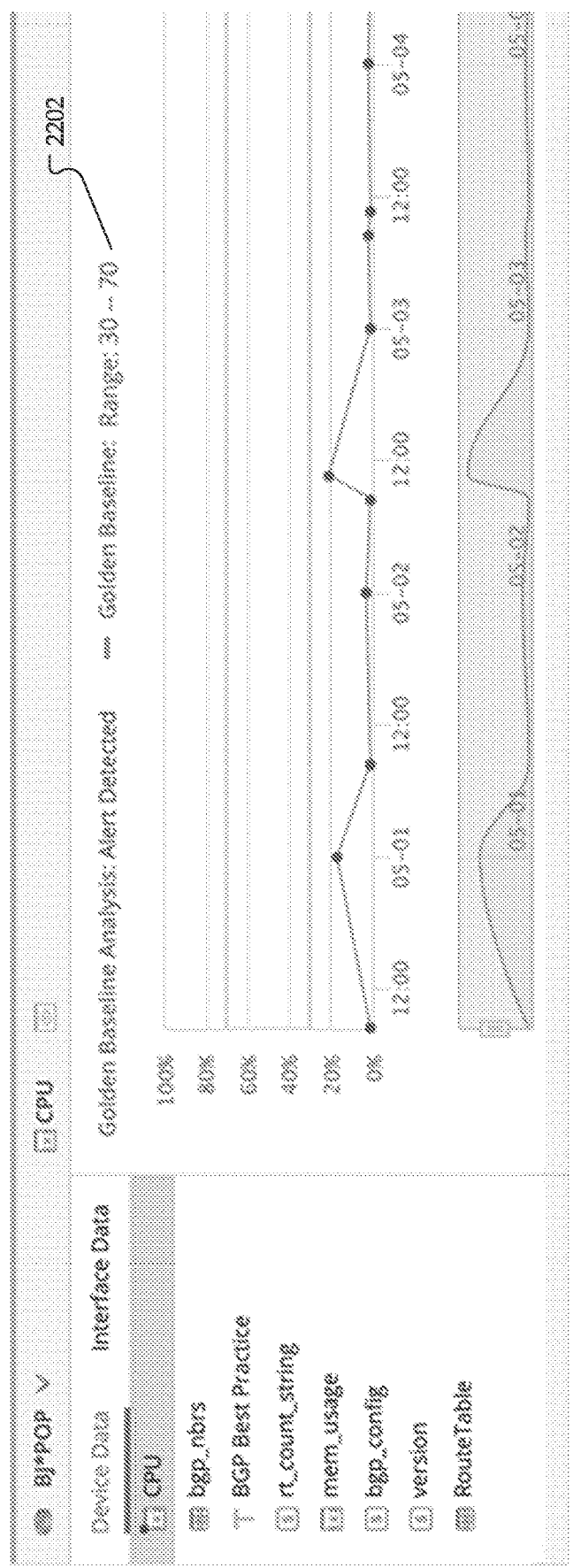
FIG. 22 is an example screenshot of the data view detail pane for number data.

FIG. 22 is an example screenshot of the data view detail pane for number data 1908. FIG. 22 illustrates number data 2202 as one example of data type 1902. In one embodiment, the number data type may include integer, float, or double. As illustrated and described below, the golden baseline may trigger an alert if the number data 2202 is outside of the golden baseline.

Figure 23A:
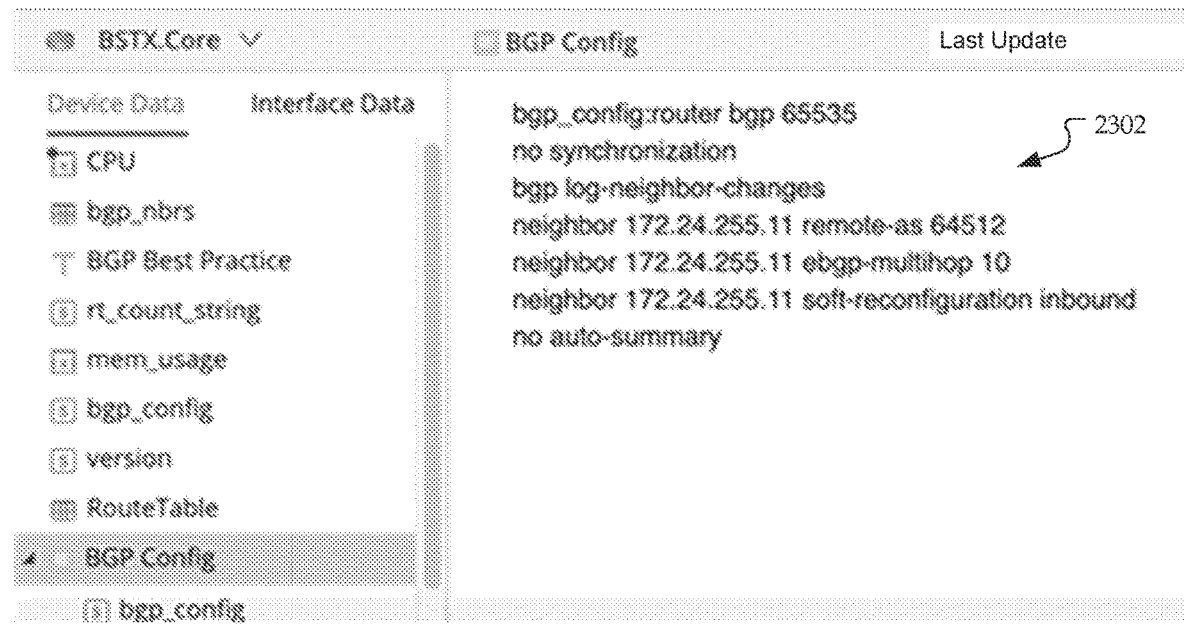
FIG. 23a is an example screenshot of the data view detail pane for notes.

FIG. 23a is an example screenshot of the data view detail pane for notes 1910. The map may include different types of notes 1910 that are displayed. The device/interface note 2302 can be plain text or may include variables. Besides customizing the plain text as a device/interface note, users can reference built-in data (e.g. GDR properties) and parser variables. Users can set conditions to control when to display notes for a device/interface. Supporting variables (e.g. string, number, boolean) can be used in the conditions for determining when the note is displayed. There may be display options to control the layout for device notes. In one embodiment, there may be an Individual Device Note, and each qualified device displays its individual device note. In another embodiment, there may be a Compound Note (Append) that indicates only one device note is displayed for all qualified devices with note content merged and separated by hostname. To browse the mapping relationship between the notes and qualified devices, the note can be pointed at or selected so that the specific links appear. In another embodiment, there may be a Compound Note (Overwrite) that indicates only one device note is displayed for all qualified devices with note content being overwritten.

Figure 23B:
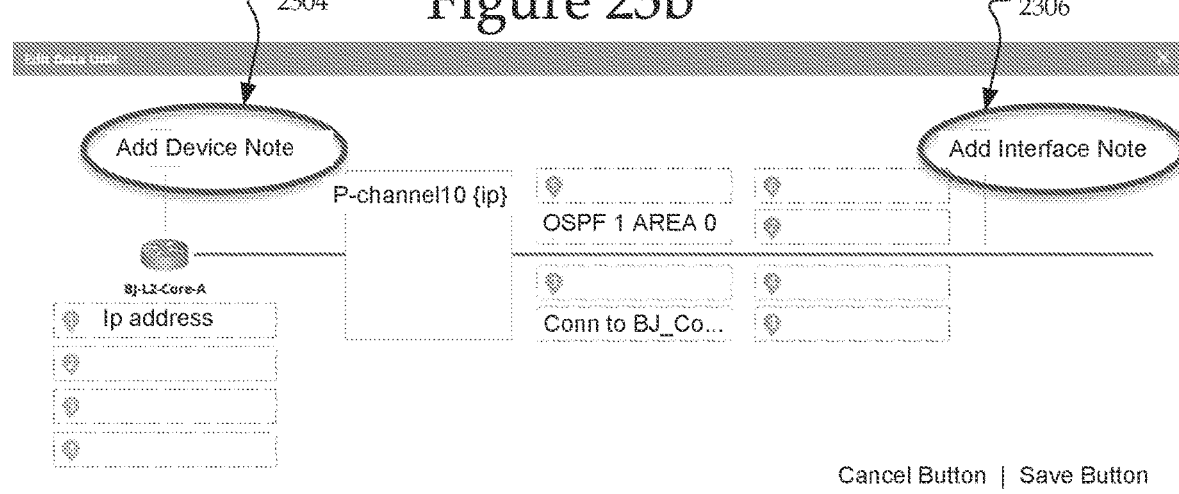
FIG. 23b is an example screenshot of the edit data unit for generating notes.

FIG. 23b is an example screenshot of the edit data unit for generating notes 1910. FIG. 23b illustrates that a device note 2304 can be added for a particular device and/or an interface note 2306 for individual connections/interfaces.

Figure 24:
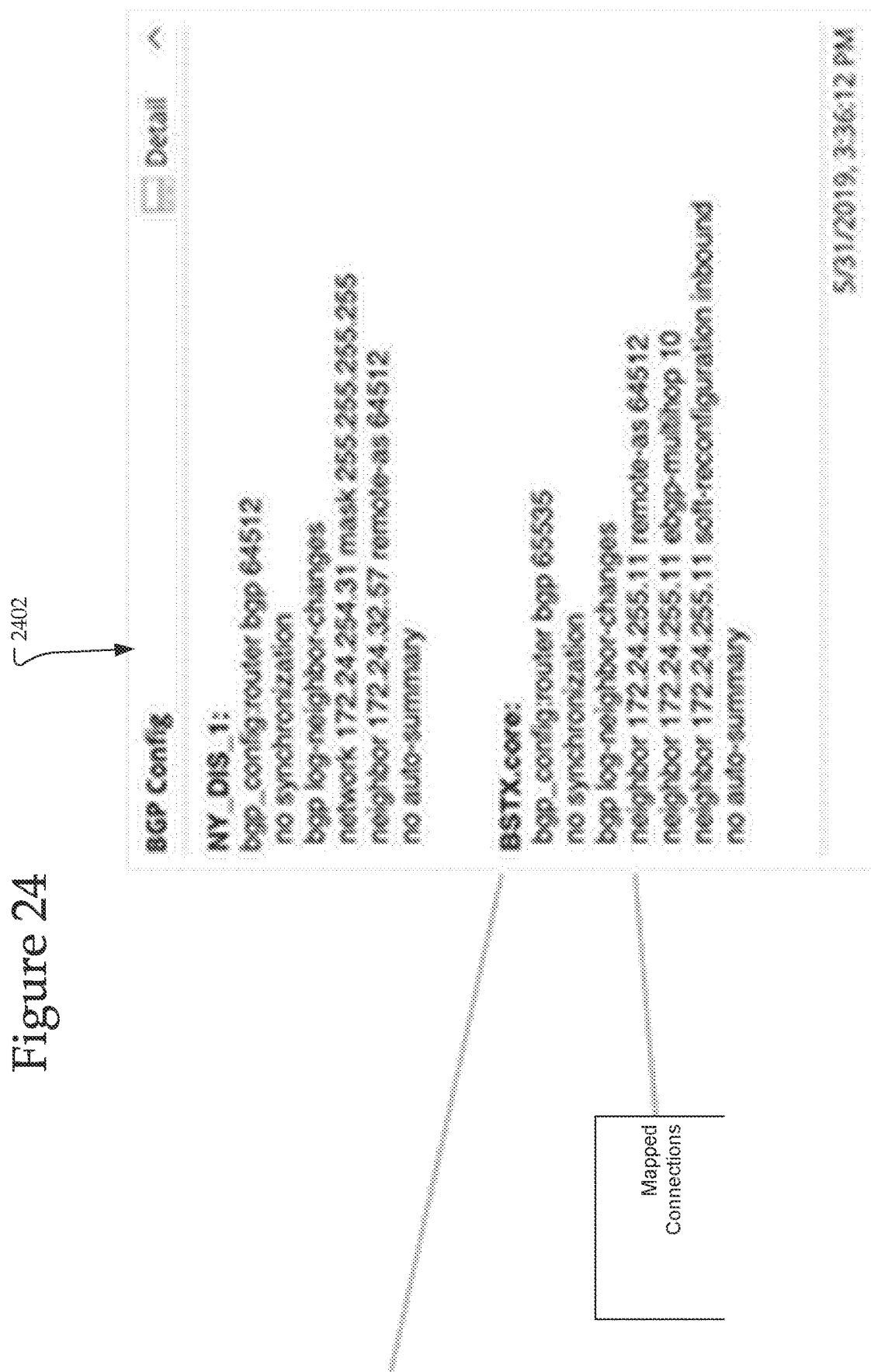
FIG. 24 is an example screenshot of a compound note.

FIG. 24 is an example screenshot of a compound note 2402. Specifically, a portion of a map is shown with a compound note 2402 being displayed. The compound note references two devices, NY_DIS_1 and BSTX_core.

Figure 25:
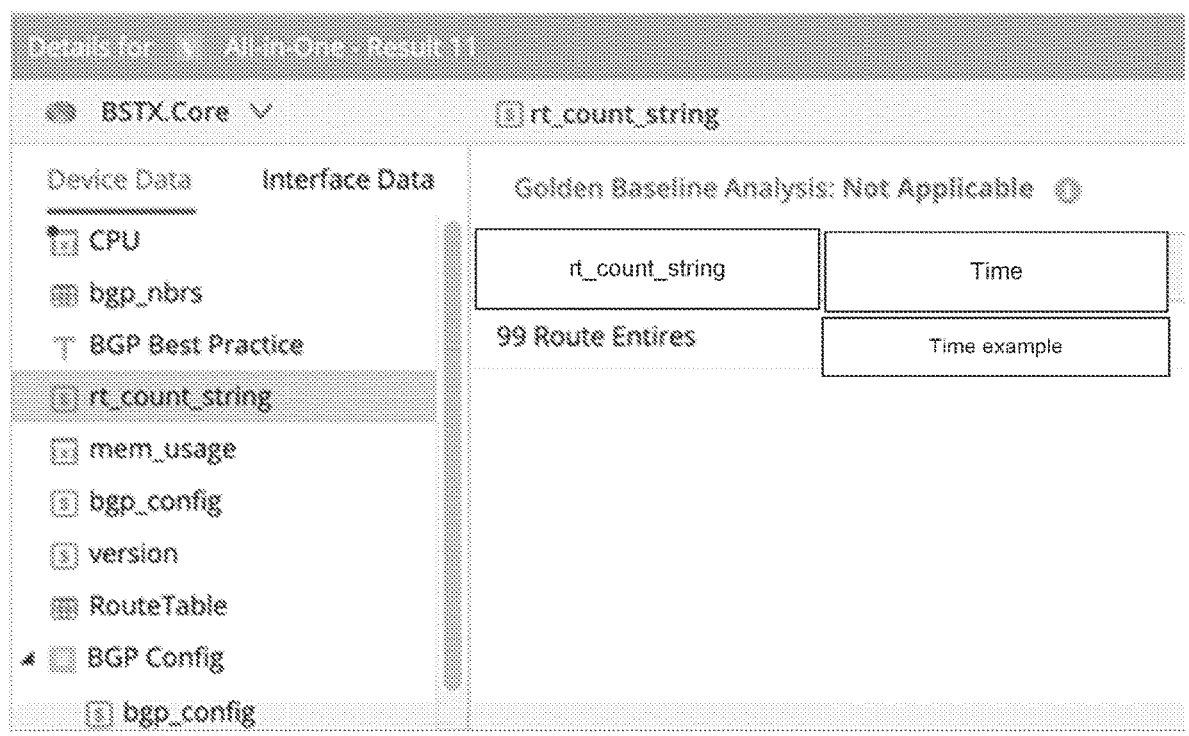
FIG. 25 is an example screenshot of the data view detail pane for other variables.

FIG. 25 is an example screenshot of the data view detail pane for other variables 1912. The other variable 1912 may include a compound variable that includes multiple variables. When existing built-in data (GDR property) or parser variables cannot meet expectations to define a complex semantic, users may rely on a compound variable function to process and combine these variables. Compound variables support three types: string, number, and boolean. The supported formula syntax may differ depending on variable types.

Figure 26:
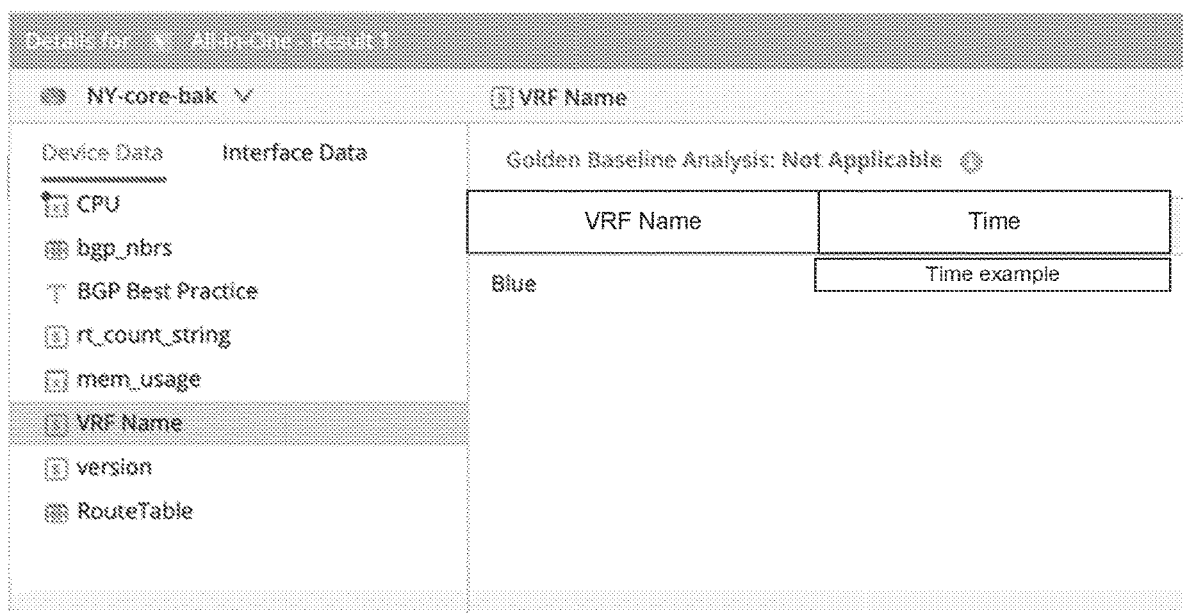
FIG. 26 is an example screenshot of the data view detail pane for an input variable.

FIG. 26 is an example screenshot of the data view detail pane for an input variable. The input variable may be another example of other variables 1912. Input variables may be used to generate an expected data view for a network technology having multiple instances. A device property saved in GDR can be used as the value of an input variable. For example, the GDR property may be the input value of VLAN to generate an expected data view for Spanning Tree.

Input variables may generate an expected data view for different network technologies. For example, a Boolean input variable can control the data view generation for routing protocol, such as when or how to generate OSPF, BGP, or EIGRP.

Figure 27:
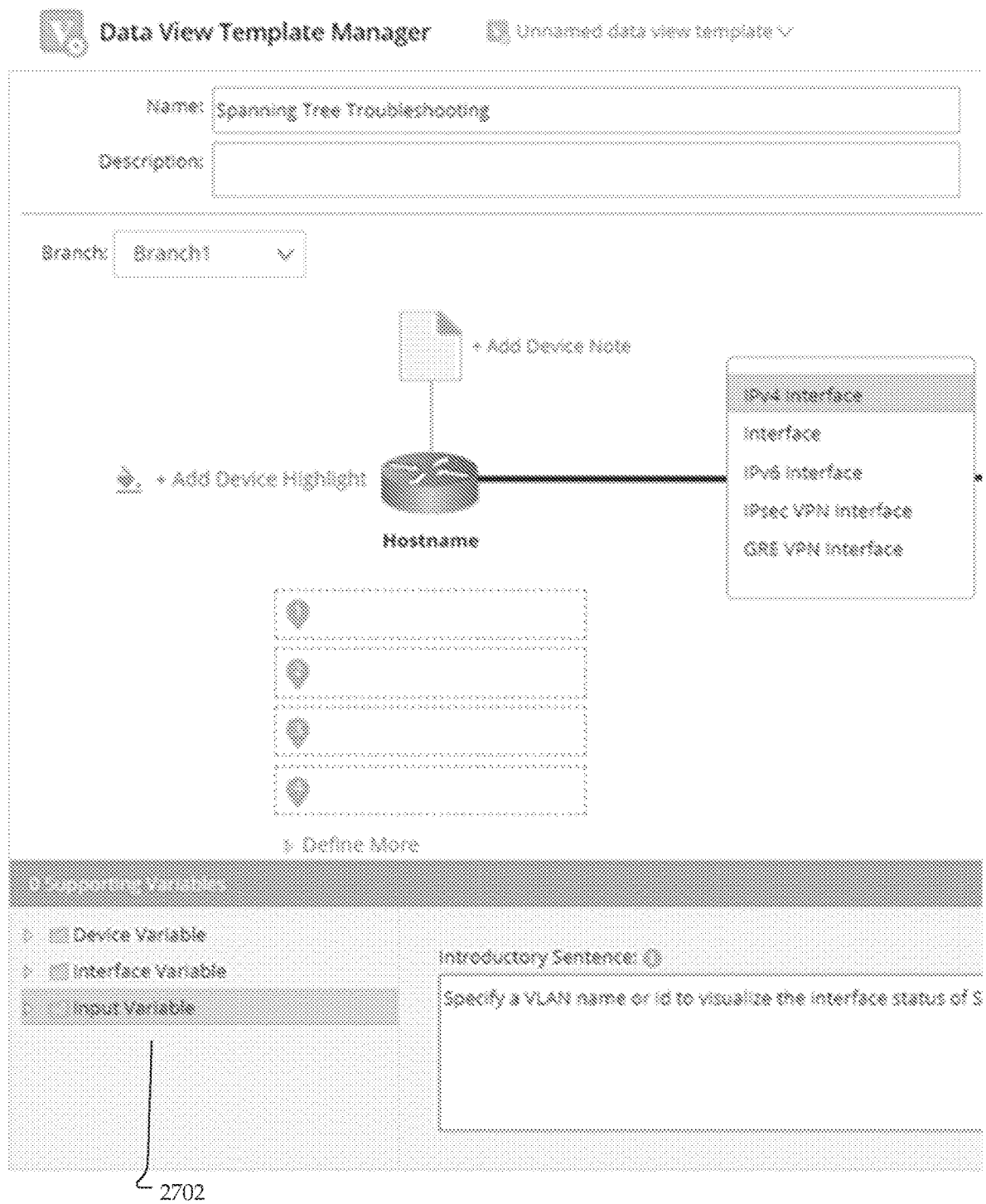
FIG. 27 is an example screenshot of the data view template manager for defining an input variable.

FIG. 27 is an example screenshot of the data view template manager for defining an input variable 2702. The input variable may be generated automatically. For example, upon the addition of a parser variable or API variable that contains a parameter to a position, highlight, note, or supporting variable list, an input variable named by the parameter may automatically be generated. In an alternative embodiment, the input variable may be manually created as in FIG. 28.

Figure 28:
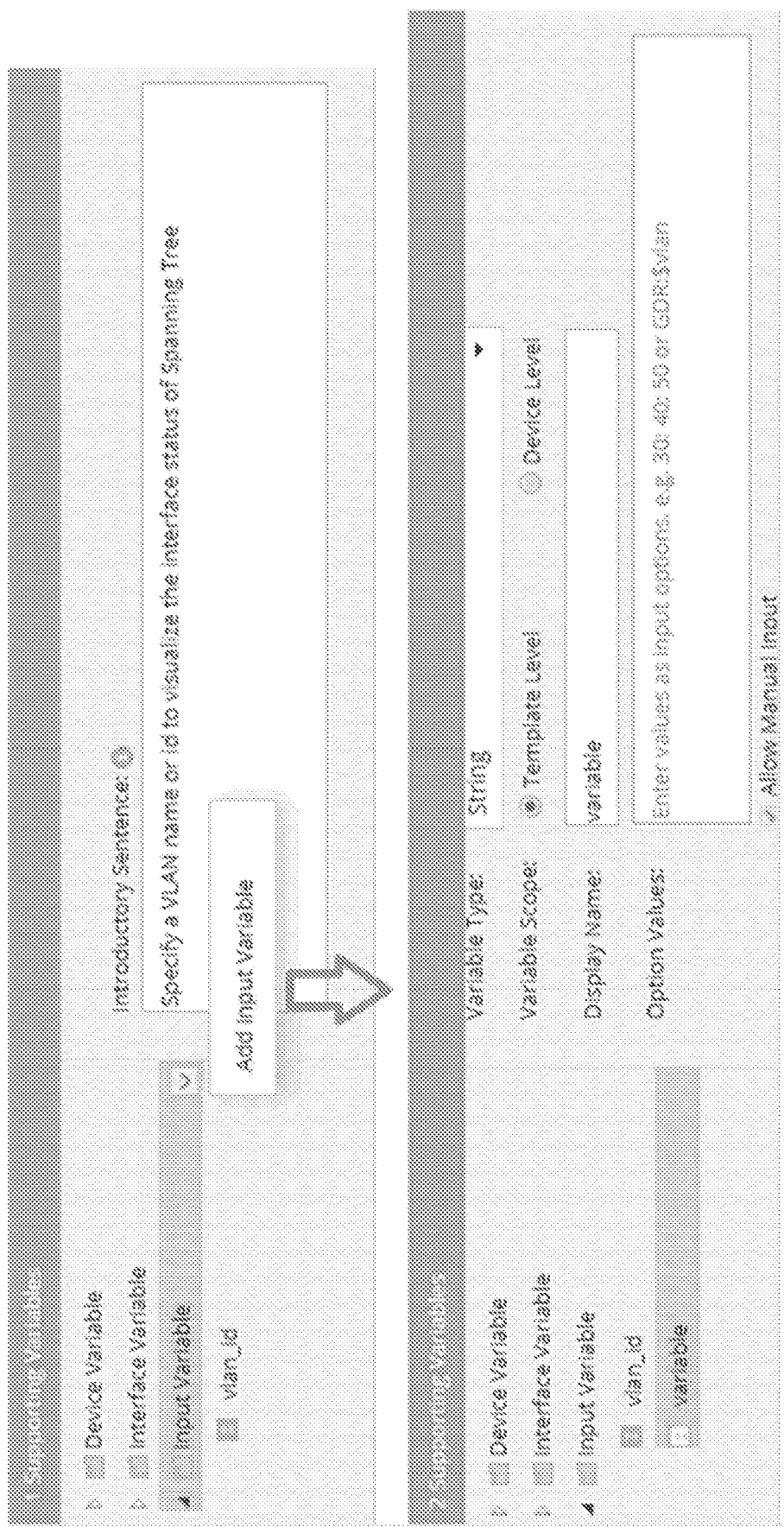
FIG. 28 is an example screenshot for manually defining an input variable.

FIG. 28 is an example screenshot for manually defining an input variable. Input variable is one of the supporting variables 1912. Upon selection of Input Variable, the user can add the input variable by naming it, setting the variable type, setting the variable scope, and setting the option values.

Figure 30:
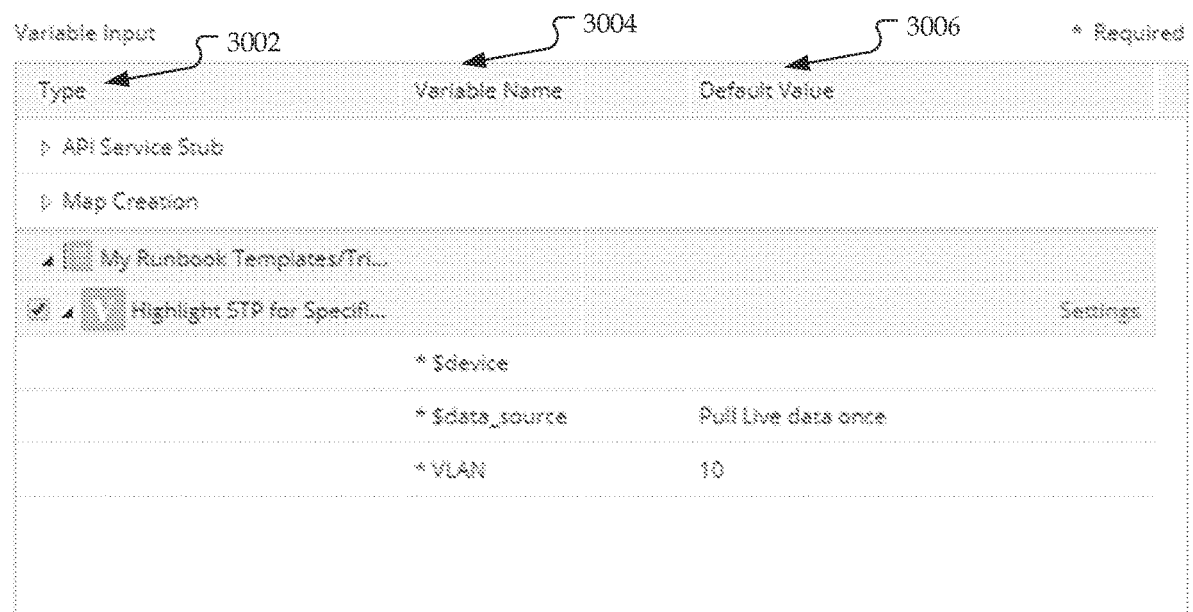
FIG. 30 is an example screenshot of a dialog box for input values used for running a data view template.

The other variables 1912 may include an input variable as discussed. The input variables may have configurable properties as illustrated in Table 1:

FIG. 30 is an example screenshot of a dialog box for input values used for running a data view template. The Variable Inputs are listed by type 3002 and the user can see the Variable Name 3004 and Default Value 3006 for each input. The input values may be changed when running the DVT. When adding a Runbook template that contains the DVT to an API triggered diagnosis task, all input variables defined in the DVT may be auto-populated with the default values. The value of an input variable may be passed from a third-party API server to the Network Manager 112. If no value is passed, then the default value of the input variable can be used to run the DVT. In one embodiment, the default value may not be modified when defining an API triggered task. If some input variables do not have option values, then the DVT node may not be executed in the Runbook template when the API triggered task is called.

In one embodiment, the DVT may be shared either within the organization for the network or to other networks (e.g. clients that also use the Network Manager 112). In particular, the DVT resources, including the DVT and the options/data associated with them may be published in the cloud. In one embodiment, this information in the cloud may be referred to as a Knowledge Cloud. The Knowledge Cloud

TABLE 1

Input Variable configurable properties.

| Property | Description |
| --- | --- |
| Variable Source | The API parser name or CLI command where the input variable originates from. It is only available for the auto-created input variables. |
| Variable Type | The type of the input variable, such as Boolean, Number, or String. |
| Variable Scope | The effective scope to use the input variable.<br>Template Level -qualified devices on the map use the same value of the input variable to generate a data view.<br>Device Level -qualified devices on the map use the individual value of the input variable to generate a data view. |
| Display Name | The name of the input variable displayed in the Input Variable dialog when you run the data view template on a map. Specify a meaningful name for the variable so that it can be easily understood. |
| Option Values | The value of the input variable that will be used to generate the data view. You can specify multiple values for reservation. Use a semicolon to separate each value. The first value will be used as the default value.<br>Tip: You can correlate a GDR property to specify the value. Only device level properties are supported. The format is GDR: $<propertyname>. |
| Allow Manual Input | Control whether you can manually input another value of the input variable at the runtime of the data view template.<br>Tip: When running the data view template, if an input variable doesn't have any optional values, you can manually input a value for it. |

Figure 29:
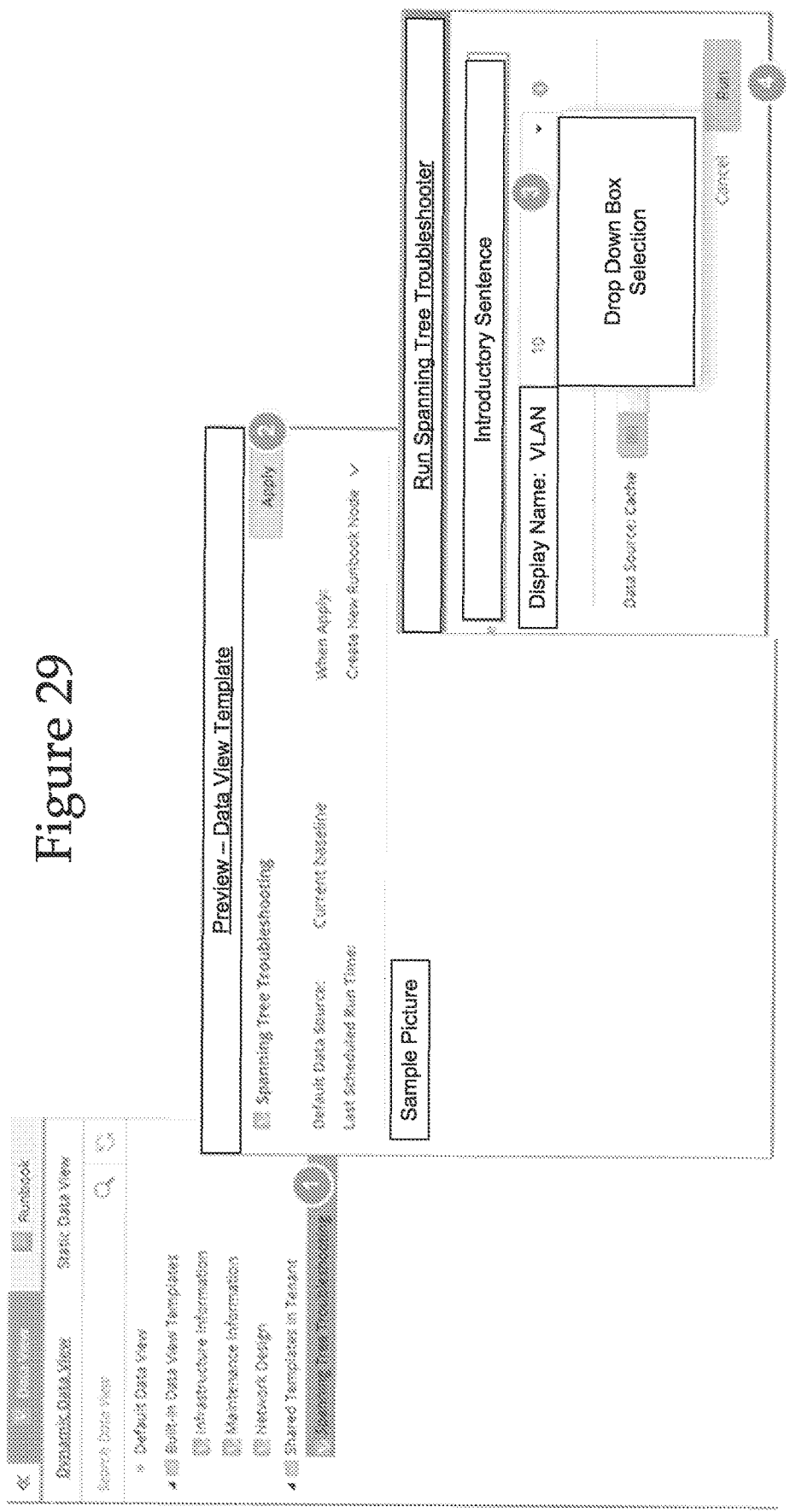
FIG. 29 is an example screenshot of the running of a data view template.

FIG. 29 is an example screenshot of the running of a data view template. The user selects Dynamic Data View and selected the Spanning Tree Troubleshooting DVT from the Shared Templates folder. A pop-up window displays information about the Spanning Tree Troubleshooting DVT including a sample picture. The window also includes options such as selecting a data source, when to apply, a last scheduled runtime, and the user selects apply when ready to receive final confirmation for running the DVT. The last pop-up window provides an introductory sentence and display name for a qualification, which is set. In this example, the user selects a value for the VLAN from the drop-down menu and runs the DVT. DVT qualification defines what conditions or criteria that a device should meet to apply the DVT on itself. In other words, if a device cannot satisfy a DVT qualification, it will not be involved in the device scope of the DVT execution.

may include media to deliver valuable resources to customers of the Network Manager 112. DVTs and all associated files referenced in DVT may be one example of what is shared with customers through the Knowledge Cloud. The Knowledge Cloud may be a central place for all software plugins and resources, including vendor/model, drivers, Qapp, Runbook, data view template, platform plugin, etc. The resources can be dynamically/continuously updated, including adding a driver for a new vendor, creating a DVT for a new troubleshooting scenario, adding a plugin to fix a discovery issue, etc. The customer's system can be set to automatically update from Knowledge Cloud. For example, new DVTs added to the Knowledge Cloud may automatically appear in the list of available DVTs.

Figure 31:
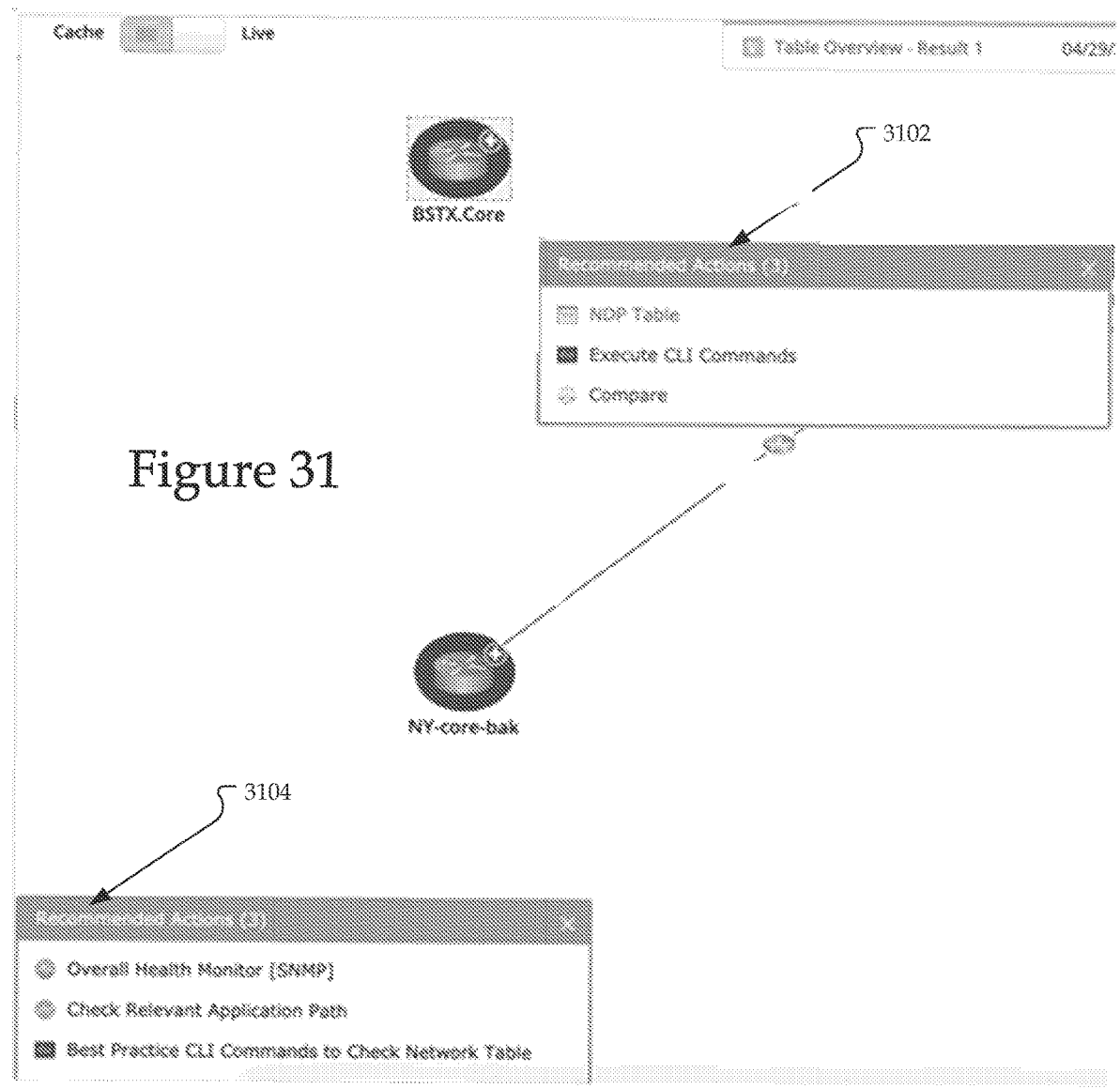
FIG. 31 is an example screenshot of map showing drill-down action.

FIG. 31 is an example screenshot of map showing drill-down action. The user can define the variables that are displayed in the Data View for each device and/or connection (i.e. interface). Those variables may be listed adjacent that device or connection. Each of those variables may be clickable and present drill-down actions (e.g. recommended actions 3102, 3104) for each variable of each device or connection. The drill-down actions available for each variable and/or device/connection may be customized. Users can define and customize drill-down actions at DVT level or device/interface level. When users apply a DVT to a map, these predefined drill-down actions may be prompts as recommendations to assist users in understanding the network and further troubleshooting. End users can select actions to execute to view more data and analyze.

Figure 32:
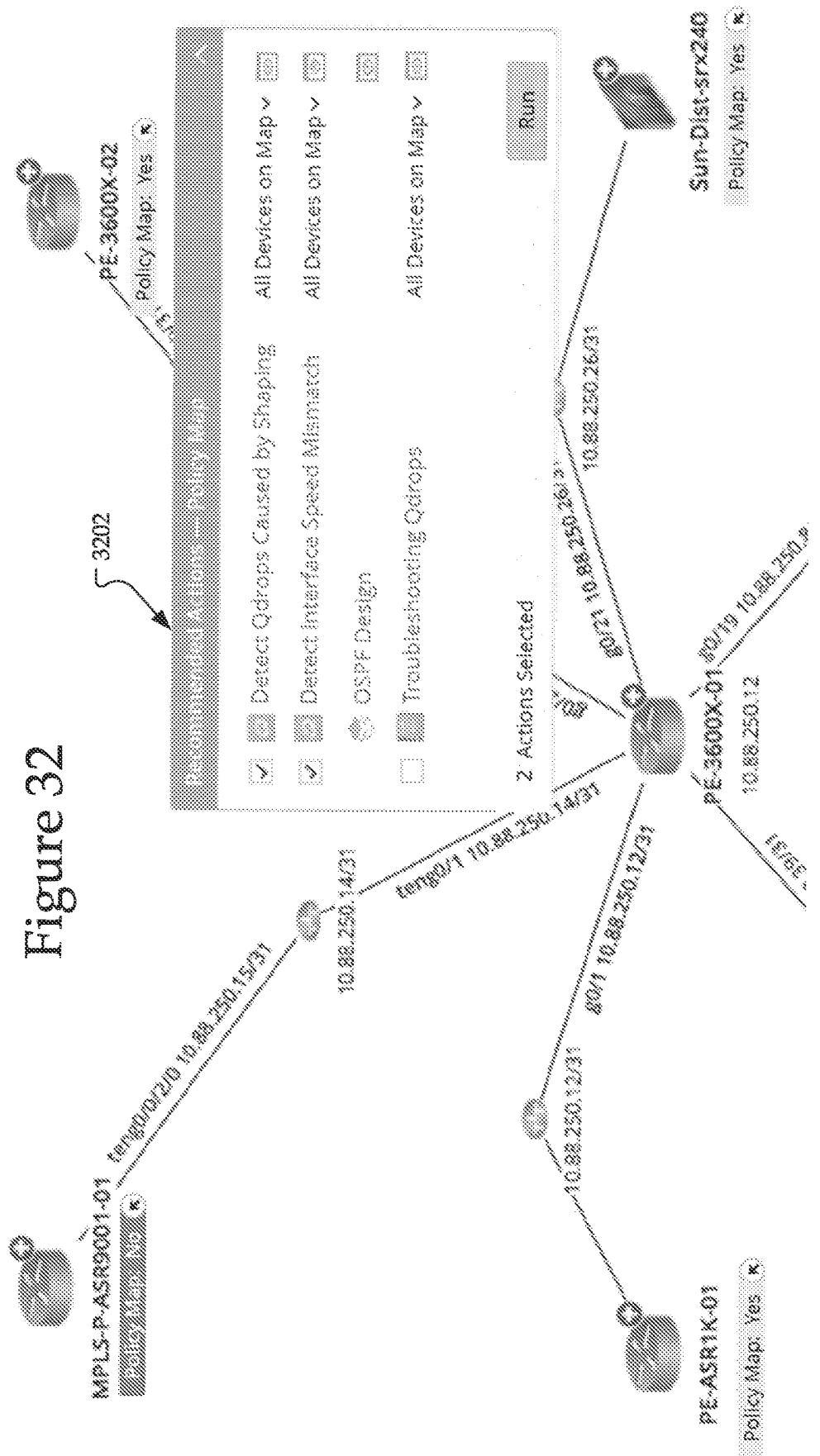
FIG. 32 is another example screenshot of map showing drill-down action.

FIG. 32 is another example screenshot of map showing drill-down action. The drill-down action 3202 lists potential actions that can be performed. The actions are selectable (with check boxes) so that the user can select one or more actions to perform. The performance of those actions can be set to apply to any subset of devices or connections in the network. As shown, the drill-down actions 3202 are set to "All Devices on Map." That selection may include individual devices/connections, groups of devices/connections, and/or all devices/connections.

Figure 34:
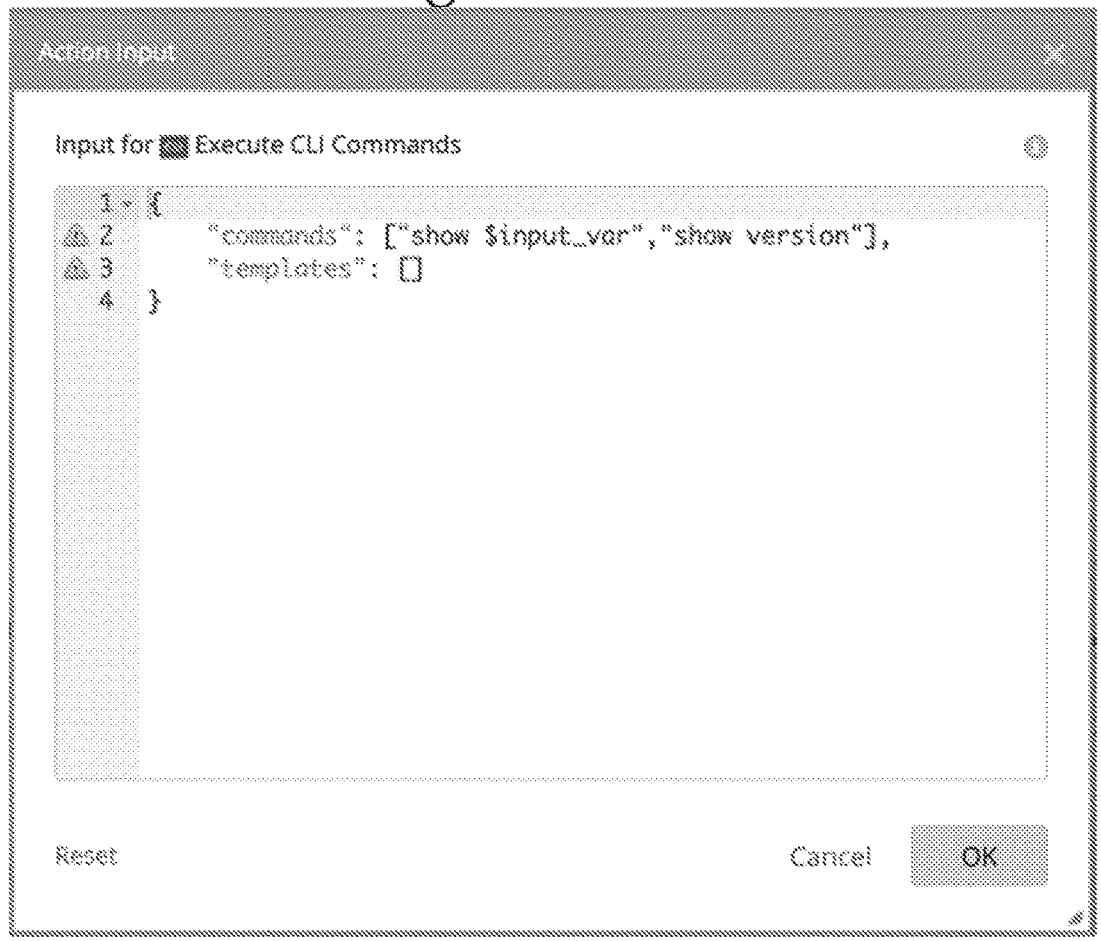
FIG. 34 is an example screenshot of script-based input to control the drill-down action execution.
Figure 35:
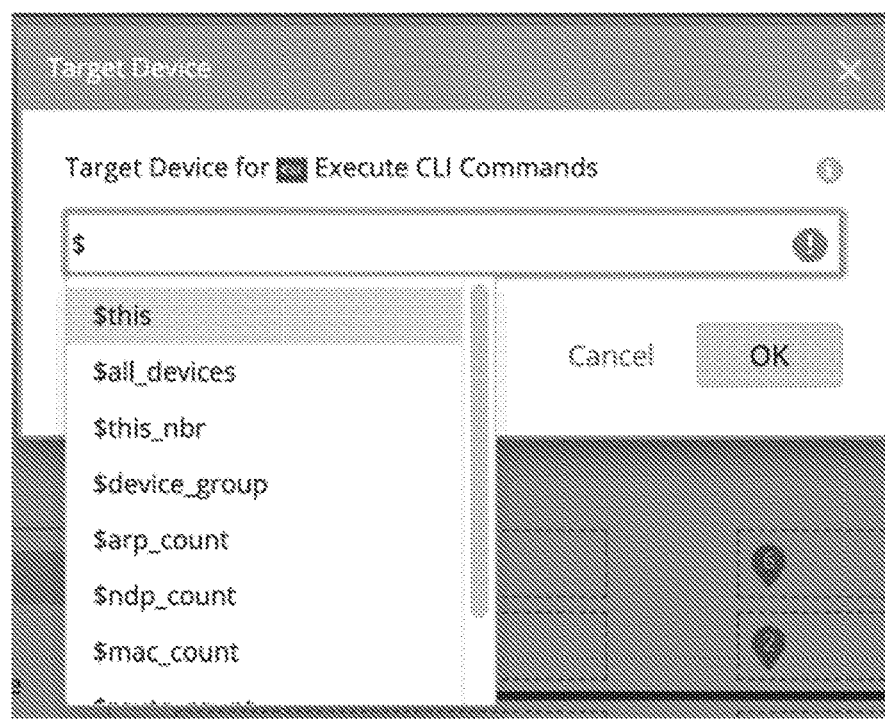
FIG. 35 is an example screenshot of pre-defined target devices based on variables.

FIG. 33 is an example screenshot showing available drill-down actions. In one embodiment, there may be 14 types of drill-down actions as shown in the menu for selection in FIG. 33. Drill-down Actions may refer to a set of pre-defined actions to analyze and troubleshoot a certain network issue. In one embodiment, they may be divided into two levels: DVT Level (includes general actions to perform for all devices on a map, such as Monitor and Compare); and Data Unit Level (includes specific actions for a certain device on a map, such as Executing CLI commands, Ping, and Traceroute). The exemplary drill-down actions shown in FIG. 33 are further described below in Table 2:

FIG. 35 is an example screenshot of pre-defined target devices based on variables. In addition to setting the input for the drill-down action from FIG. 34, FIG. 35 illustrates that target devices may be selected for operation of the drill-down action. The target devices may be individual or group of devices (e.g. all devices from a particular manufacturer or devices of a certain type).

Figure 36:
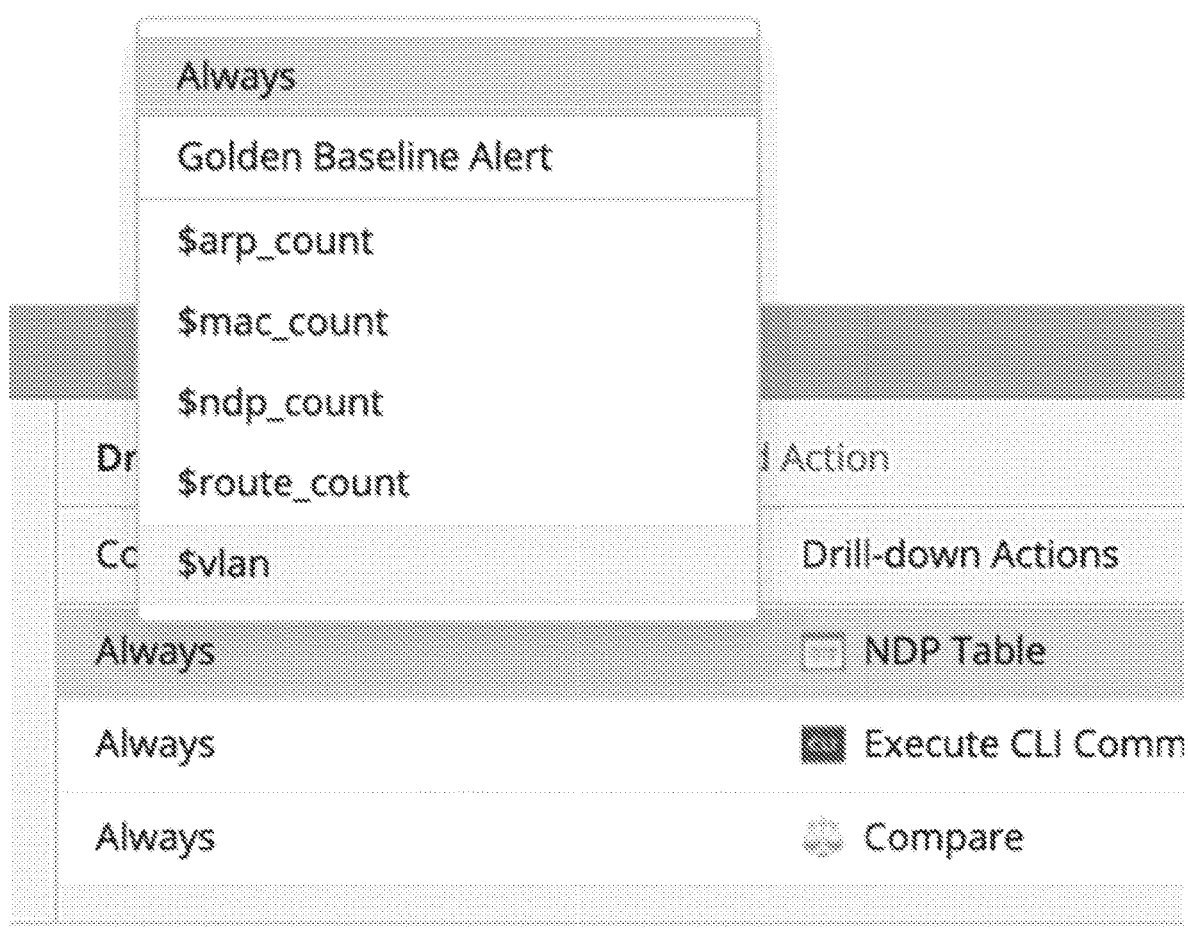
FIG. 36 is a partial menu from an example screenshot for defining conditions for the display of drill-down actions.

FIG. 36 is a partial menu from an example screenshot for defining conditions for the display of drill-down actions. FIG. 36 is an example of how the drill-down actions are dynamic by providing conditions under which a user can control how/when drill-down actions are be displayed. There may be built-in conditions, such as Always and Golden Baseline Alert as two examples. For the Always condition, the drill-down action will display unconditionally. For the Golden Baseline Alert condition, the drill-down action will display when an alert occurs due to the mismatch of current data and the Golden Baseline as further discussed below. In addition to built-in conditions, a user can customize supporting variables. For example, with a Supporting Variable, the drill-down action may display only when the selected variable from the supported variable list is not null (for string type), equals to true (for boolean type), or not equal to 0 (for number type).

Figure 37:
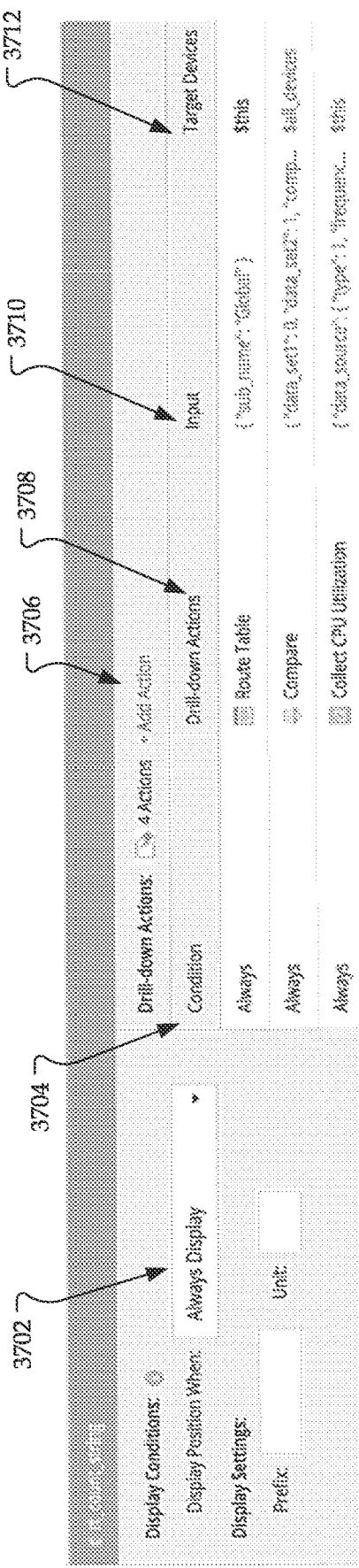
FIG. 37 is an example screenshot for condition based drill-down actions.

FIG. 37 is an example screenshot for condition based drill-down actions. Condition based drill-down action may include DVT level drill-down action and data unit level drill-down action. There may be support using the supporting variables as inputs for the drill-down actions execution. FIG. 37 illustrates selectable display conditions, such as display settings and the "Display Position When" 3702, which is set to Always Display in this example. The drill-down actions can be supplemented by adding more actions 3706. The drill-down actions 3708 are shown with their

TABLE 2

Exemplary Drill-Down Actions.

| Action | Description | DVT Available | Position Data Available |
| --- | --- | --- | --- |
| Data View Template | Apply the designated DVT to map | √ | √ |
| Qapp | Run the designated Qapp | √ | √ |
| Gapp | Run the designated Gapp | √ | √ |
| Overall Health Monitor | Run Qapp to Monitor network health | √ | √ |
| Execute CLI Commands | Execute predefined CLI commands | √ | √ |
| View Data | Visualize predefined data, such as configurations, route tables, etc. | | √ |
| Ping | Perform a Ping action | | √ |
| Traceroute | Perform Traceroute | | √ |
| Path | Calculate Path | | √ |
| Compare | Compare predefined data | √ | √ |
| SPOG URL | Open the designated SPOG URL in Web Brower | | √ |
| URL | Open the predefined URL in Web Browser | √ | √ |
| Runbook Template | Add nodes of the designated Runbook Template to the current Runbook | √ | √ |
| Verify Application | Run the designated node for Application Assurance | √ | √ |

FIG. 34 is an example screenshot of script-based input to control the drill-down action execution. To make drill-down action more specific and valuable, certain users may define input parameters via script and target devices for each drill-down action according to different use scenarios. For example, to define associated drill-down actions for interface CRC errors, those users may: 1) run a Qapp to monitor with a predefined alert threshold; 2) run a Qapp to check interface speed/duplex mismatch for the current device and its neighbor device.

respective conditions 3704. In this example, each of the drill-down actions 3708 are set to the condition 3704 of Always Display. The input 3710 for the drill-down action is shown along with the target device(s) 3712 for each drill-down action.

Figure 38:
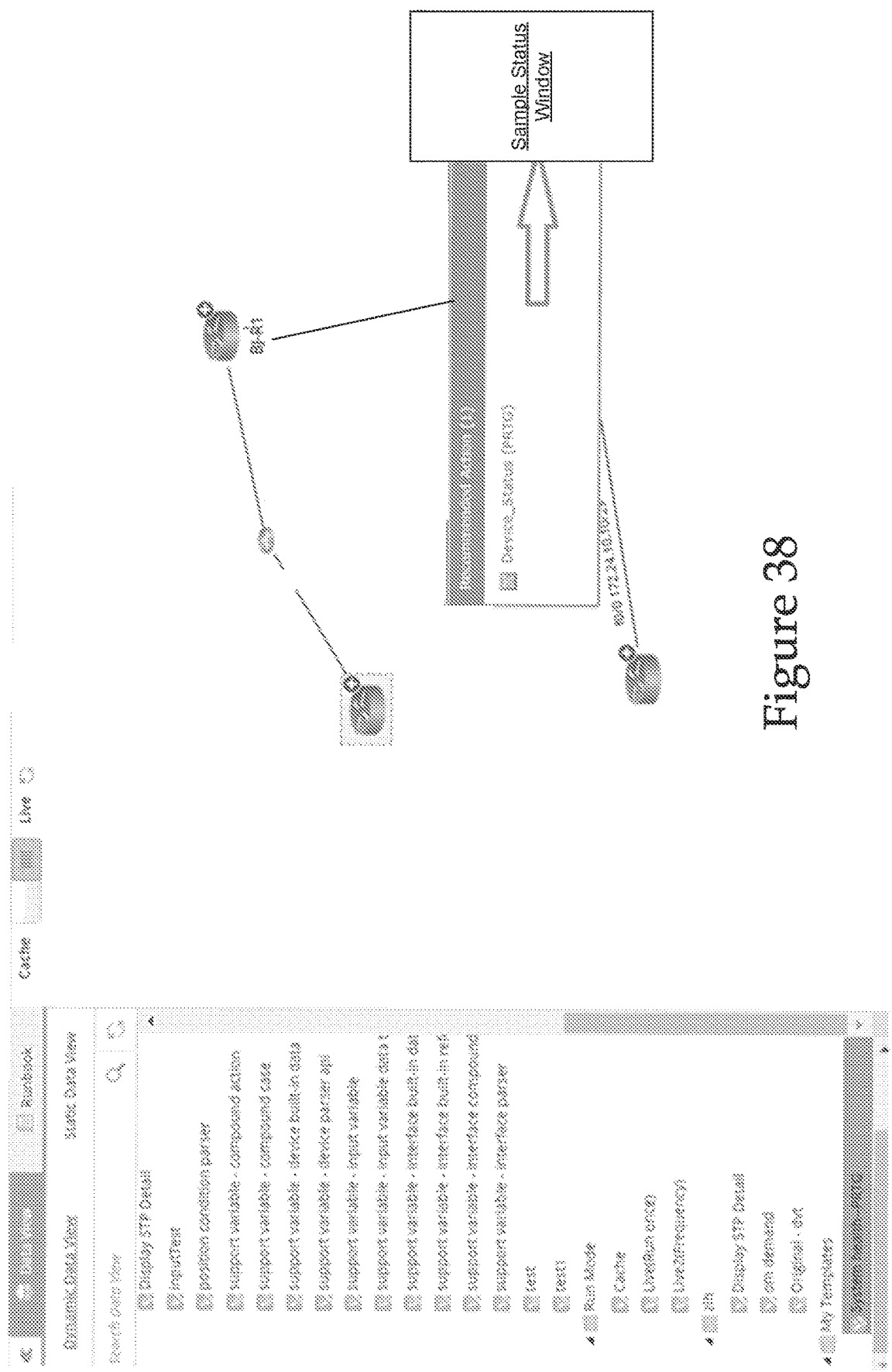
FIG. 38 is an example screenshot of the visualization of a single pane of glass.

FIG. 38 is an example screenshot of the visualization of a single pane of glass (SPOG). In particular, third-party system data can be visualized through SPOG. Specifically, data collected from different sources (e.g. different ticketing systems or network monitoring tools) and different devices (e.g. different manufacturers and third parties) can all be visualized on a single map. The map can then serve as a SPOG for all network data. There are many hundreds of vendors of network devices, including but not limited to CISCO, JUNIPER, HEWLETT-PACKARD, CHECK-POINT, etc. and many kinds of ITSM, SIEM, monitoring systems, including but not limited to ServiceNow, Splunk, Solarwinds, etc. There are many other network management tools, such as ServiceNow, Splunk, SolarWind, etc. Accordingly, a challenge of managing a network of devices involves the disparate operations, commands, or information for devices from each vendor and/or from each third party source. SPOG is used to collect and parse the data from multiple third party systems, and then display that data on the map.

The SPOG operates to display data and information from any of those devices or any of those sources.

In one embodiment, either the link to access a third-party webpage appears in the drill-down action list, or the detailed information retrieved from third-party systems via APIs is displayed in a table format with a generated URL. With one click, users can directly go to the predefined webpage for drill-down investigations and operations. A URL could be manually added to a DVT. A SPOG URL can be dynamically generated. Various variables and combinations are supported in SPOG URLs, including customized variables, parser variables, built-in variables (properties in GDR), and generic variables. Once defined, SPOG URLs may be directly referenced in all dynamic data views and may appear in the drill-down action list if the predefined conditions are met.

Figure 39:
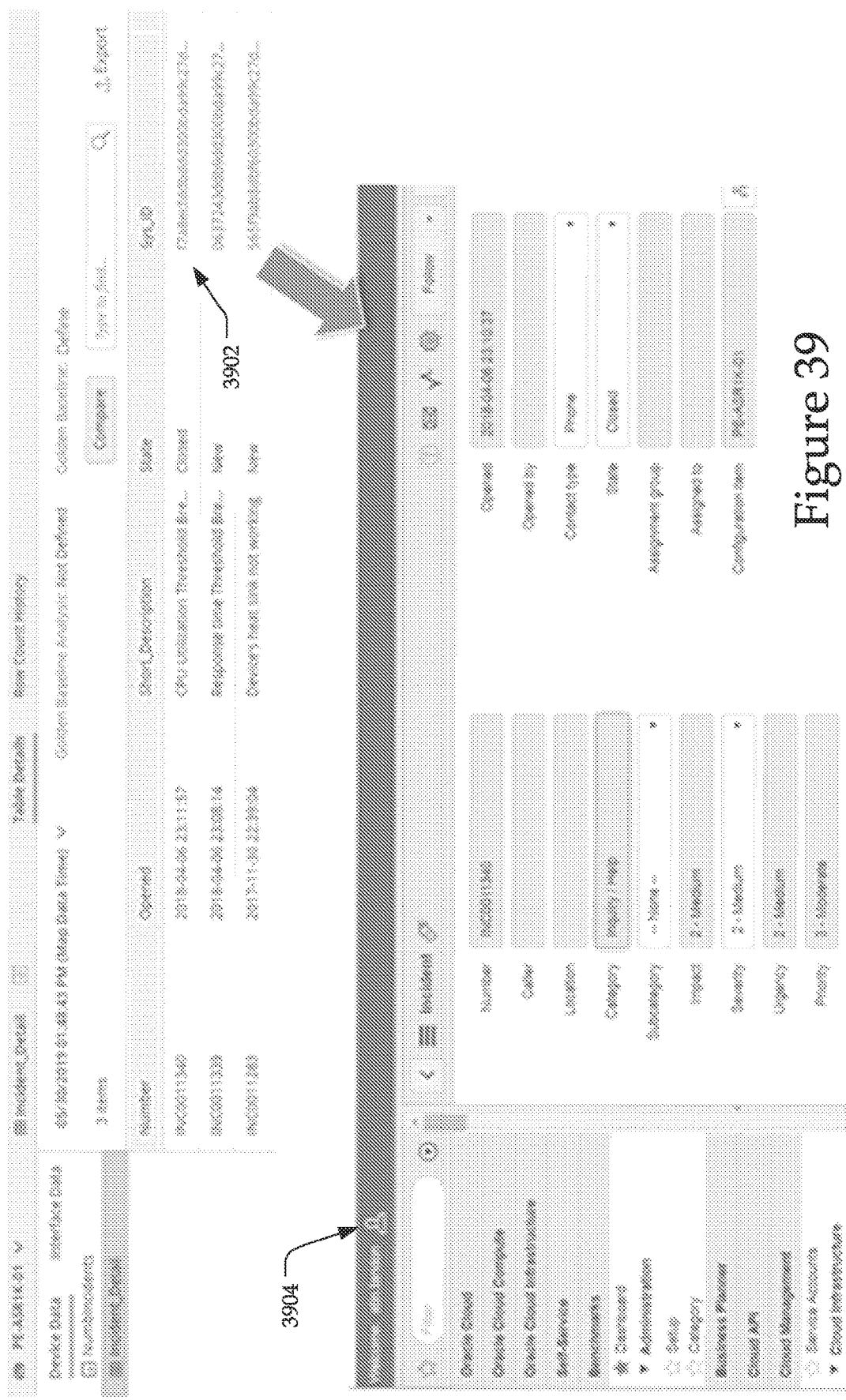
FIG. 39 is another example screenshot of the visualization of a single pane of glass (SPOG).

FIG. 39 is another example screenshot of the visualization of a single pane of glass (SPOG). In the data detail view, there may be a SPOG URL 3902 that is displayed. Clicking on the SPOG URL 3902 displays a SPOG 3904. The SPOG 3904 includes specific information that may be from third parties. The SPOG allows for this information to be retrieved for all devices regardless of vender or device type.

Figure 40:
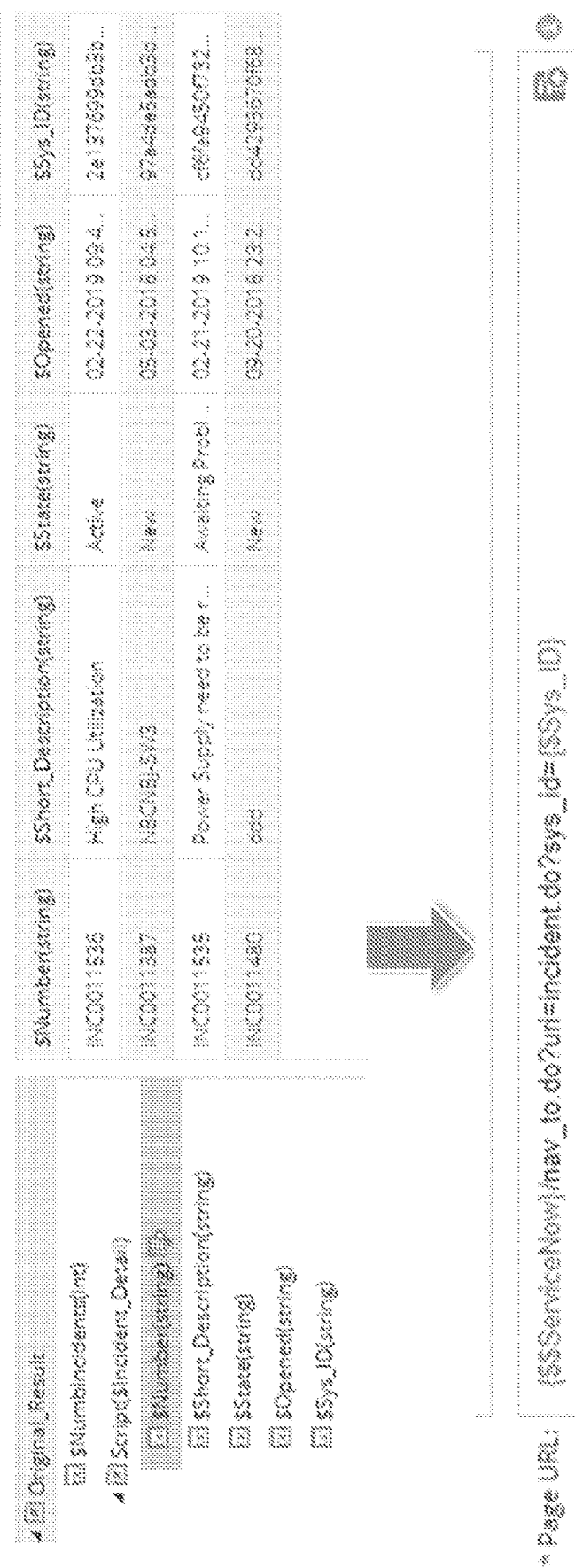
FIG. 40 is an example screenshot of the definition of a single pane of glass (SPOG) URL.

FIG. 40 is an example screenshot of the definition of a single pane of glass (SPOG) URL. In one embodiment, variables from an API parser are added, which is used for composing the URL. The URL is defined and the variable is inserted. As shown in FIG. 40, the {$$ServiceNow} and {$Sys_ID} variables are inserted into the SPOG URL. The SPOG URL may be referred to as a drill down action in a dynamic data view.

Figure 41:
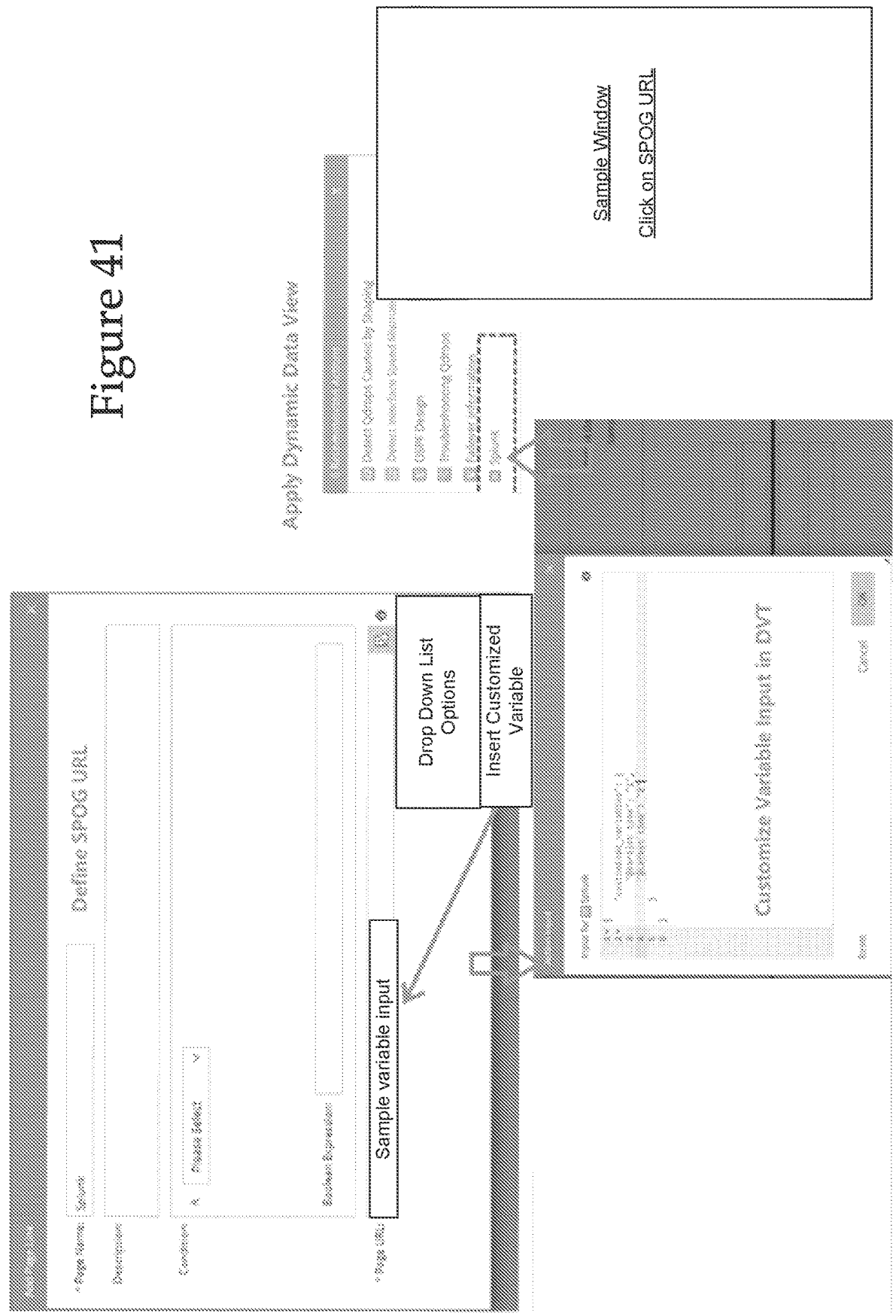
FIG. 41 is another example of screenshots for the definition of a single pane of glass (SPOG) URL.

FIG. 41 is another example of screenshots for the definition of a single pane of glass (SPOG) URL. As shown in FIG. 41, a Page URL or SPOG URL allows for the insertion of appropriate variables. The examples shown are Built-In Variables, Parser Variables, Generic Variables, and Customized Variables. When the user clicks on Insert Customized Variables, a pop-up dialog allows for the variable to be defined. During the SPOG URL definition process, users may have no idea about the earliest and latest time for the search period. The user can compose the URL by inserting two customized variables "earliest time" and "latest time" as placeholders. During the specific DVT definition process, values are assigned to "earliest time" and "latest time" in the input script. In this example, the SPOG URL is for Splunk. The SPOG URL may be from Splunk firewall log search in data view in one example. Once the variable has been customized, it will show up as a drill-down action that can be applied with dynamic data view with a DVT. Clicking on Splunk displays the SPOG display of information about the customized variable, which in this example is the Splunk page for the target firewall log search.

FIG. 42 is another example of screenshots for the definition of a single pane of glass (SPOG) URL. A generic variable for a SPOG URL can be defined as shown with the pop-up dialog for "Edit Generic Variable." The "Edit Page Link" window can be used for generating the SPOG URL that relies on the Generic Variable that was just edited/created. The name of the generic variable "ServiceNow" is inserted into the SPOG URL. To make common and static resources (such as a base URL) easy to reuse and maintain in SPOG URL management, users can pre-define generic variables before defining a SPOG URL. For example, add "https://ven01749.service-now.com/" as a generic variable. Then it can be directly inserted when defining SPOG URLs for ServiceNow.

Figure 43:
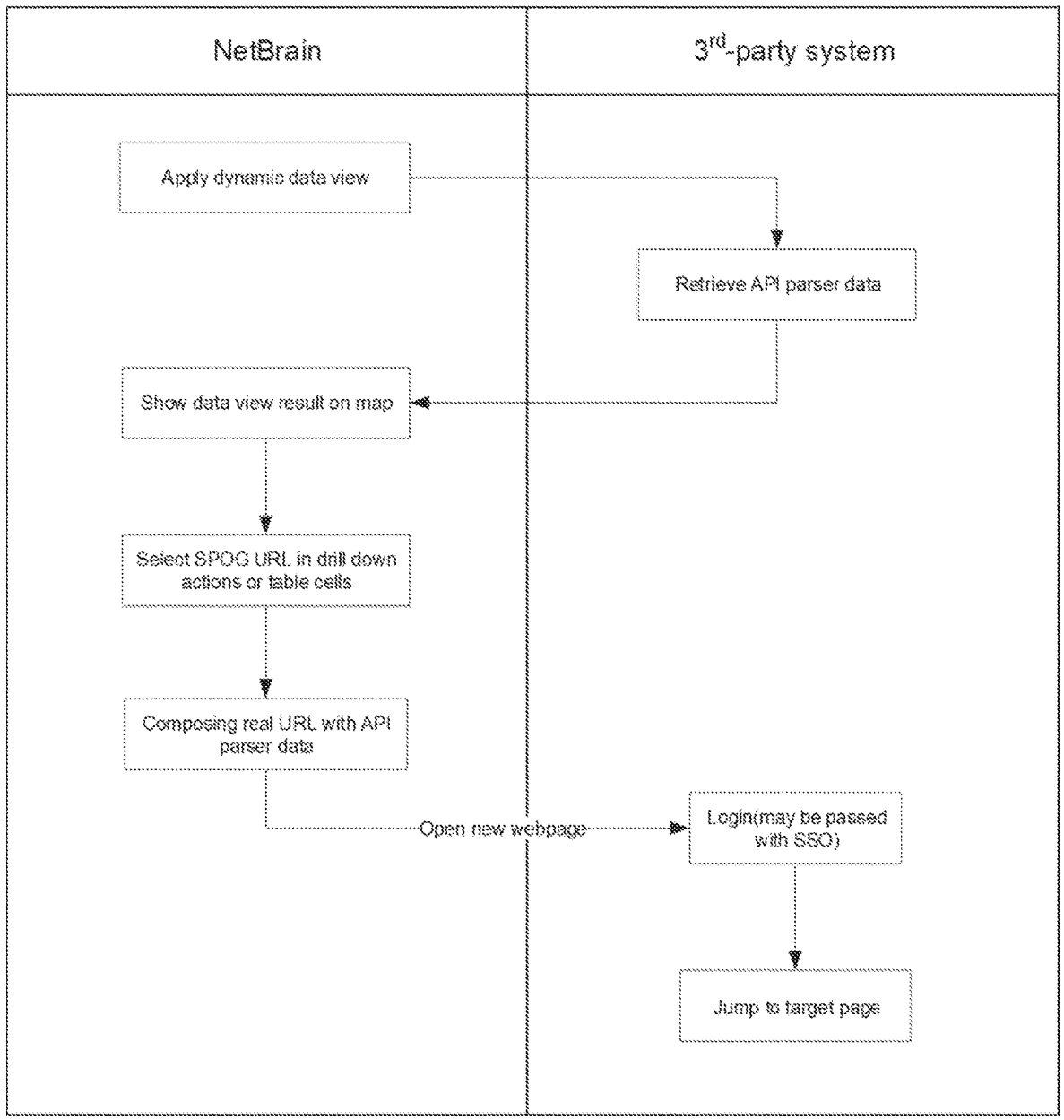
FIG. 43 is a flowchart illustrating third-party interaction.

FIG. 43 is a flowchart illustrating third-party interaction. The network manager 112 may be software provided by NETBRAIN TECHNOLGIES INC. (NetBrain) that interacts with third party systems (i.e. other network management tools). The network manager 112 applies a dynamic data view, which then retrieves API parser data from the third party system. In other embodiments, the data may be retrieved locally rather than from the third party system. The data view result from the third party system is displayed on the map. A SPOG URL appears in the drill down action user interface, or in the detail console of data unit (e.g. for table variable). The URL is modified/updated with the API parser data. In other words, when a user clicks the hyperlink on map, the current value is replaced in URL based on the retrieved data. The updated URL may be opened displaying information from the third party system. There may be a required log in before displaying the appropriate web page based on the URL. The user can view more detail or operate in the third party system environment.

Figure 44:
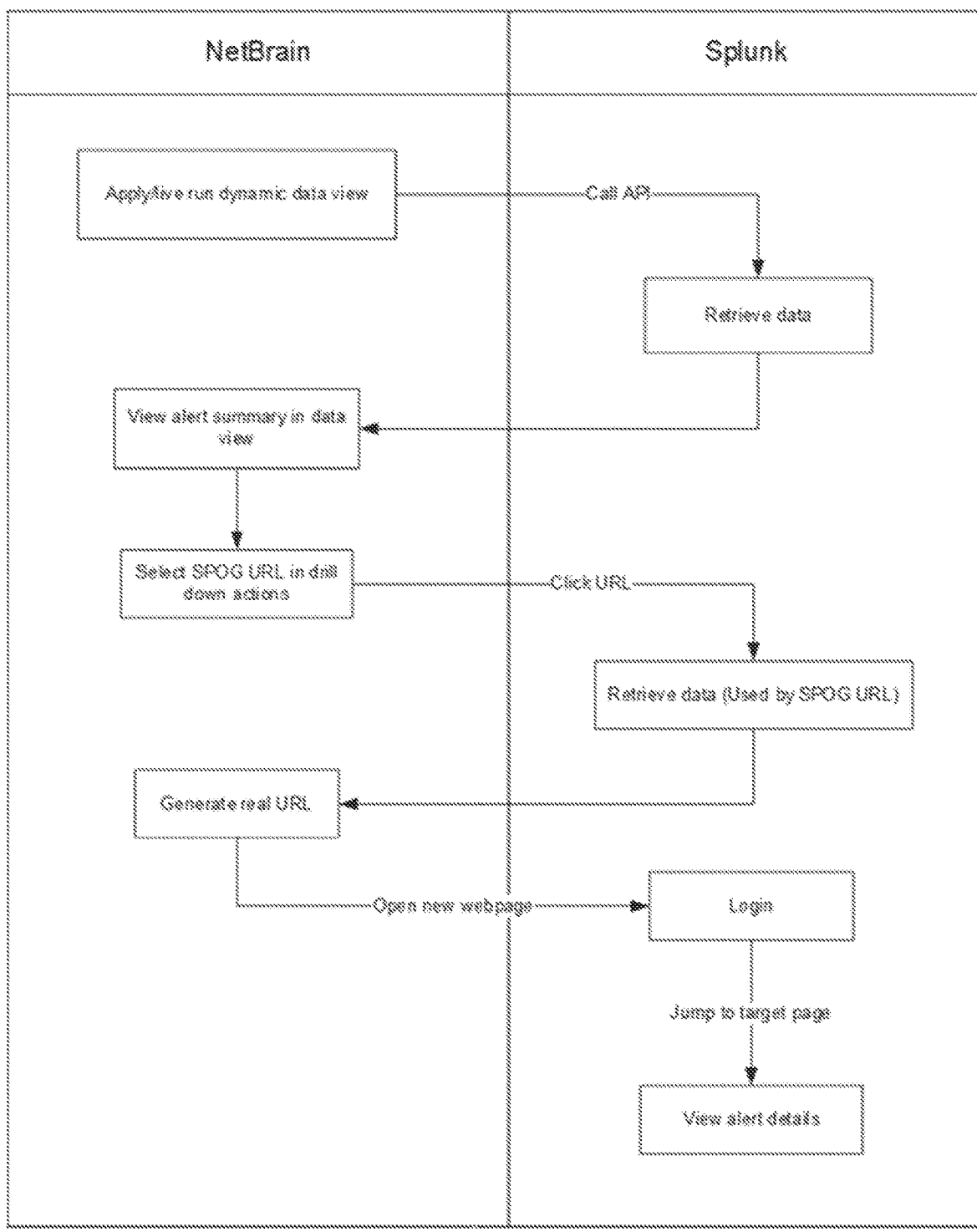
FIG. 44 is an alternative flowchart illustrating third-party interaction.

FIG. 44 is an alternative flowchart illustrating third-party interaction. The dynamic data view retrieves data from a third party (e.g. SPLUNK) that is displayed to the user. In one example, the event information retrieved via APIs will be displayed in a table-type data unit. In one example, expansion of the details, and clicking on the Event ID in a specific cell of the table generates the SPOG URL. The SPOG URL is selected which can retrieve further data from the third party which is used in the SPOG URL. Based on the retrieved data, the SPOG URL is modified/updated so that it opens the appropriate web page from the third party system.

Figure 45:
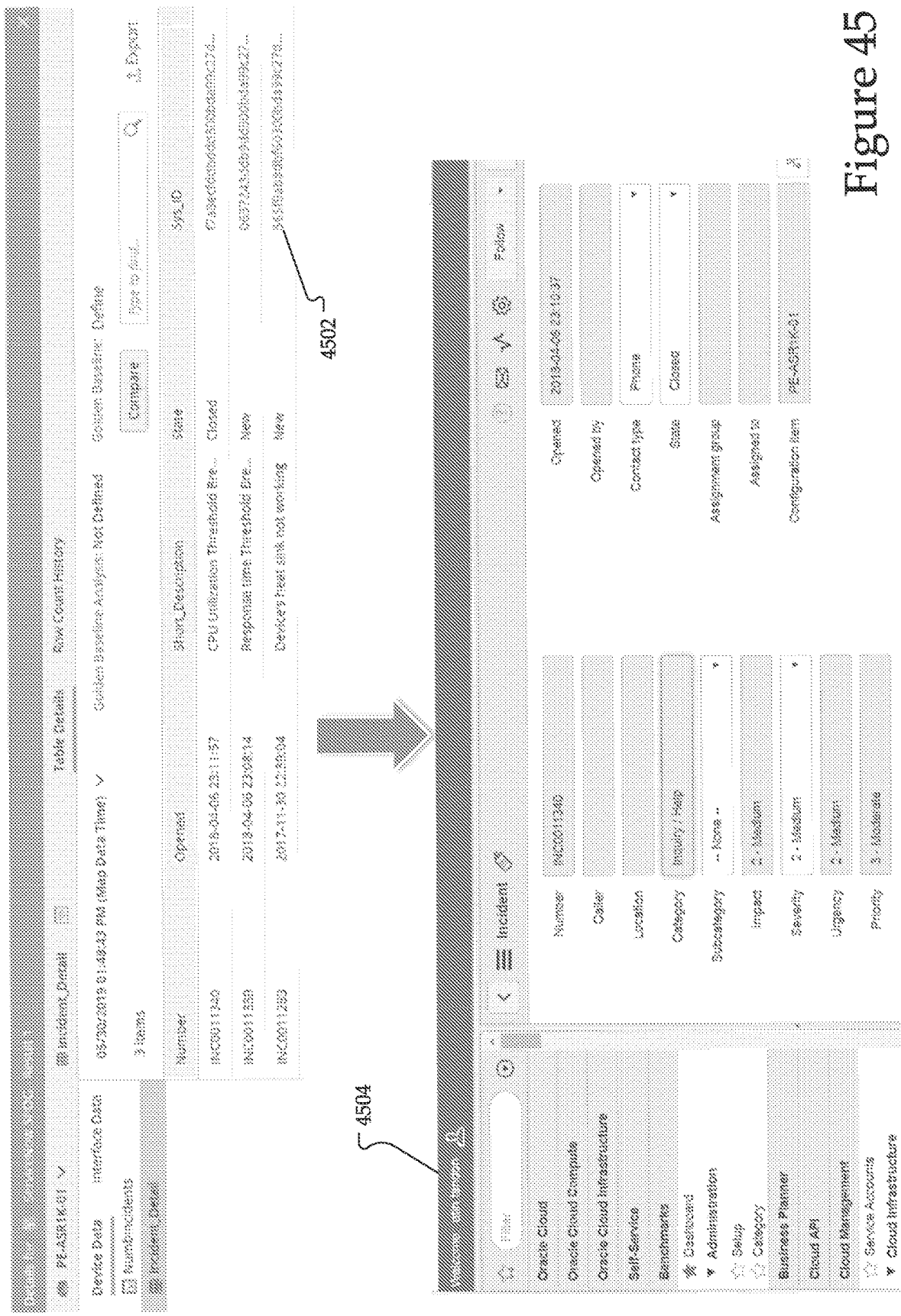
FIG. 45 is another example screenshot of the visualization of a single pane of glass (SPOG).

FIG. 45 is another example screenshot of the visualization of a single pane of glass (SPOG). In this example, the target webpage is in ServiceNow, which shows details about network incidents. In SPOG URL definition, the page URL is defined as: https://ven01749.service-now.com/nav_to.do?uri=incident.do?sys_id={$Sys_ID}. {$Sys_ID} 4502 may be an API parser variable refer to the incident ID in ServiceNow system. After applied on map, {$Sys_ID} 4502 is replaced with the actual value shown for {$Sys_ID} 4502 resulting in a SPOG URL of: https://ven01749.service-now.com/nav_to.do?uri=incident.do?sys_id=f7a8ecfddbddd4500bda99c27db9619f8. This URL leads to the window 4504 which may be a web page for a third party.

Figure 46:
In FIG. 46 is an example screenshot for scheduling of a data view template (DVT).

FIG. 46 is an example screenshot for scheduling of a data view template (DVT). A scheduled task 4602 may include scheduling DVTs 4604 on specific devices. DVTs may be scheduled against specific devices to get and save data regularly. Related data may be retrieved regularly and saved to a Data Engine (DE). This saved data may be used by on-demand running a DVT with cache data, and displaying historical data in detail pane. This is a scheduled task to retrieve and parse network data regularly by specifying DVTs or parsers. When a Dynamic Data View is applied to a map, the values of concerned parser variables may be instantly visualized based on the data collection. On-demand application of a DVT may be with cache data. It may not be a pre-generated Data View instance any more. The last cache data may be used to generate the Data View or the DVT may apply with live data. The instance may be saved in Runbook automatically.

Figure 47:
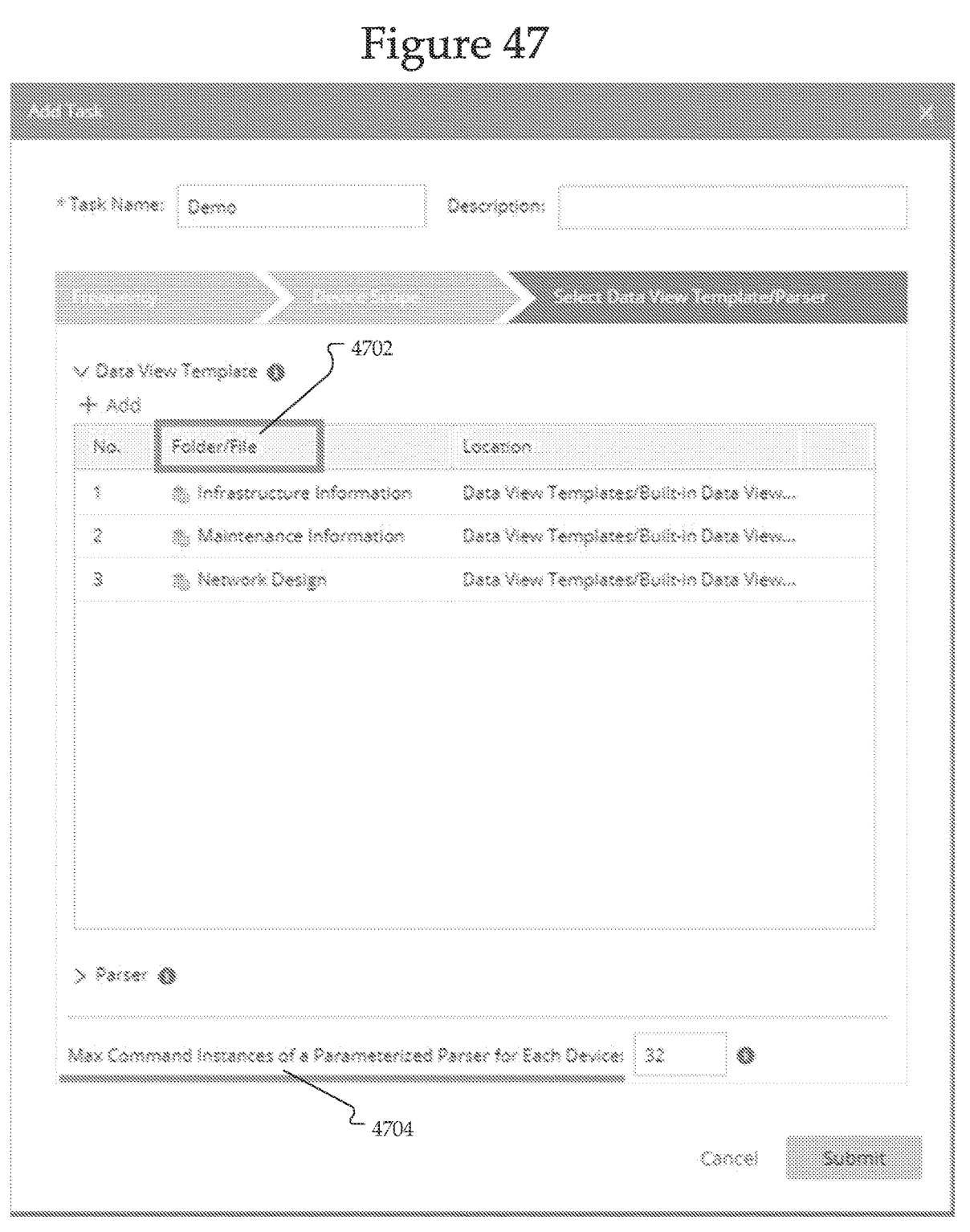

FIG. 47 is an example screenshot for scheduling of a data view template (DVT) task. A DVT task may use inputs such as Start Time and Frequency; Device Scope (both legacy devices and logic nodes are supported); and/or Data View Templates or Parsers. Folders 4702 with DVT/Parsers contained can be selected so that folder content change can be synced timely. Referenced parsers 4704 in a DVT may be applied to retrieve and parse data during task execution.

When a data view template that contains an auto-generated input variable is scheduled and executed, the system may pull all optional values of the input variable and pass each of them to the corresponding parser to generate CLI command instances. The Max Command Instances of a Parameterized Parser for Each Device parser field 4704 is used to limit the generated CLI command instances for each device included in this task. If the selected parsers have parameters, assign a smaller value to avoid devices overloaded due to the execution of too many CLI commands. In this example, the default value is 32.

FIG. 48 is an example screenshot of a golden baseline. A golden baseline serves as a reference standard of "healthy" status for various types of data or variables. It can be auto-calculated based on historical statistics or manually defined, and can be further used as a basis or foundation for network management analysis and comparison, such as during troubleshooting. If the comparison of data with the golden baseline indicates an anomaly, then an alert may be identified. A golden baseline defines a normal network state. For example a device CPU should be in range (0-90%), so data outside of the range would be an alert. Other examples of golden baseline conditions include: 1) interface CRC errors should not increase; 2) router R1 should have 3 BGP neighbors; and 3) a standard security related configuration. The system can automatically set the golden baseline values for certain variables by observing the behavior of network. Alternatively, a user could manually set the golden baseline values.

In FIG. 48, device NY_Core illustrates a variable 4802 that is highlighted red to identify a golden baseline alert. This alert 4804 is further shown in the data detail pane which shows the historical data analysis with golden baseline. The golden baseline in this example is for a range 0-50, but the chart illustrates a couple data points outside of that range which results in an alert being triggered.

Figure 49:
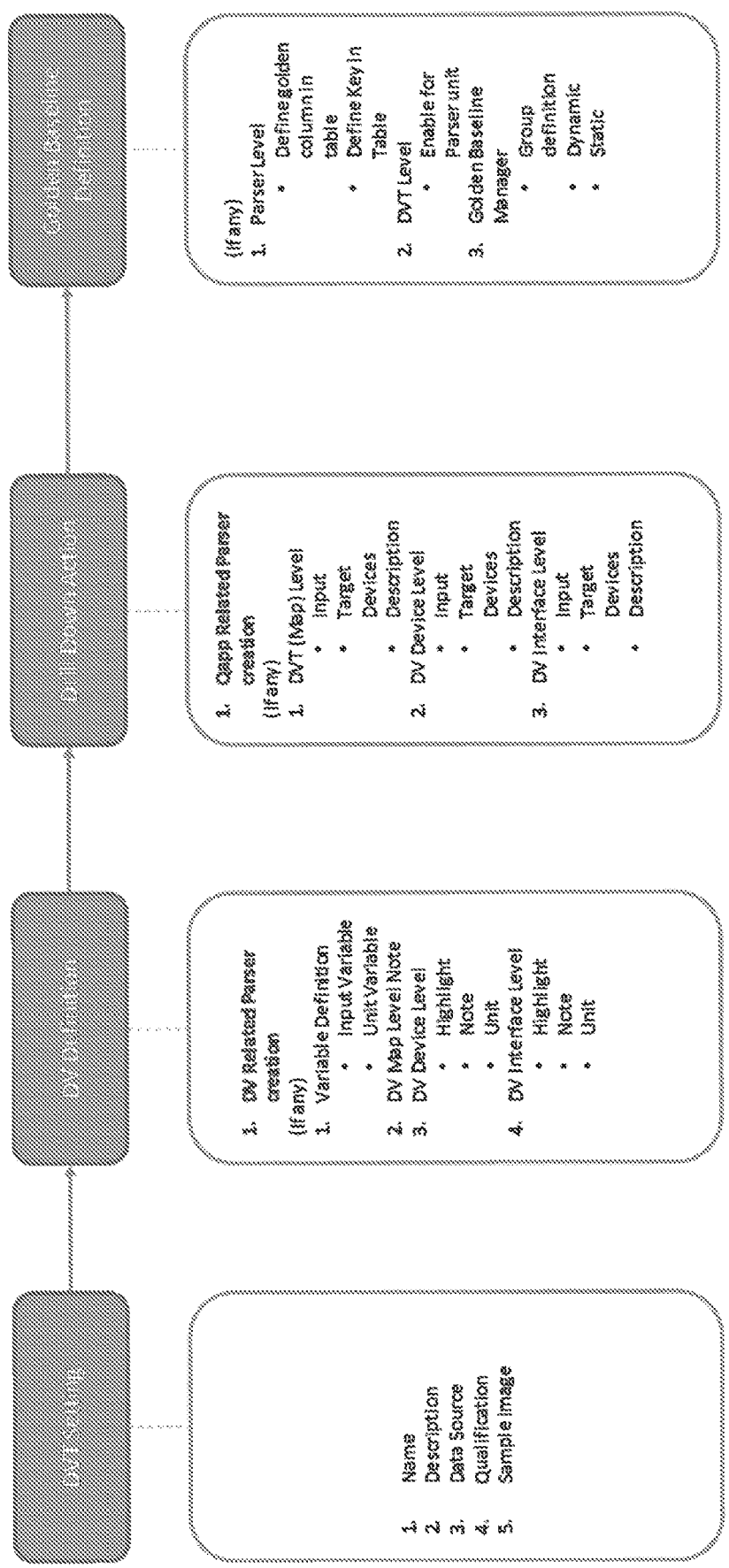
FIG. 49 is a flowchart illustrating the creation flow.

FIG. 49 is a flowchart illustrating the creation flow. The data view template (DVT) settings may include a name, description, data source, qualification, and/or sample image. The data view (DV) may then be defined. DV definition includes parser creation, variable definition (e.g. input variable or unit variable), DV map level notes, DV device level (highlights, notes, units, etc.), or DV interface level (highlights, notes, units, etc.). Drill-down actions can then be applied. The drill-down action may include Qapp related parser creation, and/or an input, target devices, and description at any of the DVT-level, the device-level, and/or the interface-level. The golden baseline can then be defined. At the parser level, the golden column in a table can be defined. At the DVT level, the parser unit may be enabled. A golden baseline manager may include a group definition, and may be dynamic or static.

Figure 50:
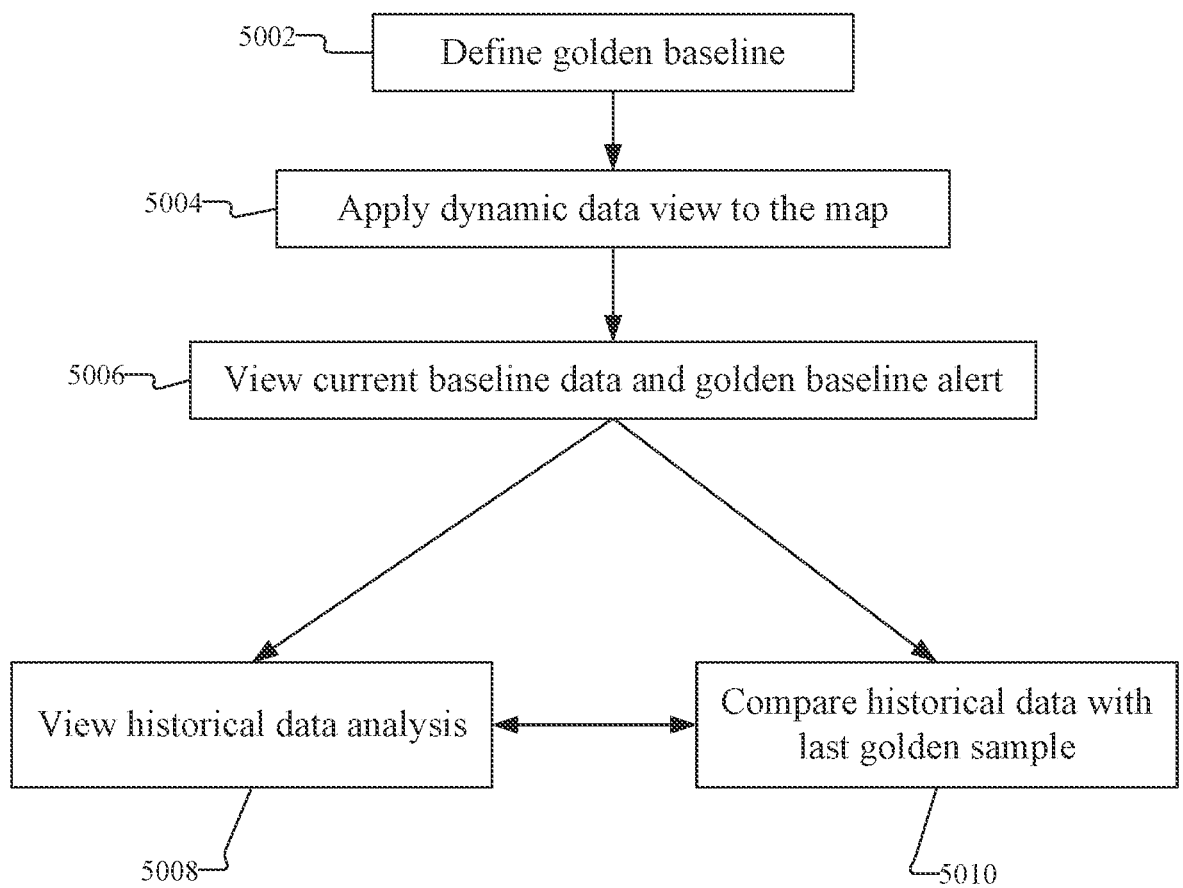
FIG. 50 is a flowchart illustrating data view flow with a golden baseline.

FIG. 50 is a flowchart illustrating data view flow with a golden baseline. In block 5002, a golden baseline is defined. The golden baseline can be specific to a particular device/interface, apply to a group/subset of the devices/interfaces, or apply to the entire network. The golden baseline is a condition or rule that establishes normal operation. Detected behavior outside of the rule (meaning problematic operation) results in golden baseline alert. In block 5004, the dynamic data view is applied to the map and the current baseline data and golden baseline rule for an alert is shown in block 5006. In one embodiment, the data view may be dynamic for data driven troubleshooting flow. A map can be created for a troubleshooting task. A DV may be applied to view the design and operational status (e.g. variables from CLI command or data from 3rd party system and monitoring data). Historical data analysis may be provided in block 5008. There is a comparison of data with golden baseline and/or benchmarked data in block 5010. Based on the comparison, the actions can be executed as recommended by the system such as Qapp, Runbook and CLI commands.

Figure 51:
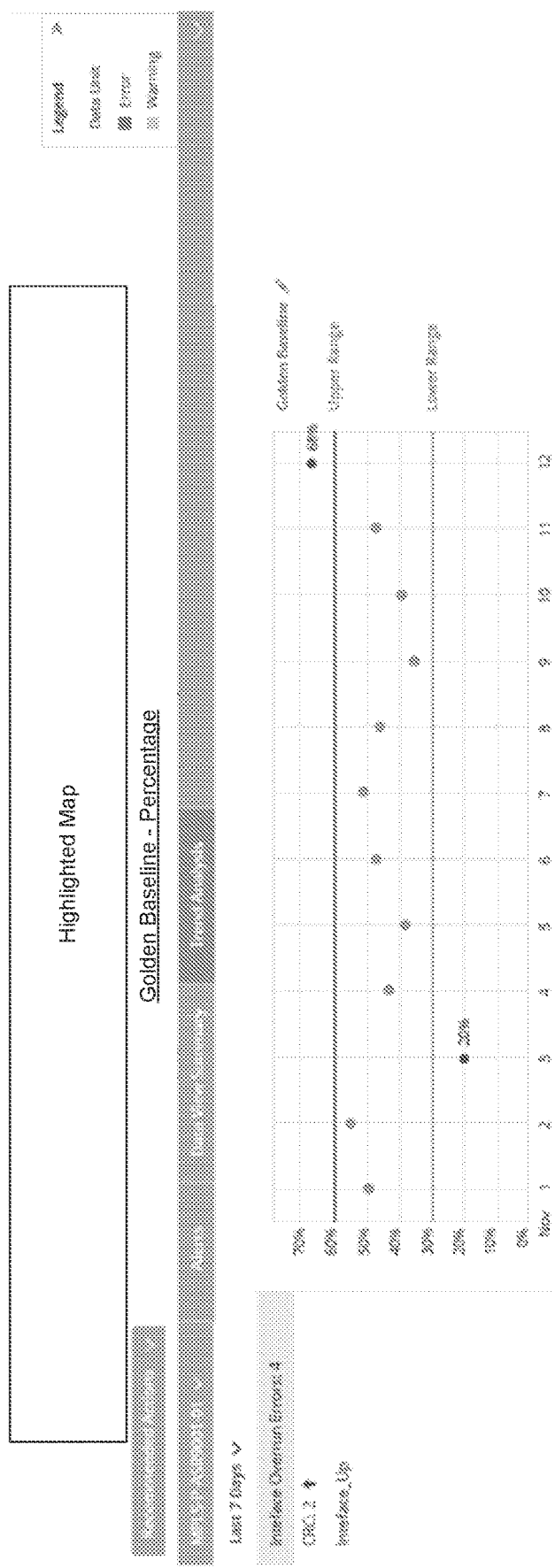
FIG. 51 is an example screenshot of a golden baseline based on percent.

FIG. 51 is an example screenshot of a golden baseline based on percentage. FIG. 51 illustrates a golden baseline that includes a lower range of around 30% and an upper range of around 60%. Data measurements outside of that range would result in an alert condition. The following table illustrates exemplary golden baseline rules or conditions that may be used for the different variable types (number, string, table). Table 3 further provides an example for each of the golden baseline rules. These are merely examples and many of the golden baseline rules described may be applied to any of the variable types.

TABLE 3

Golden Baseline Rules for different parser variable types.

| Variable Type | Golden Baseline Rule | Example |
| --- | --- | --- |
| Number | Equals | "$BGP_neighbor_count" equals 3 |
|  | Equals any of | "$mtu" equals 1500 or 1514 |
|  | Not Equals to | "$In_traffic" not equals to 0 |
|  | Range | "$BGP_routes" range (400, 420) |
|  | Less or Equal | "$interface_utilization" less than or equals 50% |
|  | Greater or Equals | "$tunnel_counts" greater than or equals 3 |
|  | No Change | "$CRC_error" |
|  | (Equals Last Value) | This rule is used if the expected behavior for the variable should be kept as it is and should not change. |
|  | Continuously Increase | "$device_up_time" |
|  |  | This rule is used if the expected behavior for the variable should keep increasing. |

TABLE 3-continued

Golden Baseline Rules for different parser variable types.

| Variable Type | Golden Baseline Rule | Example |
|---|---|---|
| String | Equals | "$version_number" equals 12.1 |
| | Equals any of | "$ospf_neighbor_status" equals any of "2 way", "established" |
| | Not Equals to | "$Interface_status" Not equals to "Down" |
| | Regex | Enter a regular expression and the system will search the entire parser variable results to see if there's a match. |
| Table *) | Equals | "$BGP_neighbor" equals XXX |

Figure 52:
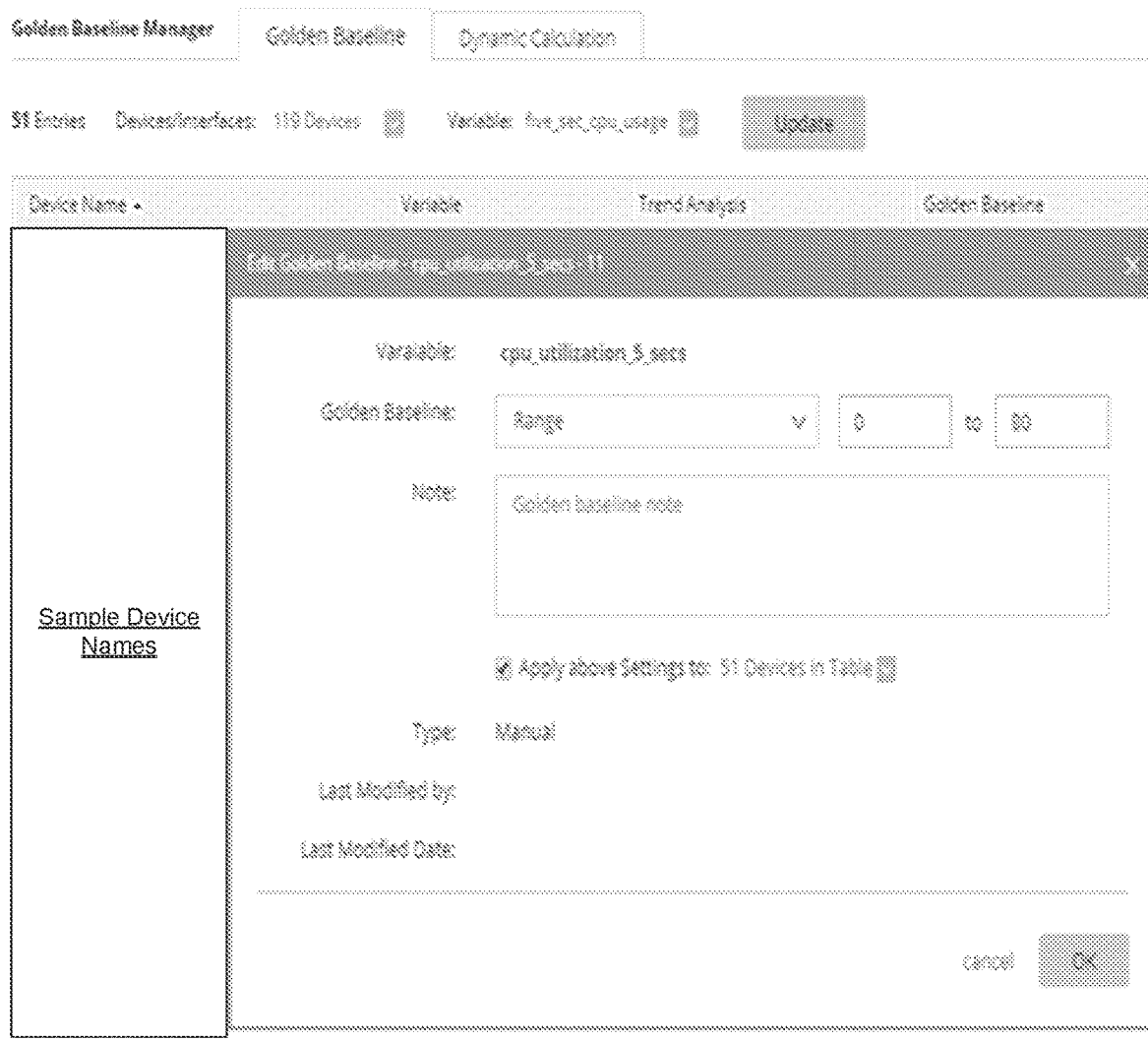
FIG. 52 is an example screenshot for defining a golden baseline with a golden baseline manager.

FIG. 52 is an example screenshot for defining a golden baseline with a golden baseline manager. The golden baseline manager displays a particular variable and allows the user to set the golden baseline ("Range" in this example is set 0 to 80). A detection of this variable operating outside of 0 to 80 results in a golden baseline alert. In the golden baseline manager, users can define golden baseline rules for parser variables designated to a batch of devices/interfaces. Users can batch define, modify and delete golden baselines for parser variables. A batch of devices/interfaces can be selected per device type, device group or site. In addition, there may be an enhanced device group to enable users to batch define golden baseline for a group of interfaces.

Figure 53:
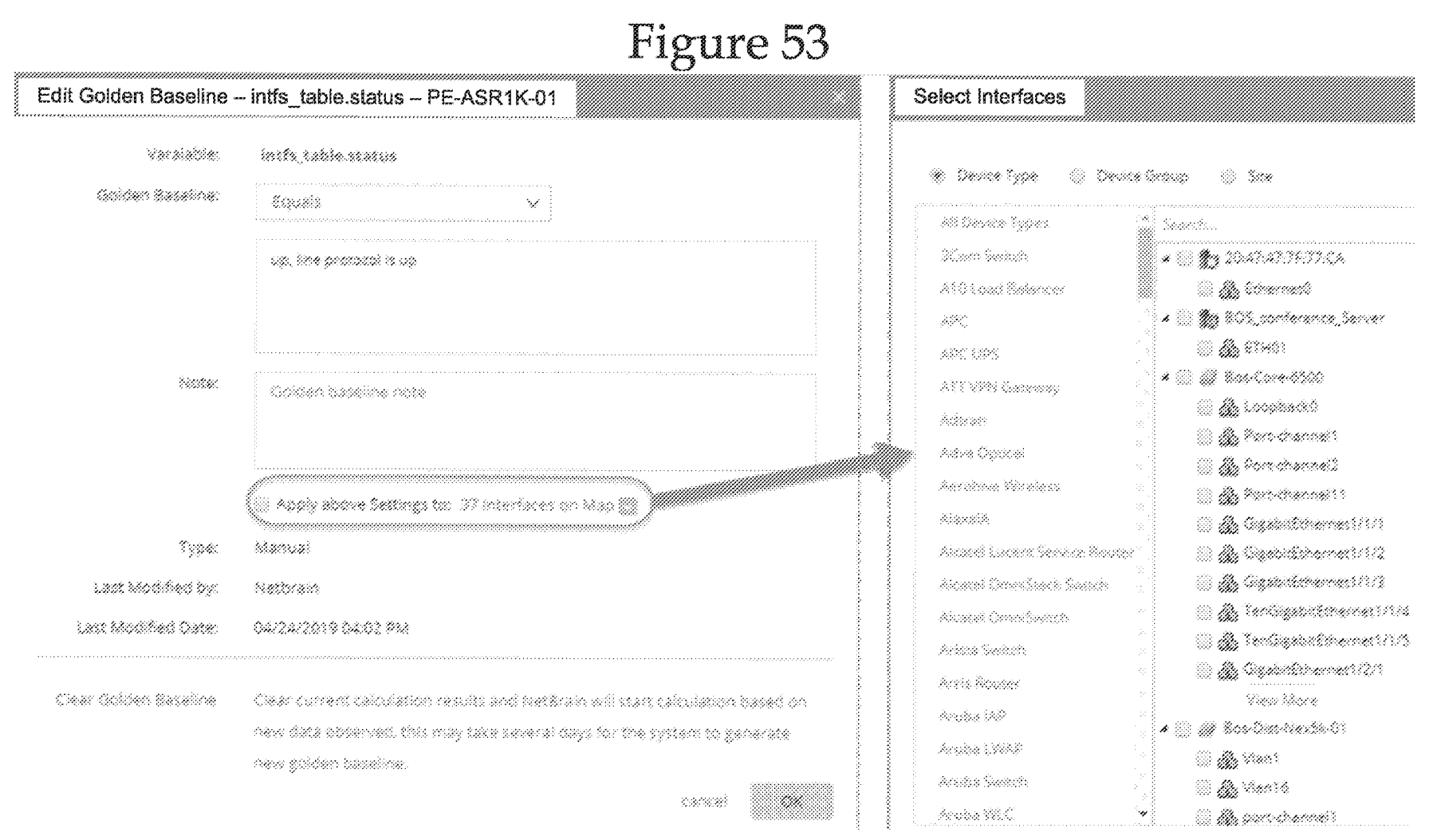

FIG. 53 is an example screenshot for defining a golden baseline within a map. After applying a DVT to a map, users can define golden baseline rules for parser variables according to their variable types, and apply the rules to devices/interfaces on the map. The system allows users to apply the rules to additional selected devices/interfaces, even not on the map or not of the same device type. When the rules are applied to other device types, the system may look up variable mappings to find out the corresponding variables of those devices. The example in FIG. 53 illustrates that the variable intfs_table.status must equal "up, line protocol is up." This golden baseline rule can be applied to "37 interfaces on Map" as shown in FIG. 53.

Figure 54A:
FIG. 54a is an example screenshot for dynamically calculating a golden baseline rule.

FIG. 54a is an example screenshot for dynamically calculating a golden baseline rule. The variable $mtu is shown with multiple parsers, tables, device types. In the upper right, there is a golden baseline dynamic calculation that dynamically/automatically determines where to set the golden baseline. To enable/disable the dynamic calculation of golden baseline for a parser variable, the user can go to Variable Mapping>Global Variable. By checking this option for a global variable, its referenced parser variables will participate in the dynamic calculation. With Machine Learning, there is an auto-calculation mechanism (dynamic calculation) to set golden baseline for parser variables based on real and historical data generated through scheduled tasks. Once a golden baseline is manually modified with customized rules, its auto calculation function may be at least temporarily disabled. To re-enable dynamic calculation, users can clear the manually defined golden baseline rule. There may be a global command to enable/disable dynamic calculation. The Golden Baseline Manager may provide an option to disable the dynamic calculations for all golden baselines. As a result, all the existing dynamic calculation process may be disabled. The system allows users to clear all the existing dynamic calculation results for a golden baseline and will re-calculate with new data.

The automatic calculation of a golden baseline rule may also be referred to as dynamic calculation or a dynamic golden baseline rule. For a number type dynamic golden baseline rule, Table 4 illustrates examples of required data points. The examples shown in Table 4 are for Equals, Equals any of, Range, No Change, and Continuously Increase. In this example, the dynamic calculation requires a certain number of data points before being able to dynamically establish the golden baseline rule. For the Equal rule, there may be three data points that are the same to establish the rule. For other rules, there may need to be ten different data points for an accurate dynamic golden baseline rule. Table 4 is merely exemplary and the required number of data points may be larger or smaller for dynamic calculations depending on the data and frequency with which the data is updated:

TABLE 4

Dynamic Golden Baseline Rule for Number Type

| Available Type | Required Data Points |
|---|---|
| Equals | at least requires data at 4 different time points for calculation, and the first three values must be exactly the same. |
| Equals any of Range | at least requires data at 10 different time points for calculation. |
| No Change - Equals Last Value | |
| Continuously Increase | |

The dynamic golden baseline rule for string type may be calculated for different types. The examples from Table 3 are Equals, Equals any of, Not Equals to, and Regex. Any of those may be established as dynamic golden baseline rules. In one embodiment, the Equals or Not Equals to rules may be set up to require data at four different time points for dynamic calculation, with the first three values being exactly the same (for Equals) or different (for Not Equals). For Equals any of or Regex, the required data points may be set at ten different data points. The required data points are merely exemplary and could be greater or fewer depending on the data and frequency with which the data is updated. Table 5 illustrates one example of an Equals calculation showing that three data points are require for establishing the dynamic golden rule:

TABLE 5

Dynamic Golden Baseline Rule for Equals

| | 1st Time | 2nd Time | 3rd Time | 4th Time | 5th Time | 6th Time | 7th Time | 8th Time |
|---|---|---|---|---|---|---|---|---|
| Data | 12.1 | 12.1 | 12.1 | 12.1 | 12.2 | 12.2 | 12.2 | 12.2 |
| Golden Baseline | Calculating | Calculating | Calculating | Equals 12.1 | Equals 12.1 | Equals 12.1 | Equals 12.1 | Equals 12.2 |
| Alert | N/A | N/A | N/A | No Alerts | Alert Detected | Alert Detected | Alert Detected | No Alerts |

The Equals rule may apply to numbers or string. In one embodiment, a dynamic golden baseline rule for Equals would require three data points to dynamically/automatically establish the golden baseline rule. Table 5 illustrates the golden baseline that is set over 8 data points. For the first three data points, the golden baseline is calculating. On the 4$^{th}$ data point, the data has been the same, so the golden baseline rule is set to be Equals 12.1. However, in the 5$^{th}$ data point, the data has changed, so the dynamic golden baseline alert is triggered because the data no longer equaled 12.1 as established by the dynamic golden baseline rule. After the 5$^{th}$-7$^{th}$ data point at the new data of 12.2, the golden baseline is dynamically updated to be Equals 12.2. In the 8$^{th}$ data point, the data 12.2 matches the dynamically created golden baseline rule.

Figure 54B:
FIG. 54b is a screenshot of the golden baseline manager dynamic calculation block time.

FIG. 54b is a screenshot of the golden baseline manager dynamic calculation block time. In the Global Dynamic Golden Baseline Settings, dynamic calculation can be enabled/disabled. In addition, there may be a block time that can be set up to prevent Golden Baseline from calculating for certain devices during certain time periods. Specifically, the user may create blocking entries to specify for any subset of devices, to prevent the golden baseline from calculating during certain time periods.

Figure 55:
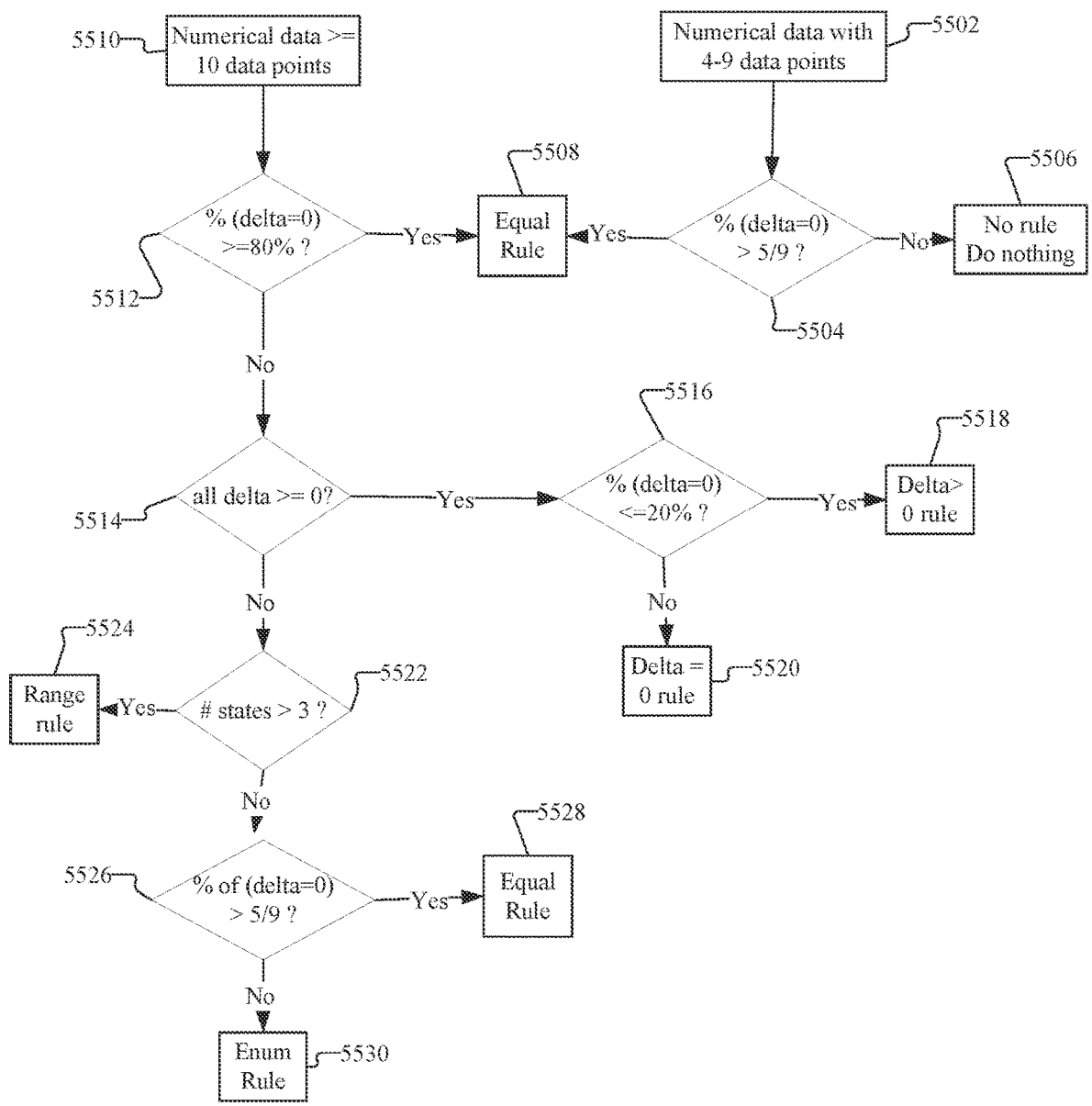
FIG. 55 is a flow chart illustrating the dynamic calculation for establishing a golden baseline rule.

FIG. 55 is a flow chart illustrating the dynamic calculation for establishing a golden baseline rule. This flow chart illustrates how the system can dynamically establish which rule is needed without knowing the rule type. The chart is exemplary for the number type and the comparison values and data points may be modified. In block 5502, there is a determination of data points between 4 and 9. If there are 10 or more data points, then block 5510 is relevant. With 4-9 data points, the system looks at the percentage of changes between each data point (i.e. delta is a change between data points) and determines whether the percentage of no delta is greater than ⅝. The ⅝ is one example and could be changed to a different value. If the percent of no change is not greater than ⅝, then in block 5506, there is no rule to be set. If the percent of no change is greater than ⅝, then in block 5508, the equal rule is established based on the fact that the data points did not change at least ⅝ of the time. When the number of data points is greater than or equal to 10 in block 5510, the percent of delta=0 may be compared with 80% in block 5512. The 80% comparison is merely exemplary and could be set at a different percentage.

If the number of times that the data points do not change is greater than or equal to 80%, then that is enough data to establish the equal rule in block 5508. If the number of times that the data points do not change is less than 80%, then the equal rule cannot be established and in block 5514, a determination is made as to whether all deltas are greater than zero. In addition, there may be one delta point less than zero if the absolute value of the negative delta is greater than 10 times the maximum of other data, which establishes a reset point in block 5514. If the delta is continuously increasing in block 5514, then determine whether the percent of deltas equaling zero is less than or equal to 20% in block 5516. If the percent of deltas equaling zero is less than or equal to 20%, then in block 5518, there may be a delta greater than 0 rule. If the percent of deltas equaling zero is not less than or equal to 20%, then in block 5520, there may be a delta equals 0 rule.

When block 5514 is not satisfied, then a determination is made as to whether the number of states is greater than 3 in block 5522. If the number of states is greater than three, then the range rule may be established in block 5524. The range rule may establish a lower band and an upper band, which may be manually entered or automatically calculated. In one embodiment, the range may be defined as [mean−3*std, mean+3*std] where std is the standard deviation, which (along with the mean) may calculated on available history data rather than current data. The lower bound of the range may need to be >=0. The alert is triggered when the data is out of the range. For percentage dataset in history, the max of the data may be <100 (for percentage data), where the lower and upper bound of range could be within [0, 95]. In other words, in one embodiment, the lower bound may be set >=0 and the upper bound set at <=95.

If the number of states is not greater than three in block 5522, then a determination is made of the percent of delta=0 being greater than ⅝ in block 5526. If the percentage of times the data state does not change is greater than ⅝, then the equal rule is established in block 5528. If the percentage of times the data stat does not change is less than or equal to ⅝, then the Enum rule is established in block 5530. The Enum rule is equals any of.

Figure 56:
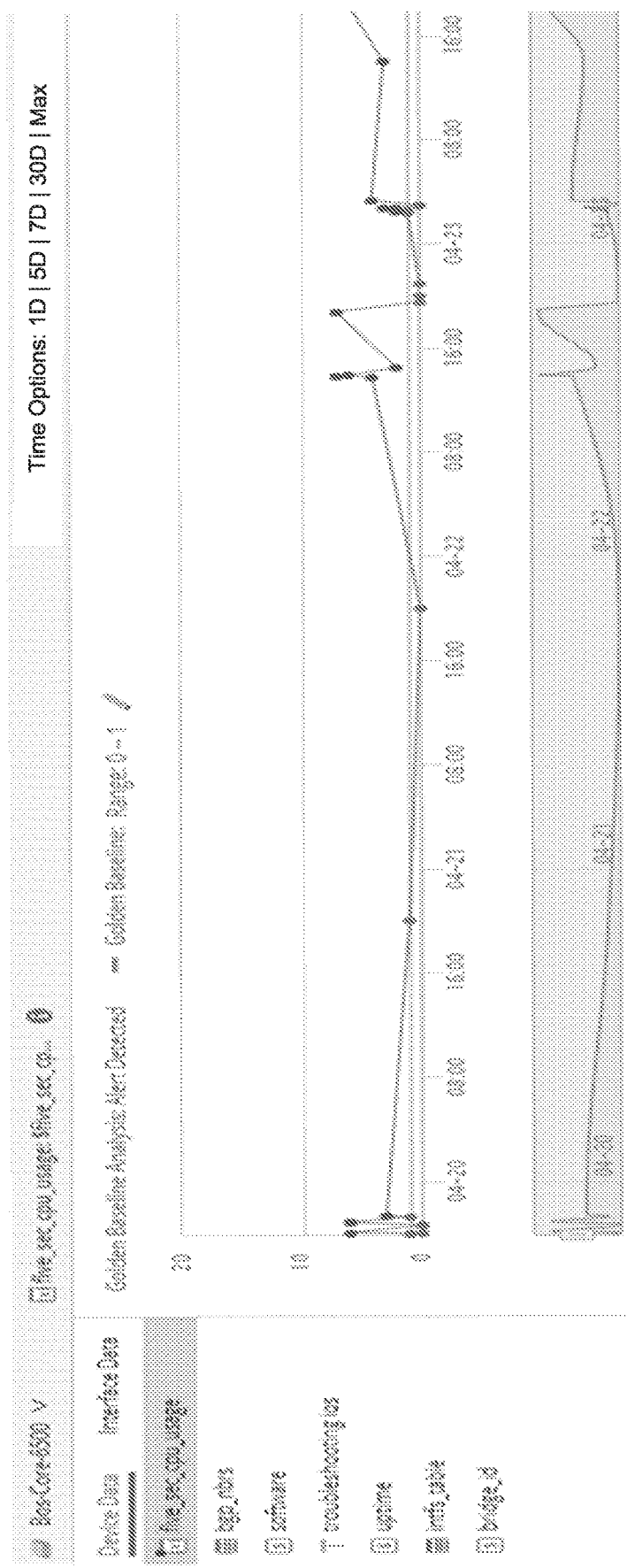
FIG. 56 is an example screenshot for viewing historical data analysis on the detail pane.

FIG. 56 is an example screenshot for viewing historical data analysis on the detail pane. The golden baseline rule is a range of 0-1 and illustrates numerous alerts because the data was outside the rule's range. There may be dynamic calculation logic for different variable types. There may be golden baseline rules for string/number/table-type variables that can be dynamically calculated. There may be differences depending on the type of variable (e.g. number, string, table, etc.). For a number-type variable, the values are displayed in a chart, and red dots refer to off-normal items. For a string-type variable, the values are displayed in a table, and the off-normal item is highlighted in red. For the table-type variable only the current values are displayed. If there are any off-normals (outside of the established golden baseline rule), then alerts will be displayed in the golden baseline analysis field.

Figure 57A:
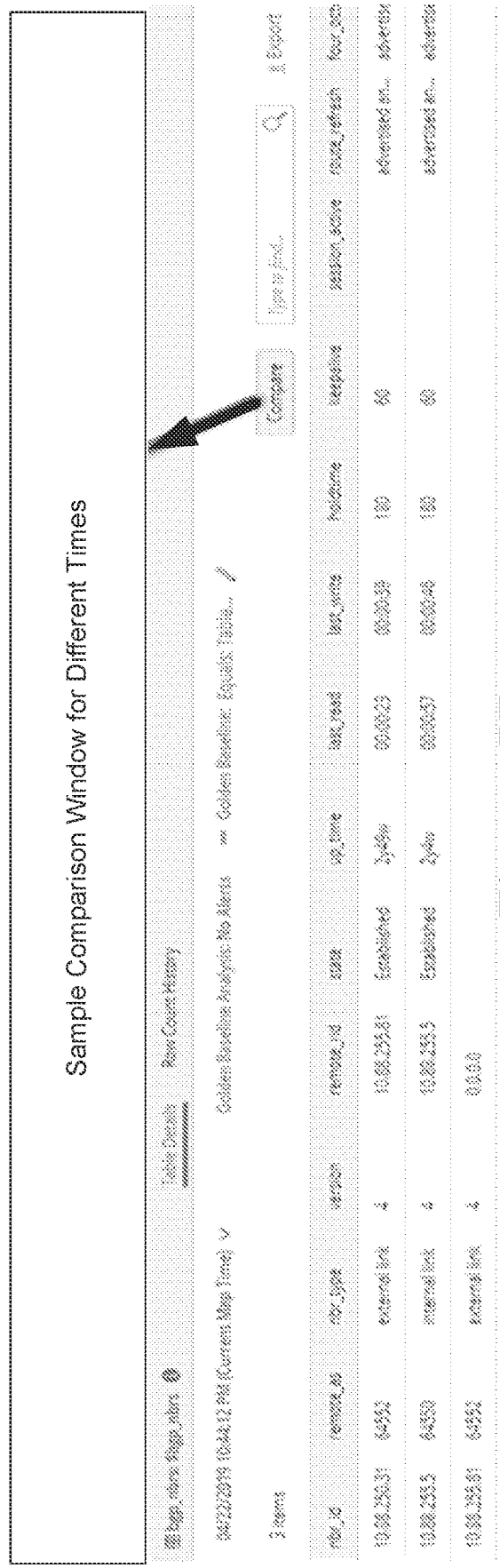
FIG. 57a is an example screenshot for comparing data with a golden sample.

FIG. 57a is an example screenshot for comparing data with a golden sample. A golden sample is a copy of data that matches the golden baseline rule. For manually defined golden baselines, the data may be checked against the golden baseline rule each time, so the golden sample is the last data point that matches golden baseline rule. For auto-calculated golden baselines, the data will only be checked against golden baseline rule the first time when the golden baseline rule is created, so the golden sample is the first data point that matches golden baseline rule. FIG. 57a illustrates a detail view screen with a compare button which triggers a dialog box that is a comparison of "Current Data Time" with a golden sample.

Figure 57B:
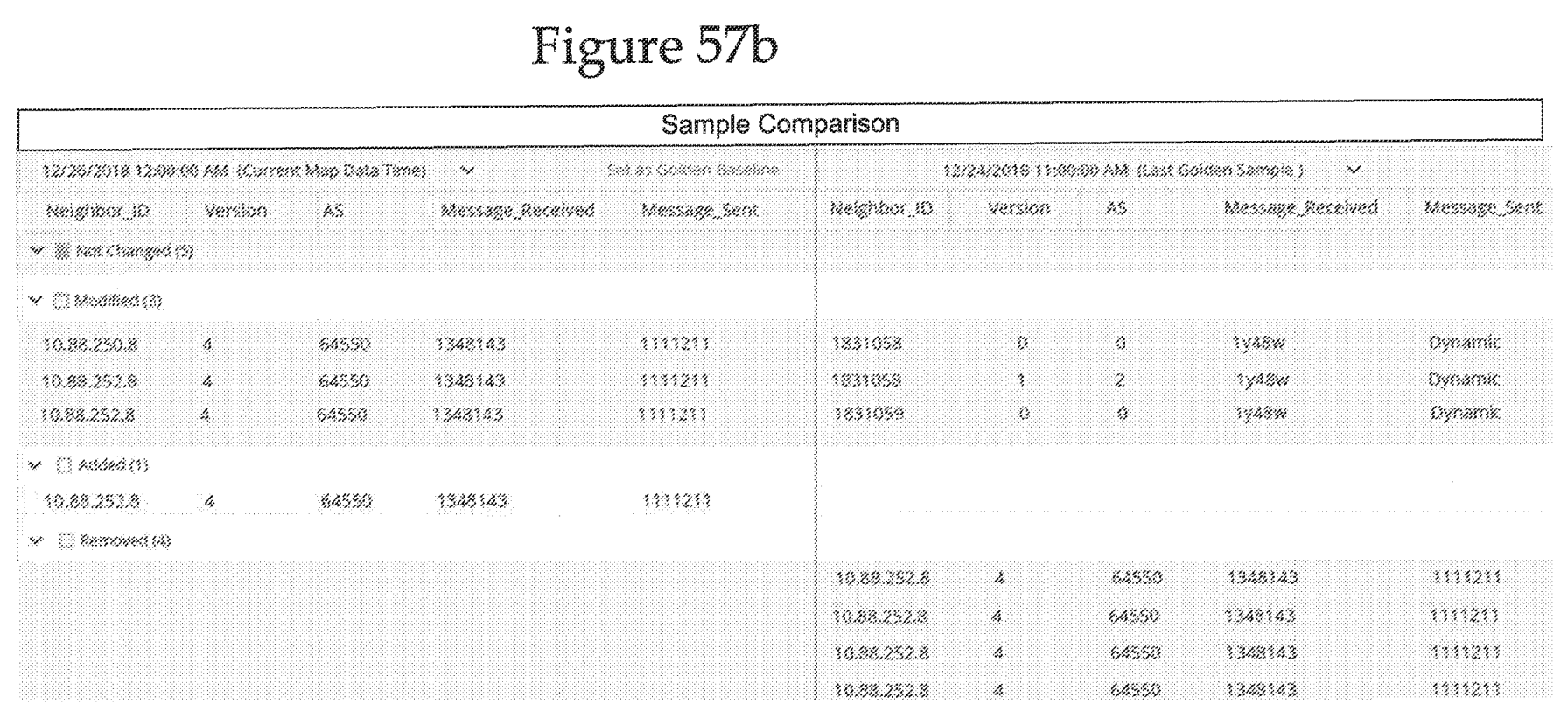

FIG. 57b is an example comparison screenshot showing changes from a golden baseline. After the comparison with a golden sample, FIG. 57b shows a window comparing the current data (Current Map Data Time) with the "Last Golden Sample." The user can identify which changes occurred that may have triggered an alert. The comparison may be for different types of data, but FIG. 57b shows a comparison of table data.

Figure 58:
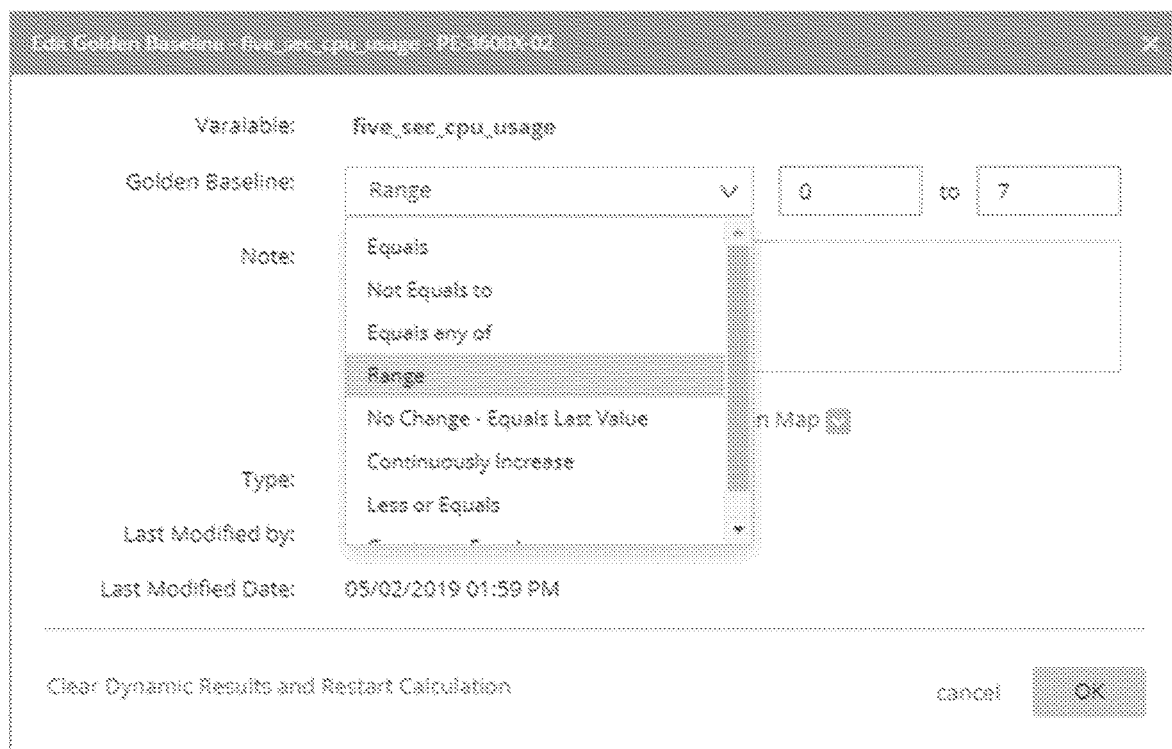
FIG. 58 is an example screenshot of setting a number golden baseline rule.

FIG. 58 is an example screenshot of setting a number golden baseline rule. The variable is five_sec_cpu_usage and the selected golden baseline in this example is a range, which is set from 0 to 7. This is one example of setting a number golden baseline rule. As shown in Table 3, there may different types of golden baseline rules for number variables.

Figure 59:
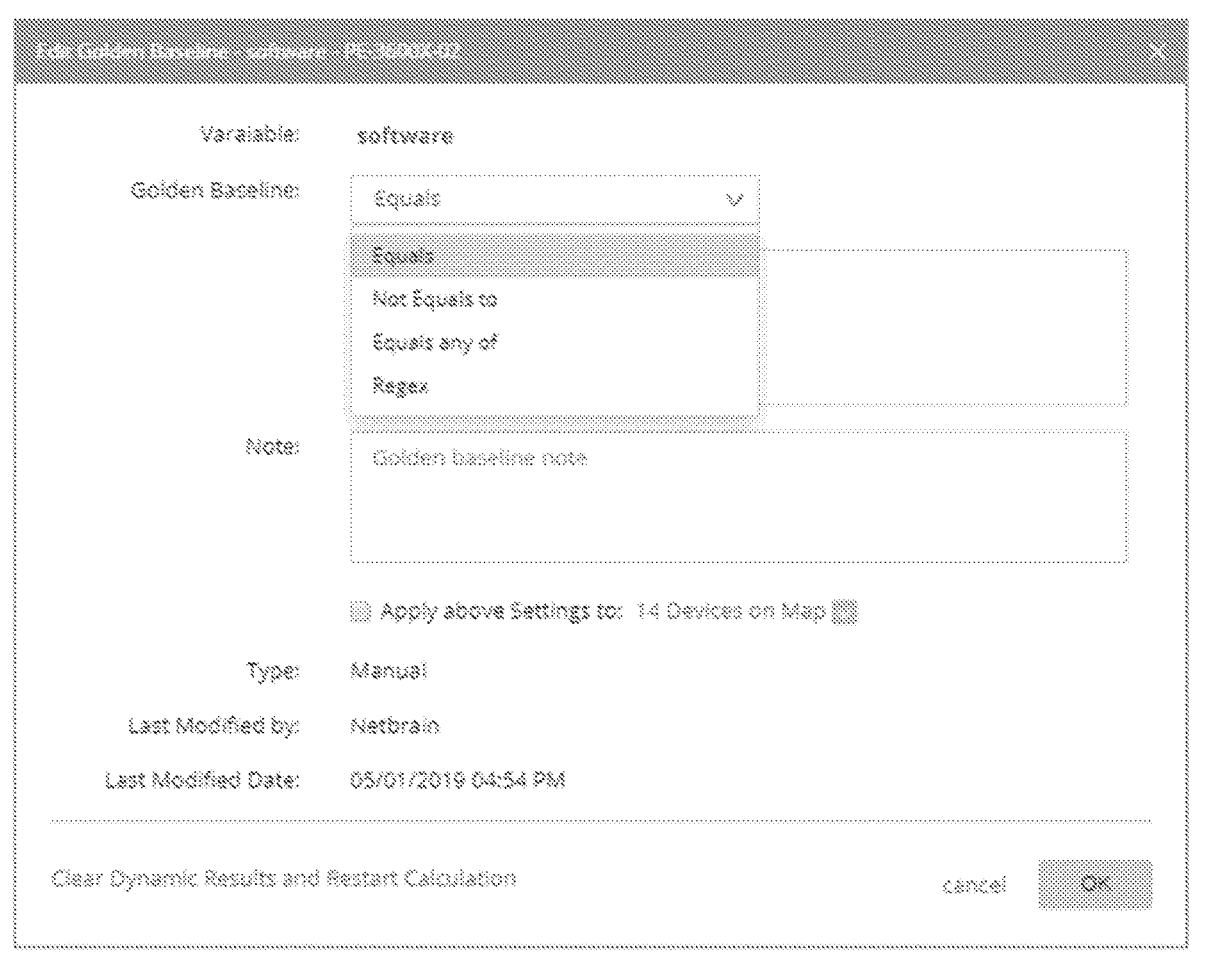

FIG. 59 is an example screenshot of setting a string golden baseline rule. The variable is software and the selected golden baseline rule in this example is equals. The actual rule which establishes what the variable software must equal for this golden baseline rule is not shown because it is beneath the drop-down menu for selecting the golden baseline rule type. This rule can be applied to one or more devices and in this example, the rule lists 14 devices on the map that it can be applied to.

Figure 60:
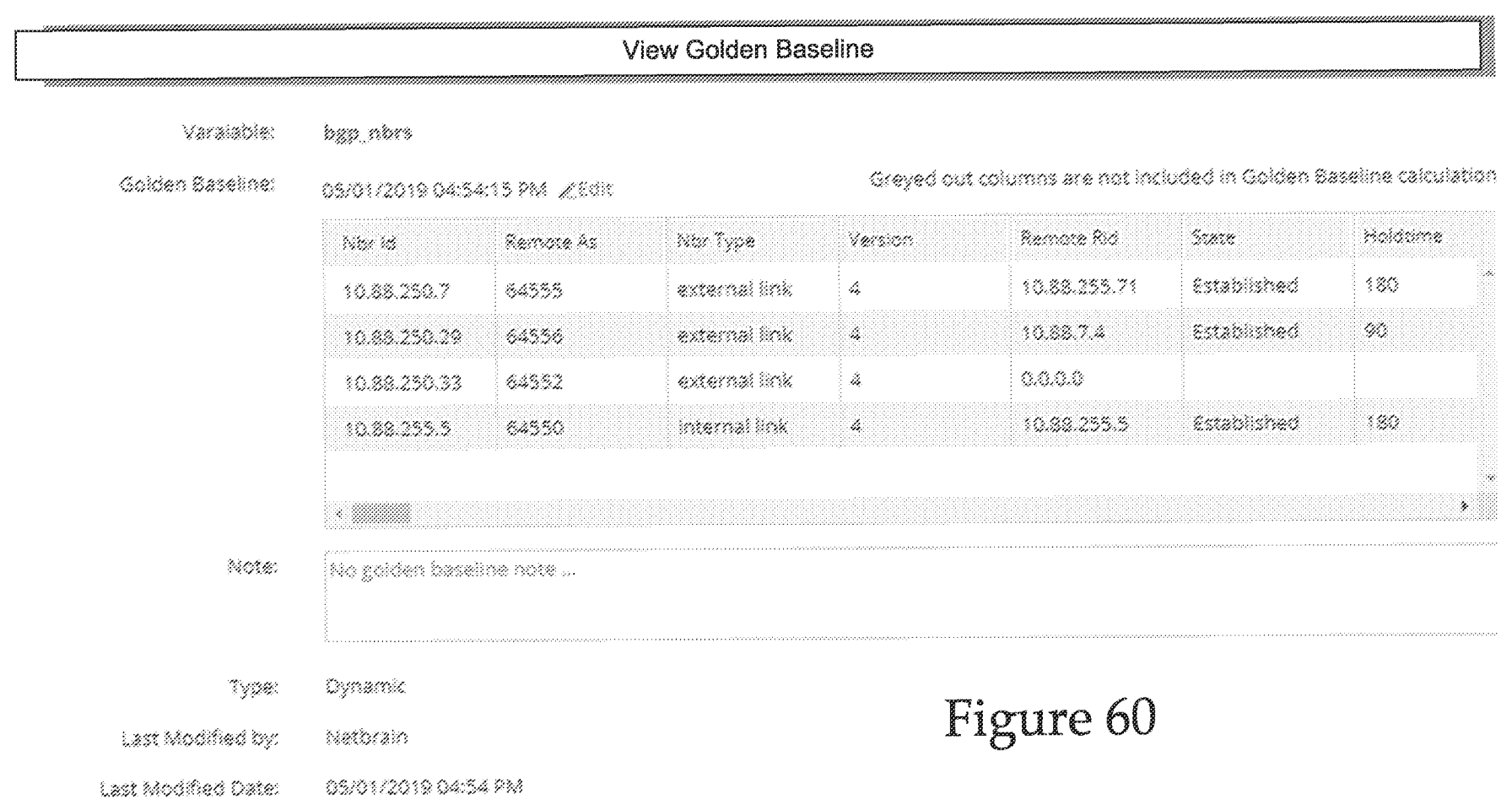

FIG. 60 is an example screenshot of setting a table golden baseline rule. The variable is bgp_nbrs and the table columns are shown. Editing the golden baseline rule allows the user to set which columns are included in the golden baseline calculation. An interface key or table key may be required for each table-type parser variable. Otherwise, neither manual definition nor dynamic calculation may be done to set the golden baseline for table-type variables. The golden baseline definition for table-type variables may allow for selecting only part of table columns, which can be done in the parser definition. In one example, unimportant columns or constantly changing columns can be ignored. According to the predefined compared columns, the system generates hash values in parsers, and convert into single-value strings for comparison and analysis. The analysis logic may be the same as that for string-type variables. Table 6 is an example showing "BGP Neighbor", "Version" and "AS Number" columns are predefined as compared columns, then only the corresponding hash values for these three columns will be generated for comparison. There are three columns that are ignored and not part of the table golden baseline.

TABLE 6

Example of Table Comparison for Golden Baseline Rule.
BGP Table Key

| Comparison Columns | | | Ignore Columns | | |
|---|---|---|---|---|---|
| BGP Neighbor | Version | AS | MsgRCD | MsgSent | InQ |
| 10.100.1.1 | 4 | 200 | 26 | 22 | 0 |
| 10.200.1.1 | 4 | 200 | 51 | 23 | 0 |

Figure 61:
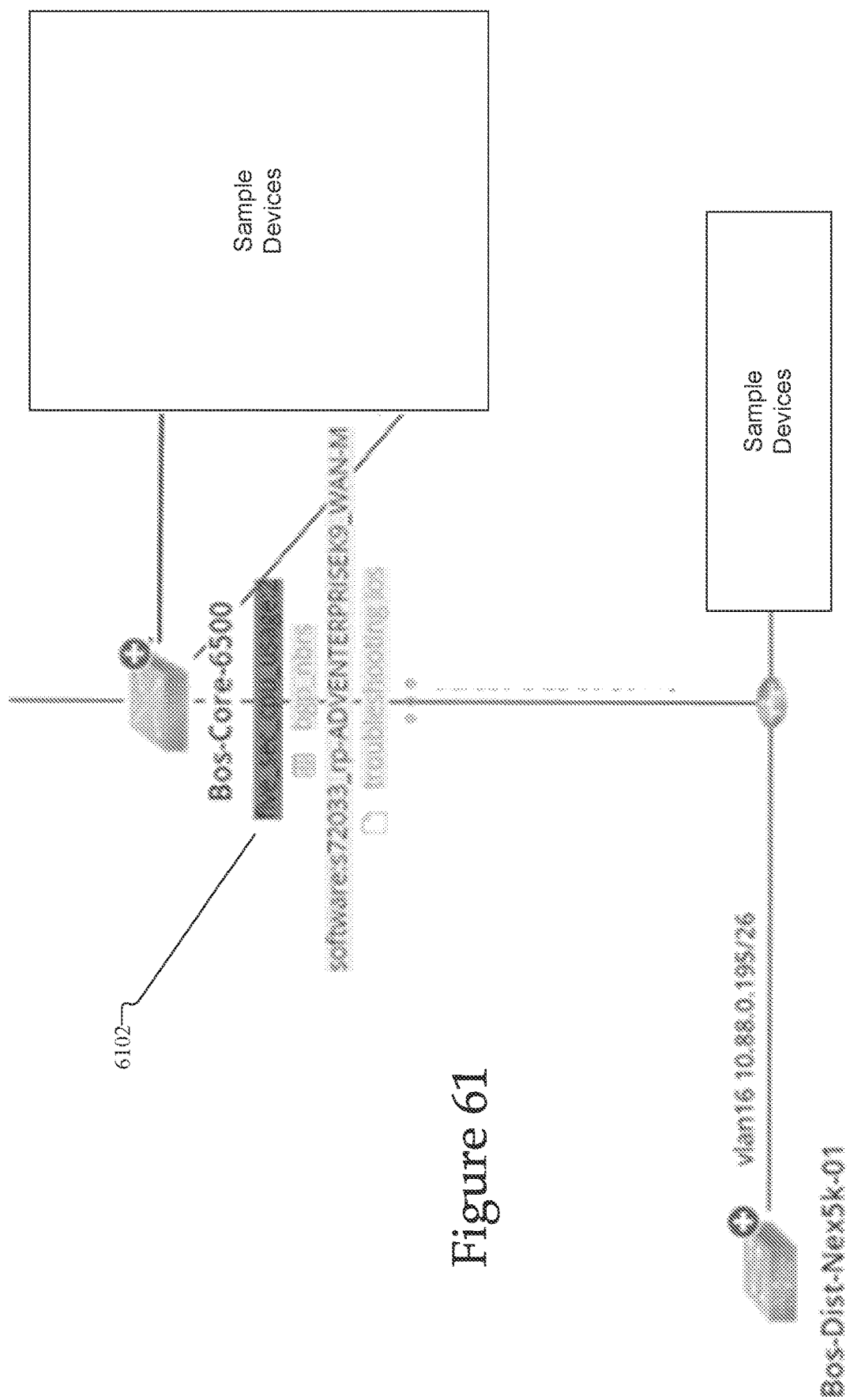
FIG. 61 is an example screenshot of a map after applying data view.

FIG. 61 is an example screenshot of a map after applying data view. Each device includes a series of clickable links beneath of then for showing information about that device. In one embodiment, if there is a golden baseline alert, that is highlighted as in the five_sec_cpu_usage 6102 alert which is highlighted. This alert identifies that the variable failed a golden baseline rule and the user may need to perform a troubleshooting operation.

Figure 62:
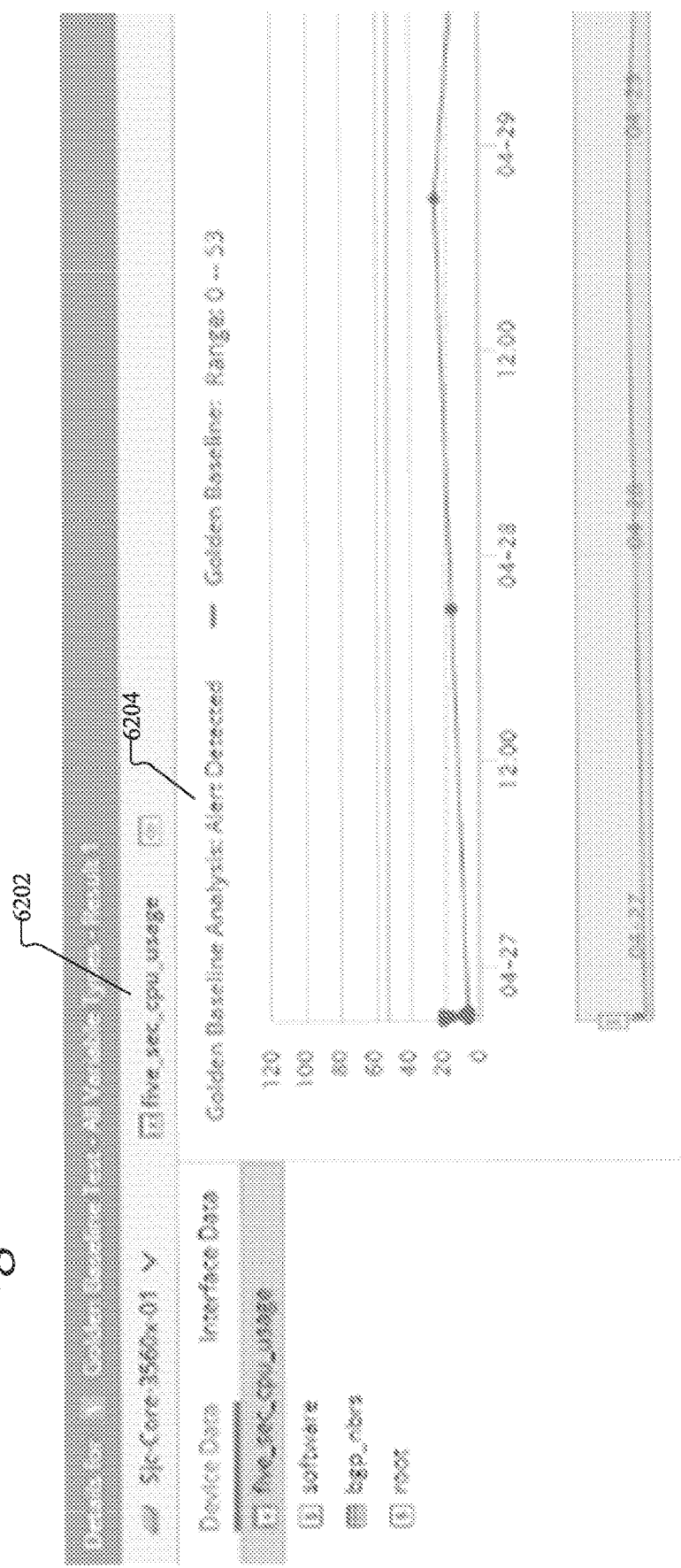
FIG. 62 is an example screenshot of detail pane golden baseline alert.

FIG. 62 is an example screenshot of detail pane golden baseline alert. The details for the variable five_sec_cpu_usage 6202 are displayed. There is an active golden baseline analysis, but a golden baseline alert 6204 has been detected. That alert would be triggered when the variable is outside the established range of 0 to 53 (the point at which the data exceeds the range is not shown in FIG. 62). FIG. 62 illustrates one embodiment in which the alert is triggered within the detail pane for a number variable. The display for string or table may be similar.

The system and process described above may be encoded in a signal bearing medium, a computer readable medium such as a memory, programmed within a device such as one or more integrated circuits, one or more processors or processed by a controller or a computer. That data may be analyzed in a computer system and used to generate a spectrum. If the methods are performed by software, the software may reside in a memory resident to or interfaced to a storage device, synchronizer, a communication interface, or non-volatile or volatile memory in communication with a transmitter. A circuit or electronic device designed to send data to another location. The memory may include an ordered listing of executable instructions for implementing logical functions. A logical function or any system element described may be implemented through optic circuitry, digital circuitry, through source code, through analog circuitry, through an analog source such as an analog electrical, audio, or video signal or a combination. The software may be embodied in any computer-readable or signal-bearing medium, for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium," "machine readable medium," "propagated-signal" medium, and/or "signal-bearing medium" may comprise any device that includes stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The phrase "coupled with" is defined to mean directly connected to or indirectly connected through one or more intermediate components. Such intermediate components may include both hardware and software based components. Variations in the arrangement and type of the components may be made without departing from the spirit or scope of the claims as set forth herein. Additional, different or fewer components may be provided.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description. While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A method for network management comprising:
    displaying a map of network devices and connections between the network devices;
    associating one or more of the network devices with one or more device drill-down actions;
    associating one or more of the connections with one or more connection drill-down actions;
    displaying, for each of the one or more device drill-down actions, a first drill-down pane including each of the one or more device drill-down actions, wherein the first drill-down pane is displayed on the map at a location adjacent to the associated one or more network devices;
    displaying, for each of the one or more connection drill-down actions, a second drill-down pane including each of the one or more connection drill-down actions, wherein the second drill-down pane is displayed on the map at a location adjacent to the associated one or more connections;
    receiving, from the first drill-down pane, a selection of one of the displayed device drill-down actions for the one or more network devices associated with the selected drill-down action when displayed and associated with the one or more of the network devices;
    receiving, from the second drill-down pane, a selection of one of the displayed connection drill-down actions for the one or more connections associated with the selected drill-down action when displayed and associated with the one or more of the connections;
    implementing a function provided by the selected device drill-down action that corresponds with the associated one or more network devices when the selected drill-down action is adjacent to the associated one or more network devices; and
    implementing a function provided by the selected connection drill-down action that corresponds with the associated one or more connections when the selected drill-down action is adjacent to the associated one or more connections.

2. The method of claim 1, wherein the selection comprises a selection of the associated one or more network devices adjacent to the selected drill-down action or a selection of the associated one or more connections adjacent to the selected drill-down action.

3. The method of claim 1, wherein the function provides a display of information for the associated one or more network devices or the associated one or more connections depending on the selection.

4. The method of claim 3, wherein the display of information comprises an analysis of the associated one or more network devices or the associated one or more connections.

5. The method of claim 1, wherein each of the network devices is displayed as an icon on the map.

6. The method of claim 5, wherein the location at which the drill-down action is displayed comprises a link near the icon for the associated network device.

7. The method of claim 1, further comprising:
    receiving a condition upon which the drill-down action is applied.

8. The method of claim 7, wherein the condition comprises one of always display, display upon an alert, or display upon selection of a particular variable.

9. A method comprising:
    mapping one or more network devices and connections between those network devices;
    providing an interface for generating a data view template that includes pre-defined drill-down actions wherein some of the pre-defined drill-down actions are device drill-down actions associated with the one or more network devices displayed on a first drill-down pane adjacent the one or more network devices and wherein some of the pre-defined drill-down actions are connection drill-down actions associated with the connections between those network devices and displayed on a second drill-down pane adjacent the connections;
    receiving a selection from among the network devices or connections upon which to apply the pre-defined drill-down action that is associated with the selection, wherein the selection comprises any subset of the one or more network devices and the connections between those network devices, further wherein an action performed based on the selection applies to each of the one or more network devices and the connections in the subset;

applying the data view template to the mapping;

modifying the mapping to display the device drill-down actions for the one or more network devices on the first drill-down pane;

modifying the mapping to display the connection drill-down actions for the connections on the second drill-down pane;

receiving a selection from the device drill-down actions for performing an action for one of the network devices corresponding to the selected device drill-down action;

implementing a function provided by the selection from the device drill-down actions that corresponds with the associated one or more network devices when the selected drill-down action is adjacent to the associated one or more network devices;

receiving a selection from the connection drill-down actions for performing an action for one of the connections corresponding to the selected connection drill-down action; and implementing a function provided by the selection from the connection drill-down action that corresponds with the associated one or more connections when the selected drill-down action is adjacent to the associated one or more connections.

10. The method of claim 9, wherein the display of the pre-defined drill-down actions comprises a selectable link.

11. The method of claim 10, wherein the selectable link is displayed adjacent to the selected network device or connection upon which the pre-defined drill-down action is applied.

12. The method of claim 9, wherein the display of the pre-defined drill-down actions is displayed as a recommended action for troubleshooting.

13. The method of claim 9, further comprising:

receiving one or more input parameters for usage with the data view template application and for the pre-defined drill-down action.

14. A graphical user interface comprising:

a map displaying network devices and interfaces between the network devices;

a data view template that includes a selection of device drill-down actions associated with one or more of the network devices and a selection of interface drill-down actions associated with one or more of the interfaces between the network devices, wherein the selection associated with the one or more network devices comprises selecting the one or more network devices, and wherein the selection associated with the interfaces between those network devices comprises selecting the interfaces between those network devices;

a display of a first drill-down pane with the device drill-down actions adjacent the associated one or more of the network devices, wherein the display of each of the device drill-down actions provides recommended actions for an end user that apply to the associated one or more of the network devices for the first drill-down pane; and a display of a second drill-down pane with the interface drill-down actions adjacent the associated one or more of the interfaces, wherein the display of each of the interface drill-down actions provides recommended actions for the end user that apply to the associated one or more of the interfaces between the network devices for the second drill-down pane;

wherein the display of the drill-down actions in either the first drill-down pane or the second drill-down pane is configured to receive a customization of the device or interface drill-down action, wherein the display of the first drill-down pane and the second drill-down pane includes the customization;

wherein application of the recommended actions provides further information displayed on the map about the associated one or more of the network devices for the device drill-down actions or the associated one or more of the interfaces between the network devices for the interface drill-down actions.

15. The graphical user interface of claim 14, further comprising:

a data view template editor for defining a dynamic data view template, wherein the definition of the dynamic data view template comprises associating one or more variables with one or more of the network devices or the interfaces, wherein the variables are dynamically updated with live data, further wherein the data view template editor provides an option for establishing conditions upon which the drill-down actions are displayed.

16. The graphical user interface of claim 15, wherein the conditions comprise always display, display upon an alert, or display upon selection of a particular variable.

17. The graphical user interface of claim 15, further comprising:

a data view template manager for displaying the variables for modifying at least some of the network devices and the interfaces.

18. The graphical user interface of claim 14, wherein the drill-down actions are displayed as selectable links, wherein the network devices are displayed as icons for the map and the selectable links are adjacent a corresponding one of the icons.

19. The graphical user interface of claim 15, wherein the displayed variables are selectable for displaying details about the associated one or more of the network devices or the interfaces related to the selected variable, wherein the details include the live data that is dynamically updated.

20. The graphical user interface of claim 14, wherein the customization comprises an additional action or a change to the actions that are part of the pre-defined drill-down actions.

* * * * *